US009495843B2

(12) United States Patent
Itagaki et al.

(10) Patent No.: US 9,495,843 B2
(45) Date of Patent: Nov. 15, 2016

(54) GAMING MACHINE AND METHOD FOR A BONUS GAME WITH INCREASING PAYOUT RATE

(71) Applicants: Universal Entertainment Corporation, Tokyo (JP); Aruze Gaming America, Inc., Las Vegas, NV (US)

(72) Inventors: Takehisa Itagaki, Tokyo (JP); Hiromoto Yamauchi, Tokyo (JP); Yoichi Kato, Tokyo (JP); Yukihiro Kawakami, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 307 days.

(21) Appl. No.: 14/273,702

(22) Filed: May 9, 2014

(65) Prior Publication Data

US 2014/0342802 A1 Nov. 20, 2014

(30) Foreign Application Priority Data

May 15, 2013 (JP) ................................ 2013-103074

(51) Int. Cl.

*A63F 13/00* (2014.01)
*G07F 17/34* (2006.01)
*G07F 17/32* (2006.01)

(52) U.S. Cl.

CPC ........... *G07F 17/34* (2013.01); *G07F 17/3267* (2013.01)

(58) Field of Classification Search

None

See application file for complete search history.

(56) References Cited

U.S. PATENT DOCUMENTS

2005/0266911 A1* 12/2005 Kojima ............... G07F 17/3267 463/16
2010/0120510 A1* 5/2010 Saito .................. G07F 17/3244 463/20
2011/0230251 A1* 9/2011 Nicely .................... G07F 17/32 463/20
2011/0250947 A1 10/2011 Okamoto
2012/0108319 A1* 5/2012 Caputo ................... G07F 17/32 463/25
2012/0309490 A1* 12/2012 Okada ................ G07F 17/3244 463/20
2013/0005441 A1* 1/2013 Ellis ................... G07F 17/3267 463/25
2013/0065665 A1* 3/2013 Watkins .................. G07F 17/32 463/20

FOREIGN PATENT DOCUMENTS

CN 102810230 12/2012

OTHER PUBLICATIONS

Office Action, Macau/ State Intellectual Property Office of the P.R.C, Jun. 29, 2015 Macau Patent Application No. I/001292.

* cited by examiner

*Primary Examiner* — Jason Yen
(74) *Attorney, Agent, or Firm* — Lex IP Meister, PLLC

(57) ABSTRACT

When a trigger condition is established in a normal game, a gaming machine 300 executes a process of shifting to a bonus game in which a re-trigger condition which is less stringent than the trigger condition may be established, a process of executing a free game at least once in the bonus game, and a process of increasing the payout rate of the free game in the bonus game when the re-trigger condition is established in the bonus game.

9 Claims, 86 Drawing Sheets

FIG.9

■ Genex LED

| No. | FOLDER | APPLICATION PART | START CONDITION | DELETION CONDITION |
|---|---|---|---|---|
| 1 | common/ADVERTISE | IN ADVERTISE | WHEN CREDIT BECOMES ZERO IN IDLE STATE | WHEN CREDIT IS INSERTED |
| 2 | common/IDLE | IN IDLE | WHEN CREDIT IS INSERTED IN ADVERTISE STATE | WHEN SHIFTED TO ANOTHER STATE |
| 3 | common/FEATURESTOP1 | DURING SPINNING | WHEN FEATURE SYMBOL STOPS AT FIRST REEL | WHEN SECOND REEL STOPS |
| 4 | common/FEATURESTOP2 | DURING SPINNING | WHEN FEATURE SYMBOL STOPS AT SECOND REEL WHILE FEATURE SYMBOL HAS STOPPED AT FIRST REEL | WHEN THIRD REEL STOPS |
| 5 | common/FEATURESTOP3 | DURING SPINNING | WHEN FEATURE SYMBOL STOPS AT THIRD REEL WHILE FEATURE SYMBOLS HAVE STOPPED AT FIRST AND SECOND REELS | |
| 6 | original/FREEGAME_0 | FEATURE START - PRFESS START FEATURE SCREEN | AT END OF BLEEP SOUND | WHEN START FEATURE BUTTON IS PRESSED |
| | original/FREEGAME_1 | DURING FG PAYOUT RATE IS 1 | WHEN START FEATURE BUTTON IS PRESSED AND FG STARTS | WHEN FG ENDS OR WHEN PAYOUT RATE IS CHANGED TO 2 |
| | original/FREEGAME_2 | DURING FG PAYOUT RATE IS 2 | WHEN PAYOUT RATE IS CHANGED TO 2, AS A RESULT OF RE-TRIGGER | WHEN FG ENDS OR WHEN PAYOUT RATE IS CHANGED TO 3 |
| | original/FREEGAME_3 | DURING FG PAYOUT RATE IS 3 | WHEN PAYOUT RATE IS CHANGED TO 3, AS A RESULT OF RE-TRIGGER | WHEN FG ENDS OR WHEN PAYOUT RATE IS CHANGED TO 4 |
| 7 | original/FREEGAME_4 | DURING FG PAYOUT RATE IS 4 | WHEN PAYOUT RATE IS CHANGED TO 4, AS A RESULT OF RE-TRIGGER | WHEN FG ENDS OR WHEN PAYOUT RATE IS CHANGED TO 5 |
| 7 | original/FREEGAME_4 | DURING FG PAYOUT RATE IS 5 | WHEN PAYOUT RATE IS CHANGED TO 5, AS A RESULT OF RE-TRIGGER | WHEN FG ENDS |

FIG.10

| No. | DATA NAME | STATE | STATUS | |
|---|---|---|---|---|
| 1 | RSP_Normal.spn | NORMAL GAME | FEATURE SYMBOLS DO NOT FORM READY-TO-WIN STATE WHEN FIRST AND SECOND REEL STOP IN NORMAL ROTATION | _12345 |
| 2 | RSP_Normal_Reach.spn | READY-TO-WIN IN NORMAL GAME | FEATURE SYMBOLS STOP AT FIRST AND SECOND REELS | _12_345 |
| 3 | RSP_FG.spn | FREE GAME | "FEATURE SYMBOLS DOES NOT STOP AT FIRST REEL IN FG | _12345 |
| 4 | RSP_FG_Reach_01.spn | READY-TO-WIN AT FIRST REEL IN FREE GAME | FEATURE SYMBOL STOPS AT FIRST REEL AND DOES NOT STOP AT SECOND REEL IN FG | _1_2345 |
| 5 | RSP_FG_Reach_02.spn | READY-TO-WIN AT FIRST AND SECOND REELS IN FREE GAME | FEATURE SYMBOLS STOP AT FIRST AND SECOND REELS IN FG | _1_2_345 |

FIG.11

| COMBINATION PATTERNS OF REELS | | | | | ADDITIONAL NUMBER OF TIMES OF EXECUTION OF GAME |
|---|---|---|---|---|---|
| FIRST REEL | SECOND REEL | THIRD REEL | FOURTH REEL | FIFTH REEL | RATE OF INCREASE OF PAYOUT RATE |
| ○ | | | | | 1 |
| | ○ | | | | 1 |
| | | ○ | | | 1 |
| | | | ○ | | 1 |
| | | | | ○ | 1 |
| ○ | ○ | | | | 2 |
| ○ | | ○ | | | 2 |
| ○ | | | ○ | | 2 |
| ○ | | | | ○ | 2 |
| | ○ | ○ | | | 2 |
| | ○ | | ○ | | 2 |
| | ○ | | | ○ | 2 |
| | ○ | | | | 2 |
| | | ○ | ○ | | 2 |
| ......... | | | | | |
| ○ | ○ | ○ | | | 3 |
| ○ | ○ | | ○ | | 3 |
| ○ | ○ | | | ○ | 3 |
| ○ | | ○ | ○ | | 3 |
| ○ | ○ | | | ○ | 3 |
| | ○ | ○ | ○ | | 3 |
| | ○ | | ○ | ○ | 3 |
| | | ○ | ○ | ○ | 4 |
| ○ | ○ | ○ | ○ | | 4 |
| ○ | | ○ | ○ | ○ | 4 |
| | ○ | ○ | ○ | ○ | 4 |

FIG.12

| NUMBER OF REARRANGED SYMBOLS | RANK |
|---|---|
| 1 | 1 |
| 2 | 1 |
| 3 | 1 |
| 4 | 2 |
| 5 | 2 |
| 6 | 2 |
| 7 | 3 |
| 8 | 3 |
| … | … |

BUTTON LAYOUT

FIG.36

REEL POSITION NUMBERS

| R1 | R2 | R3 | R4 | R5 | |
|---|---|---|---|---|---|
| 0 | 0 | 0 | 0 | 0 | FIRST STAGE |
| 1 | 1 | 1 | 1 | 1 | SECOND STAGE |
| 2 | 2 | 2 | 2 | 2 | THIRD STAGE |
| 3 | 3 | 3 | 3 | 3 | FOURTH STAGE |

FIG.37

| No | R1 | R2 | R3 | R4 | R5 |
|---|---|---|---|---|---|
| 1 | 0 | 0 | 0 | 0 | 0 |
| 2 | 0 | 0 | 0 | 1 | 0 |
| 3 | 0 | 1 | 0 | 0 | 0 |
| 4 | 0 | 1 | 2 | 3 | 2 |
| 5 | 0 | 0 | 1 | 0 | 0 |
| 6 | 0 | 1 | 2 | 1 | 0 |
| 7 | 0 | 1 | 0 | 1 | 0 |
| 8 | 0 | 1 | 1 | 1 | 0 |
| 9 | 0 | 0 | 1 | 1 | 0 |
| 10 | 0 | 1 | 1 | 0 | 0 |
| 11 | 1 | 1 | 1 | 1 | 1 |
| 12 | 1 | 0 | 1 | 1 | 1 |
| 13 | 1 | 0 | 0 | 1 | 2 |
| 14 | 1 | 1 | 2 | 1 | 1 |
| 15 | 1 | 1 | 0 | 1 | 1 |
| 16 | 1 | 0 | 0 | 0 | 1 |
| 17 | 1 | 0 | 1 | 0 | 1 |
| 18 | 1 | 2 | 2 | 2 | 1 |
| 19 | 1 | 2 | 1 | 2 | 1 |
| 20 | 1 | 2 | 3 | 2 | 1 |
| 21 | 2 | 2 | 2 | 2 | 2 |
| 22 | 2 | 2 | 1 | 2 | 2 |
| 23 | 2 | 3 | 3 | 2 | 1 |
| 24 | 2 | 3 | 2 | 2 | 2 |
| 25 | 2 | 2 | 3 | 2 | 2 |
| 26 | 2 | 1 | 1 | 1 | 2 |
| 27 | 2 | 1 | 2 | 1 | 2 |
| 28 | 2 | 1 | 0 | 1 | 2 |
| 29 | 2 | 3 | 2 | 3 | 2 |
| 30 | 2 | 3 | 3 | 3 | 2 |
| 31 | 3 | 3 | 3 | 3 | 3 |
| 32 | 3 | 3 | 3 | 2 | 3 |
| 33 | 3 | 2 | 3 | 3 | 3 |
| 34 | 3 | 2 | 1 | 0 | 1 |
| 35 | 3 | 2 | 2 | 3 | 3 |
| 36 | 3 | 3 | 2 | 2 | 3 |
| 37 | 3 | 3 | 2 | 3 | 3 |
| 38 | 3 | 2 | 1 | 2 | 3 |
| 39 | 3 | 2 | 2 | 2 | 3 |
| 40 | 3 | 2 | 3 | 2 | 3 |

DURING IDLE STATE

DURING HELP

DURING GAME

TAKE WIN OR GAMBLE STATE

FIG.41

| TYPE OF BUTTON | DURING IDLE STATE | DURING GAME | DURING ERROR | DURING AUDIT | TAKE WIN OR GAMBLE |
|---|---|---|---|---|---|
| HELP | ON | OFF | OFF | OFF | ON |
| LANGUAGE SWITCHING | ON | OFF | OFF | OFF | OFF |
| VOLUME | ON | ON | OFF | OFF | ON |
| NUMBER OF LINES | ON (WHEN SELECTABLE) | OFF | OFF | OFF | OFF |
| NUMBER OF BETS | ON | OFF | OFF | OFF | OFF |
| PAY TABLE | ON | OFF | OFF | OFF | ON |

FIG.42
| AREA | DISPLAYED NATIONAL FLAG | DISPLAYED LANGUAGE | DISPLAYED BUTTON | dat/tga NAME |
|---|---|---|---|---|
| U. S. A. | U. S. A. or CHINA | ENGLISH (USA) | 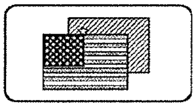 | btn_flag_u_cham |
| | | CHINESE (CHN) | 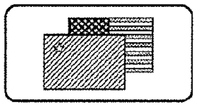 | btn_flag_u_amch |
| OTHERS | UNITED KINGDOM or CHINA | ENGLISH (UK) | 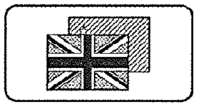 | btn_flag_u_chem |
| | | CHINESE (CHN) | 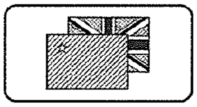 | btn_flag_u_egch |
| LANGUAGE SWITCHING INVALID | — | — | PAY TABLE | — |

| AREA | DISPLAYED LANGUAGE | NATIONAL FLAG | FUNCTION/ TOUCH BUTTON |
|---|---|---|---|
| NORTH AMERICA | ENGLISH | U.S.A./CHINA | U.S. FLAG IS ON THE TOP |
| MACAU | ENGLISH | U.S.A./CHINA | U.S. FLAG IS ON THE TOP |
| OTHERS | ENGLISH | U.S.A./CHINA | U.S. FLAG IS ON THE TOP |

| SCREEN | CONTROL PANEL | OPERATION |
|---|---|---|
| EXIT | HELP | SHIFT TO NORMAL SCREEN |
| PREV. | BET ×1 | SHIFT TO PREVIOUS PAGE |
| NEXT | BET ×2 | SHIFT TO NEXT PAGE |

PAYTABLE (CONTINUED)

FIG.56A

■ FORCED BONUS GAME BONUS-IN WHEN THE COMMAND IS USED

| Reel 1 | Reel 2 | Reel 3 | Reel 4 | Reel 5 | Reel 1 | Reel 2 | Reel 3 | Reel 4 | Reel 5 |
|---|---|---|---|---|---|---|---|---|---|
| 0 | 12 | 27 | 0 | 4 | QUEEN | KING | KING | KING | EAGLE |
| 1 | 13 | 28 | 1 | 5 | FEATURE | FEATURE | RABBIT | FOX | EAGLE |
| 2 | 14 | 29 | 2 | 6 | NINE | TEN | NINE | JACK | EAGLE |
| 3 | 15 | 30 | 3 | 7 | SQUIRREL | BEAR | FEATURE | EAGLE | QUEEN |

FIG.56B

■ TWO-SYMBOL RE-TRIGGER COMBINATIONS WHEN THE COMMAND IS USED

| Reel 1 | Reel 2 | Reel 3 | Reel 4 | Reel 5 | Reel 1 | Reel 2 | Reel 3 | Reel 4 | Reel 5 |
|---|---|---|---|---|---|---|---|---|---|
| 1 | 10 | 1 | 10 | 10 | FEATURE | JACK | EAGLE | NINE | NINE |
| 2 | 11 | 2 | 11 | 11 | NINE | FOX | EAGLE | RABBIT | RABBIT |
| 3 | 12 | 3 | 12 | 12 | SQUIRREL | KING | EAGLE | ACE | ACE |
| 4 | 13 | 4 | 13 | 13 | ACE | FEATURE | EAGLE | FOX | QUEEN |

FIG.56C

■ IN-FREE-GAME LARGE PAYOUT COMBINATIONS WHEN THE COMMAND IS USED

| Reel 1 | Reel 2 | Reel 3 | Reel 4 | Reel 5 | Reel 1 | Reel 2 | Reel 3 | Reel 4 | Reel 5 |
|---|---|---|---|---|---|---|---|---|---|
| 46 | 37 | 38 | 38 | 33 | EAGLE | EAGLE | EAGLE | NINE | WILD |
| 47 | 38 | 39 | 39 | 34 | EAGLE | ACE | EAGLE | WILD | WILD |
| 48 | 39 | 40 | 40 | 35 | EAGLE | WILD | EAGLE | WILD | WILD |
| 49 | 40 | 41 | 41 | 36 | EAGLE | WILD | EAGLE | WILD | WILD |

FIG.56D

■ IN-NORMAL-GAME MAXIMUM PAYOUT COMBINATIONS WHEN THE COMMAND IS USED

| Reel 1 | Reel 2 | Reel 3 | Reel 4 | Reel 5 | Reel 1 | Reel 2 | Reel 3 | Reel 4 | Reel 5 |
|---|---|---|---|---|---|---|---|---|---|
| 46 | 3 | 1 | 3 | 3 | EAGLE | EAGLE | EAGLE | EAGLE | EAGLE |
| 47 | 4 | 2 | 4 | 4 | EAGLE | EAGLE | EAGLE | EAGLE | EAGLE |
| 48 | 5 | 3 | 5 | 5 | EAGLE | EAGLE | EAGLE | EAGLE | EAGLE |
| 49 | 6 | 4 | 6 | 6 | EAGLE | EAGLE | EAGLE | EAGLE | EAGLE |

FIG.57

| | COMMAND NAME | OUTLINE |
|---|---|---|
| 1 | NORMAL MODE | PLAYABLE IN NORMAL PROBABILITY |
| 2 | FREE GAME | THREE FETURE SYMBOLS |
| 3 | FG RETRIGGER 2K | DURING THREE-FEATURE FREE GAME, TWO-SYMBOL RETRIGGER IS ESTABLISHED IN THIRD GAME (RANDOM DETERMINATION IS NORMAL IN GAME PLAY OTHER THAN THIRD GAME) |
| 4 | FG RETRIGGER 3K | DURING THREE-FEATURE FREE GAME, THREE-SYMBOL RETRIGGER IS ESTABLISHED IN THIRD GAME (RANDOM DETERMINATION IS NORMAL IN GAME PLAY OTHER THAN THIRD GAME) |
| 5 | FG BIG WIN | DURING THREE-FEATURE FREE GAME, LARGE PAYOUT IS ACHIEVED IN THIRD GAME (RANDOM DETERMINATION IS NORMAL IN GAME PLAY OTHER THAN THIRD GAME) |
| 6 | MAX WIN | MAXIMUM PAYOUT OCCURS IN NORMAL GAME |
| 7 | MANUAL RETRIGGER (KEY6) | THREE FEATURE SYMBOLS, FORCED RETRIGGER OCCURS WHEN KEY 6 IS PRESSED DURING FG |
| 8 | 5 PIC_A | FIVE PIC_A SYMBOLS |
| 9 | 4 PIC_A | FOUR PIC_A SYMBOLS |
| 10 | 3 PIC_A | THREE PIC_A SYMBOLS |
| 11 | 2 PIC_A | TWO PIC_A SYMBOLS |
| 12 | 5 PIC_B | FIVE PIC_B SYMBOLS |
| 13 | 4 PIC_B | FOUR PIC_B SYMBOLS |
| 14 | 3 PIC_B | THREE PIC_B SYMBOLS |
| 15 | 5 PIC_C | FIVE PIC_C SYMBOLS |
| 16 | 4 PIC_C | FOUR PIC_C SYMBOLS |
| 17 | 3 PIC_C | THREE PIC_C SYMBOLS |
| 18 | 5 PIC_D | FIVE PIC_D SYMBOLS |
| 19 | 4 PIC_D | FOUR PIC_D SYMBOLS |
| 20 | 3 PIC_D | THREE PIC_D SYMBOLS |
| 21 | 5 PIC_E | FIVE PIC_E SYMBOLS |
| 22 | 4 PIC_E | FOUR PIC_E SYMBOLS |
| 23 | 3 PIC_E | THREE PIC_E SYMBOLS |
| 24 | 5 ACE | FIVE ACE SYMBOLS |
| 25 | 4 ACE | FOUR ACE SYMBOLS |
| 26 | 3 ACE | THREE ACE SYMBOLS |
| 27 | 5 KING | FIVE KING SYMBOLS |
| 28 | 4 KING | FOUR KING SYMBOLS |
| 29 | 3 KING | THREE KING SYMBOLS |
| 30 | 5 QUEEN | FIVE QUEEN SYMBOLS |
| 31 | 4 QUEEN | FOUR QUEEN SYMBOLS |
| 32 | 3 QUEEN | THREE QUEEN SYMBOLS |
| 33 | 5 JACK | FIVE JACK SYMBOLS |
| 34 | 4 JACK | FOUR JACK SYMBOLS |
| 35 | 3 JACK | THREE JACK SYMBOLS |
| 36 | 5 TEN | FIVE TEN SYMBOLS |
| 37 | 4 TEN | FOUR TEN SYMBOLS |
| 38 | 3 NINE | THREE TEN SYMBOLS |
| 39 | 5 NINE | FIVE NINE SYMBOLS |
| 40 | 4 NINE | FOUR NINE SYMBOLS |
| 41 | 3 NINE | THREE NINE SYMBOLS |
| 42 | MANUAL REEL | STOP COMBINATION CAN BE SPECIFIED |

FIG.65

■ WIN RANK

| | n TIMES AS LARGE AS TOTAL BET | | | |
|---|---|---|---|---|
| WIN TYPE | NOT LESS THAN | LESS THAN | NUMBER OF SECONDS | INCREMENT PROCESS |
| WIN1 | | 0.1 | 0.50 | DIVIDE WIN AMOUNT BY NUMBER OF SECONDS AND CHANGE INCREMENT SPEED SO THAT INCREMENT IS COMPLETED AT NUMBER OF SECONDS (WIN1–WIN22) |
| WIN2 | 0.1 | 0.2 | 0.60 | |
| WIN3 | 0.2 | 0.3 | 0.70 | |
| WIN4 | 0.3 | 0.4 | 0.90 | |
| WIN5 | 0.4 | 0.5 | 0.90 | |
| WIN6 | 0.5 | 0.75 | 0.50 | |
| WIN7 | 0.75 | 1 | 2.00 | |
| WIN8 | 1 | 1.25 | 2.50 | |
| WIN9 | 1.25 | 1.5 | 2.70 | |
| WIN10 | 1.5 | 2 | 3.90 | |
| WIN11 | 2 | 3 | 5.60 | |
| WIN12 | 3 | 4 | 6.10 | |
| WIN13 | 4 | 5 | 9.90 | |
| WIN14 | 5 | 6 | 9.90 | |
| WIN15 | 6 | 7 | 9.90 | |
| WIN16 | 7 | 8 | 11.90 | |
| WIN17 | 8 | 10 | 19.60 | |
| WIN18 | 10 | 12 | 19.70 | |
| WIN19 | 12 | 15 | 23.80 | |
| WIN20 | 15 | 20 | 30.30 | |
| WIN21 | 20 | 30 | 34.60 | |
| WIN22 | 30 | 40 | 43.00 | |
| WIN23 | 40 | 50 | 50.00 | UNTIL DISPLAY OF INCREMENT AMOUNT REACHES 20 TIMES AS LARGE AS TOTAL BET, PROCEED INCREMENT AT SPEED AT WHICH 1/2 OF TOTAL BET PROCEEDS PER SECOND (WIN23–WIN24) |
| WIN24 | 50 | | 72.00 | |
| | | | | |

■ IMAGE OF INCREMENT

■ NORMAL WIN

■ WHEN THREE OR MORE TOP SYMBOLS APPEAR

FIG.71
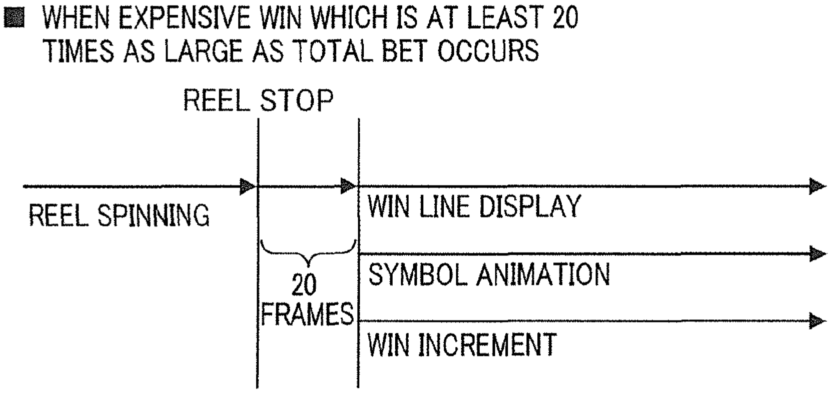
FIG.72
| OBTAINED CREDITS | EFFECTS | NUMBER OF SECONDS OF DISPLAY |
|---|---|---|
| LESS THAN 20 TIMES AS LARGE AS TOTAL BET | SILVER SIGNBOARD | 36 SECONDS |
| NOT LESS THAN 20 TIMES AND LESS THAN 50 TIMES AS LARGE AS TOTAL BELT | SILVER SIGNBOARD + COINS | 6 SECONDS |
| NOT LESS THAN 20 TIMES AS LARGE AS TOTAL BET | SILVER SIGNBOARD + COINS + BILLS | 10 SECONDS |
FIG.73A
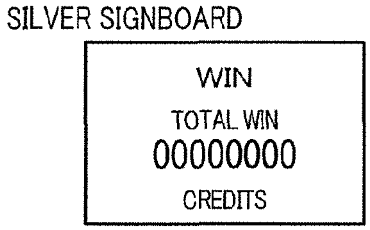
FIG.73B
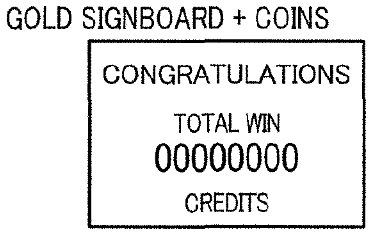

GOLD SIGNBOARD + COINS + BILLS

| MAXIMUM THRESHOLD | | MINIMUM THRESHOLD | | | |
|---|---|---|---|---|---|
| win | INCREMENT PER SECOND | win | INCREMENT PER SECOND | win | INCREMENT PER SECOND |
| 5 | 10 | 2 | 4 | | |
| 10 | 16.66667 | 5 | 8.333333 | | |
| 15 | 21.42857 | 10 | 14.28571 | | |
| 20 | 22.22222 | 15 | 16.66667 | | |
| 25 | 27.77778 | 20 | 12.22222 | | |
| 37.5 | 25 | 25 | 16.66667 | | |
| 50 | 25 | 37.5 | 18.75 | | |
| 62.5 | 25 | 50 | 20 | | |
| 75 | 27.77778 | 62.5 | 23.14815 | | |
| 100 | 25.64103 | 700 | 19.23077 | | |
| 150 | 26.75871 | 100 | 17.85714 | | |
| 200 | 32.78689 | 150 | 24.59016 | | |
| 250 | 26.25263 | 200 | 20.20202 | | |
| 300 | 30.30303 | 250 | 25.25253 | | |
| 350 | 35.35354 | 300 | 30.30303 | | |
| 400 | 33.61345 | 350 | 29.41176 | | |
| 500 | 25.5102 | 400 | 20.40816 | | |
| 600 | 30.45685 | 500 | 25.38071 | | |
| 750 | 31.51261 | 600 | 25.21008 | | |
| 1000 | 33.0033 | 750 | 24.75248 | | |
| 1500 | 43.3526 | 1000 | 28.90173 | | |
| 2000 | 46.51163 | 1500 | 34.88372 | | |
| | UNTIL 1000 | FROM 1000 | | | |
| 2001 | 25 | 55.61111 | | | |
| 2500 | 25 | 136.3636 | | | |
| 2500 | 25 | 83.33333 | | | |
| 2501 | 25 | 37.525 | | | |

■ COEXISTENCE WITH REEL SKIP FUNCTION

GAMING MACHINE AND METHOD FOR A BONUS GAME WITH INCREASING PAYOUT RATE

CROSS REFERENCE TO RELATED APPLICATION

The present application claims priority from Japanese Patent Application No. 2013-103074, which was filed on May 15, 2013, the disclosure of which is herein incorporated by reference in its entirety.

BACKGROUND OF THE INVENTION

The present invention relates to a gaming machine which variably displays symbols and then rearranges the symbols, and a method of controlling the gaming machine.

An example of a known slot machine (gaming machine) is disclosed by Patent Literature 1 (U.S. Laid-Open Patent Application No. 2011/0250947). This slot machine operates in such a way that, when a player inserts a coin, bill or the like into an insertion slot of a slot machine and presses a spin button, symbols are scroll-displayed on a symbol display area provided on the front surface of a cabinet, and then the symbols are automatically stopped. Based on the state of the stopped symbols, various prizes such as a bonus are established.

SUMMARY OF THE INVENTION

In gaming machines such as the known slot machine above, when a trigger condition is established in a normal game, shifting from the normal game to a bonus game is achieved. As such, the gaming machines allow players to play highly entertaining games. In other words, providing highly entertaining games has been an important point in the gaming machines.

An object of the present invention is to provide a highly-entertaining gaming machine.

The present invention relates to a gaming machine including a symbol display device configured to variably display and rearrange symbols including a trigger symbol; and a controller programmed to execute the processes of:

(a1) executing a normal game by rearranging the symbols on the symbol display device;

(a2) determining whether a trigger condition indicating that a predetermined number or more of the trigger symbol is rearranged is established in the normal game;

(a3) when the trigger condition is established, executing a free game for a predetermined number of times as a bonus game;

(a4) each time the free game is executed in the bonus game, determining whether a re-trigger condition indicating that the trigger symbol the number of which is smaller than the predetermined number is rearranged is established; and (a5) each time the re-trigger condition is established, increasing a payout rate of the free game executed as the bonus game.

According to the arrangement above, when the trigger condition is established in the normal game, shifting to the bonus game occurs, and in the bonus game the free game is executed for the predetermined number of times. When the re-trigger condition is established in the free game, the payout rate of the free game in the bonus game is increased. In this regard, the trigger condition indicates that the trigger symbols are rearranged on the predetermined number or more of neighboring reels, whereas the re-trigger condition indicates that the trigger symbols are rearranged on reels which are smaller in number than the predetermined number in the trigger condition. Because the establishment probability of the re-trigger condition is higher than that of the trigger condition, after the shifting from the normal game to the bonus game, the re-trigger condition is more frequently to be established than the re-trigger condition in the normal game, with the result that the player recognizes the increase in the value of the bonus game on account of the increase in the payout rate of the free game. This makes it possible to realize highly entertaining game play because the player's enjoyment at the time of the shifting to the bonus game is enhanced.

In the present invention, the controller increases, in the process (a5), the payout rate of the free game executed as the bonus game in accordance with the number of the trigger symbol with which the re-trigger condition is established.

According to this arrangement, after the shifting from the normal game to the bonus game, as the payout rate is increased in accordance with the number of reels with which the re-trigger condition is established, it is possible to induce the player to be interested in the number of reels with which the re-trigger condition is established.

In the present invention, the controller includes a rank data table in which the number of rearranged trigger symbols is associated with a rank, and in the process (a5), calculates a rank corresponding to the number of rearranged trigger symbols with which the re-trigger condition is established, based on the rank data table, and multiplies the payout rate of the free game executed as the bonus game by the rank.

According to the arrangement above, a payout rate is multiplied by a rank corresponding to the number of rearranged trigger symbols and a payout of the free game is obtained with the increased payout rate, profound game enjoyment is provided.

In the present invention, the controller increases, in the process (a5), the number of times of execution of the free game executed as the bonus game by a number which is smaller than the predetermined number of times.

According to the arrangement above, after the shifting from the normal game to the bonus game, the re-trigger condition is more frequently established as compared to the re-trigger condition in the normal game, the player recognizes that the bonus game is executed for a long time on account of the increased number of times of execution of the free game. This makes it possible to realize highly entertaining game play because the player's enjoyment at the time of the shifting to the bonus game is enhanced.

In the present invention, the controller includes a re-trigger data table in which a combination pattern of reels on which the trigger symbol is rearranged is associated with an additional number of times of execution of the free game which is smaller than the predetermined number of times, and in the process (a5), calculates an additional number of times corresponding to a combination pattern of the trigger symbol with which the re-trigger condition is established, based on the re-trigger data table, and adds the additional number of times to the number of times of execution of the free game.

According to the arrangement above, because the number of times of execution of the free game is increased in accordance with an additional number of times corresponding to a combination of reels, the game enjoyment is enhanced as compared to cases where the number of times of execution of the free game is increased always in the same way.

The gaming machine of the present invention includes a symbol data storage which is configured to store symbol data of symbols including the trigger symbol and a wild symbol, the symbol display device being able to change the type and number of the symbols based on the symbol data, and the controller executing the bonus game using the symbol display device on which the number of the wild symbol is increased as compared to the number in the normal game, when the trigger condition is established in the process (a3).

This makes it possible to realize flexible game enjoyment by taking advantage of the employment of video reels instead of mechanical reels.

The present invention relates to a gaming machine including:

a symbol data storage configured to store symbol data of symbols including a trigger symbol and a wild symbol;

a symbol display device being able to change the number and type of the symbols using the symbol data and variably displaying and rearranging the symbols; and a controller which includes a re-trigger data table in which a combination pattern of reels on which the trigger symbol is rearranged is associated with an additional number of times of execution of a game which is smaller than the predetermined number of times and is programmed to execute the processes of:

(a1) executing a normal game by rearranging the symbols on the symbol display device;

(a2) determining whether a trigger condition indicating that a predetermined number or more of the trigger symbol is rearranged is established in the normal game;

(a2-1) when the trigger condition is established, increasing the number of the wild symbol as compared to the normal game;

(a3) when the trigger condition is established, executing a free game for a predetermined number of times as a bonus game, using the symbol display device on which the number of the wild symbol is increased in the process (a2-1);

(a4) each time the free game is executed in the bonus game, determining whether a re-trigger condition indicating that the trigger symbol the number of which is smaller than the predetermined number is rearranged is established; and (a5) when the re-trigger condition is established, calculating the additional number of times of execution of the game corresponding to the combination pattern of the trigger symbol with which the re-trigger condition is established, based on the re-trigger data table, adding the additional number of times to the number of times of execution of the free game executed as the bonus game, and increasing a payout rate of the free game executed as the bonus game.

The arrangement above makes it possible to realize flexible game enjoyment by taking advantage of the employment of video reels instead of mechanical reels, and to finely adjust the number of times of execution of the free game to be added when the re-trigger condition is established in the bonus game. Furthermore, as the payout rate of the free game in the bonus game is increased, the player realizes the increase in the value of the bonus game.

The present invention relates to a gaming machine including:

a symbol display device including reels on which symbols including a trigger symbol are variably displayed and rearranged; and a controller programmed to execute the processes of:

(a1) executing a normal game by rearranging the symbols on the symbol display device;

(a2) determining whether a trigger condition is established in the normal game;

(a3) when the trigger condition is established, executing a free game for a predetermined number of times as a bonus game;

(a4) each time the free game is executed in the bonus game, determining whether a re-trigger condition which is more likely to be established than the trigger condition is established; and (a5) when the re-trigger condition is established, increasing a payout rate of the free game executed as the bonus game, based on a predetermined rule.

According to the arrangement above, when the trigger condition is established in the normal game, the normal game shifts to the bonus game, and the free game is executed for the predetermined number of times in the bonus game. When the re-trigger condition is established in the free game, payout rate of the free game in the bonus game is increased. In this regard, because the re-trigger condition is more likely to be established as compared to the trigger condition, the re-trigger condition is more frequently established after the shifting from the normal game to the bonus game, as compared to the re-trigger condition in the normal game. For this reason, the player realizes the increase in the value of the bonus game as the payout rate of the free game is increased based on the predetermined rule. This makes it possible to realize highly entertaining game play because the player's enjoyment at the time of the shifting to the bonus game is enhanced.

The present invention relates to a game controlling method for a gaming machine including a symbol display device including reels on which symbols including a trigger symbol are variably displayed and rearranged, the method comprising the steps of:

executing a normal game by rearranging the symbols on the symbol display device;

determining whether a trigger condition indicating that a predetermined number or more of successive different reels on which the trigger symbol is arranged neighbor one another is established in the normal game;

when the trigger condition is established, executing a free game for a predetermined number of times as a bonus game;

each time the free game is executed in the bonus game, determining whether a re-trigger condition indicating that the trigger symbol is rearranged on reels the number of which is smaller than the predetermined number is established; and when the re-trigger condition is established, increasing a payout rate of the free game executed as the bonus game.

According to the arrangement above, when the trigger condition is established in the normal game, the normal game shifts to the bonus game, and the free game is executed for the predetermined number of times in the bonus game. When the re-trigger condition is established in the free game, payout rate of the free game in the bonus game is increased. In this connection, the trigger condition is the rearrangement of the trigger symbols on the predetermined number or more of neighboring reels, whereas the re-trigger condition is the rearrangement of the trigger symbols on the reels which are fewer in number than the predetermined number in the trigger condition. Therefore, because the establishment probability of the re-trigger condition is higher than the establishment probability of the trigger condition, after the shifting from the normal game to the bonus game, the re-trigger condition is established more frequently than the re-trigger condition in the normal game, and the player clearly realizes that the bonus game becomes more valuable on account of the increase in the payout rate of the free game. This makes it possible to realize highly entertaining game play because the player's enjoyment at the time of the shifting to the bonus game is enhanced.

The gaming machine of the present invention is arranged so that, the symbol display device includes reels on which the symbols including the trigger symbol are variably displayed and rearranged, the trigger condition indicates that a predetermined number or more of reels on which the trigger symbol is arranged neighbor one another, and the retrigger condition indicates that the trigger symbol is rearranged on reels the number of which is smaller than the predetermined number.

According to the arrangement above, the trigger condition indicates that the trigger symbols are rearranged on a predetermined number or more of neighboring reels, whereas the retrigger condition indicates that the trigger symbols are rearranged on reels the number of which is smaller than the predetermined number. This makes it easy for the player to understand the state and make a judgment, because the player is only required to judge whether the trigger symbols successively neighbor one another, in regard to the establishment of the trigger condition and the re-trigger condition.

The present invention provides highly entertaining games.

BRIEF DESCRIPTION OF THE DRAWINGS

FIG. 9 illustrates a LED data table.

FIG. 10 illustrates a spin table.

FIG. 11 illustrates a re-trigger data table.

FIG. 12 illustrates a rank data table.

FIG. 36 illustrates the relationship between reel positions and reel stages.

FIG. 37 illustrates the relationship between payline numbers and reels.

FIG. 41 shows the lighting state of the language switching touch button.

FIG. 42 shows the language switching touch button.

FIG. 56A illustrates forced bonus game bonus-in results when a command is used.

FIG. 56B illustrates re-trigger combinations when a command is used.

FIG. 56C illustrates in-free-game large payout combinations when a command is used.

FIG. 56D illustrates in-normal-game maximum payout combinations when a command is used.

FIG. 57 illustrates commands used in a debug mode.

FIG. 65 illustrates WIN ranks.

FIG. 71 illustrates the situation after the reels stops in case of large WIN.

FIG. 72 illustrates the relationship between obtained credits, effects, and display seconds.

FIG. 73A illustrates the total WIN signboard after the free game.

FIG. 73B illustrates the total WIN signboard after the free game.

FIG. 79A illustrates a button prereading process.

FIG. 79B illustrates a button prereading process.

FIG. 79C illustrates a button prereading process.

FIG. 79D illustrates a button prereading process.

FIG. 79E illustrates a button prereading process.

FIG. 80 illustrates a button prereading process.

FIG. 81 illustrates a button prereading process.

FIG. 82A illustrates a gamble game.

FIG. 82B illustrates a gamble game.

FIG. 82C illustrates a gamble game.

FIG. 82D illustrates a gamble game.

FIG. 82E illustrates a gamble game.

Figure 82A:
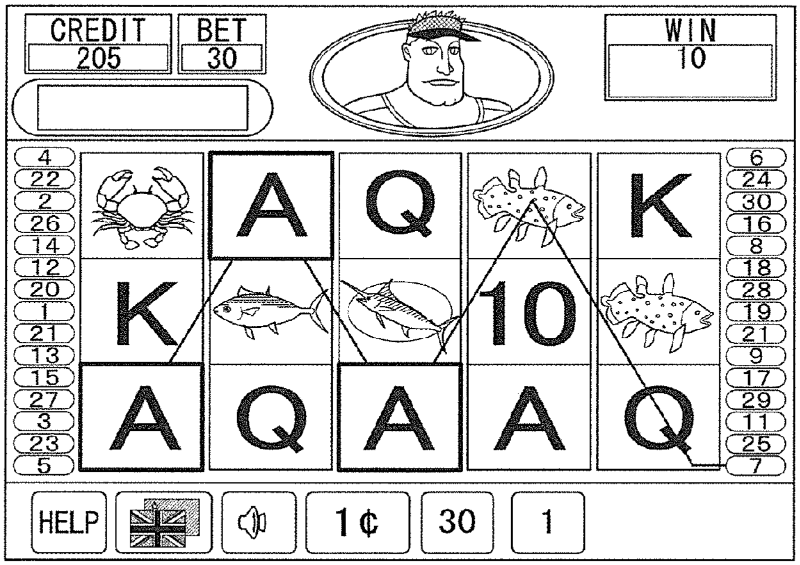
Figure 82B:
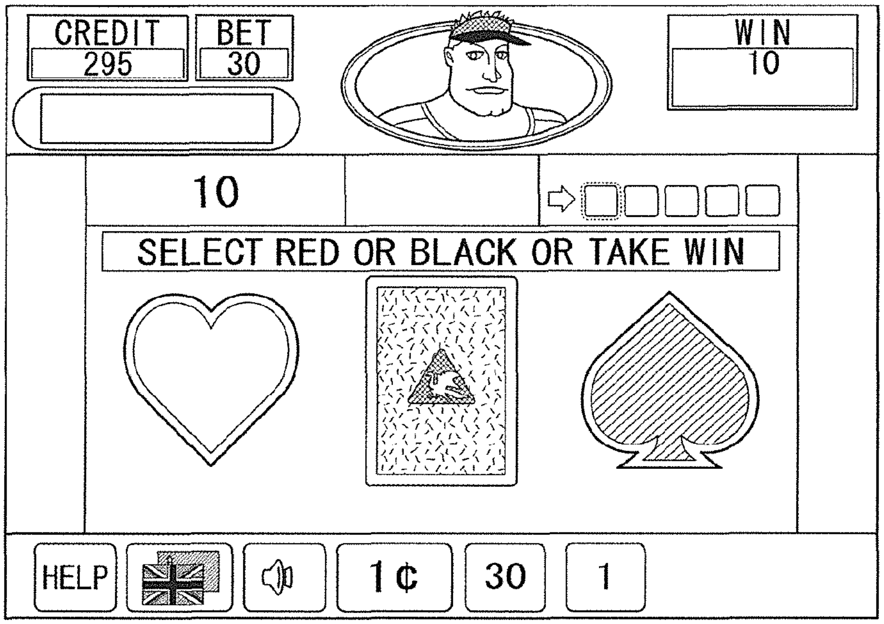
Figure 82C:
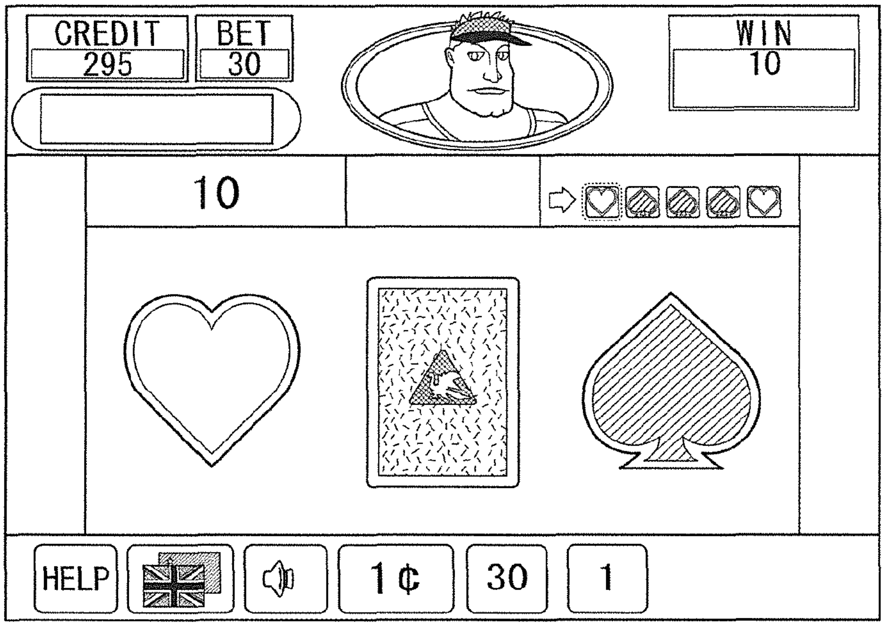
Figure 82D:
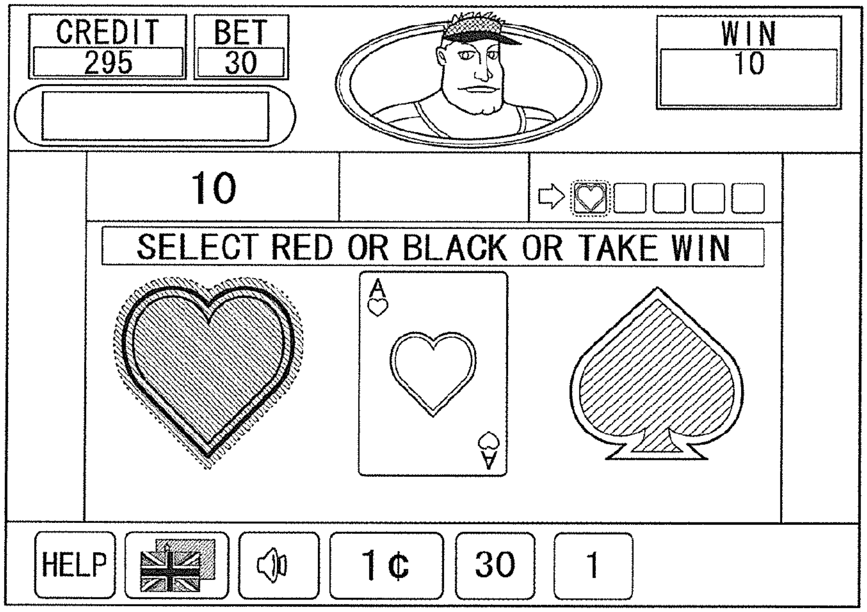
Figure 82E:
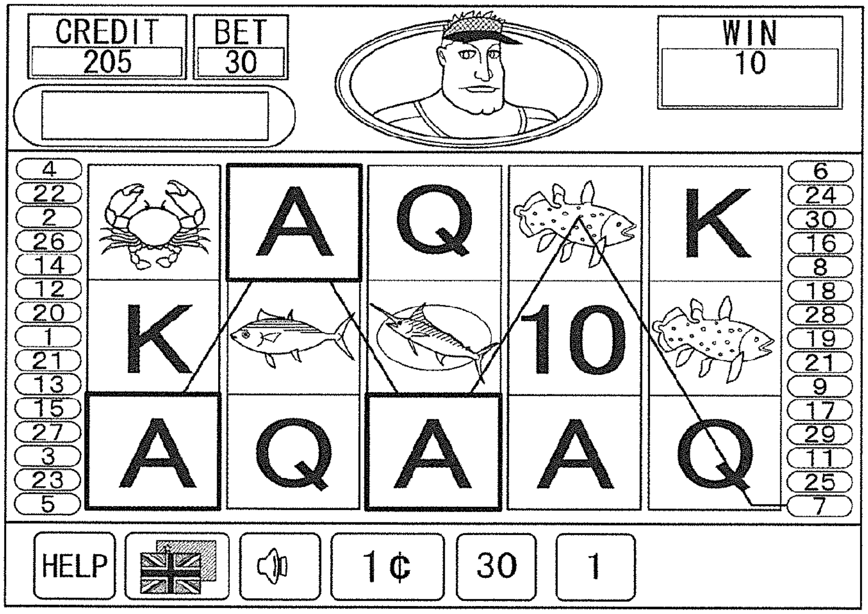
Figure 82F:
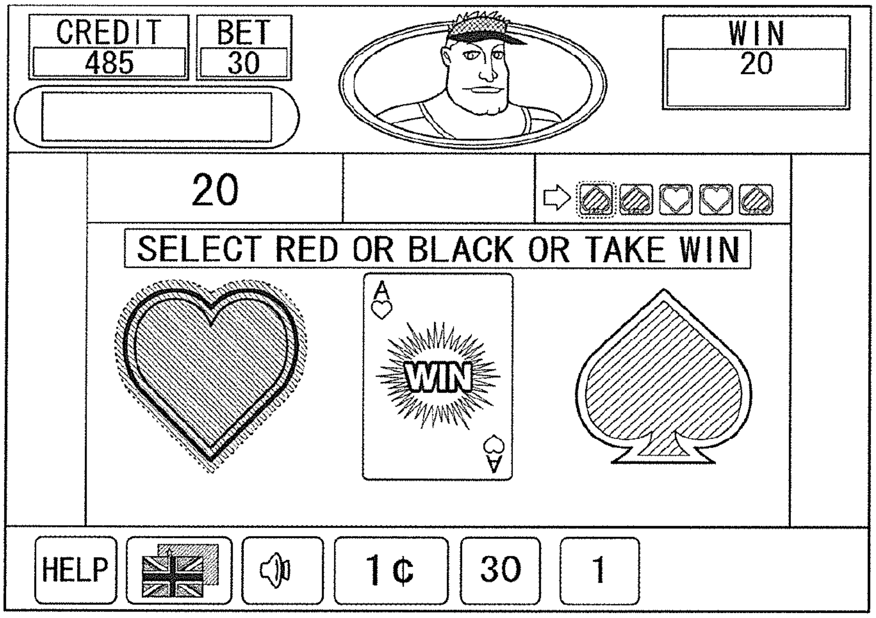

FIG. 82F illustrates a gamble game.

Figure 82G:
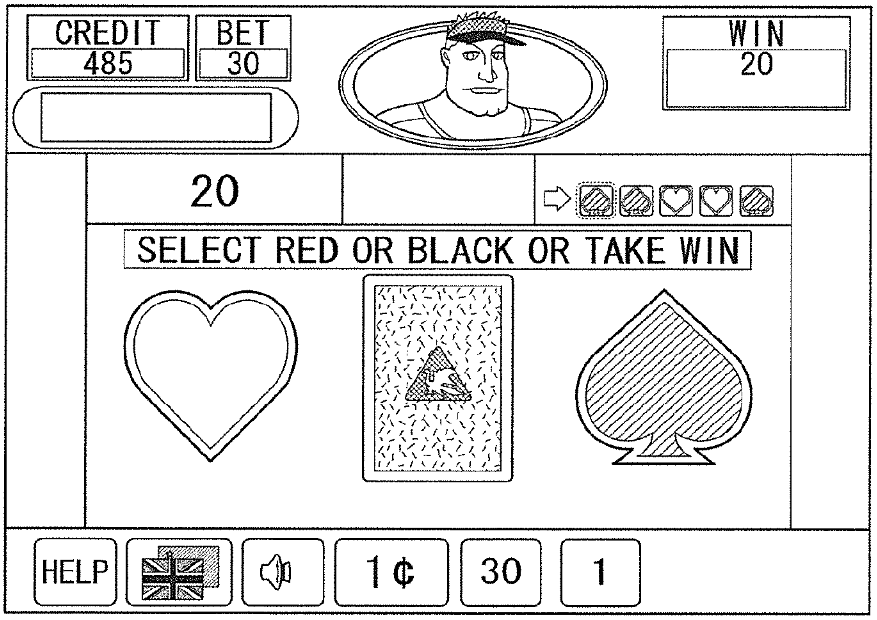

FIG. 82G illustrates a gamble game.

Figure 83:
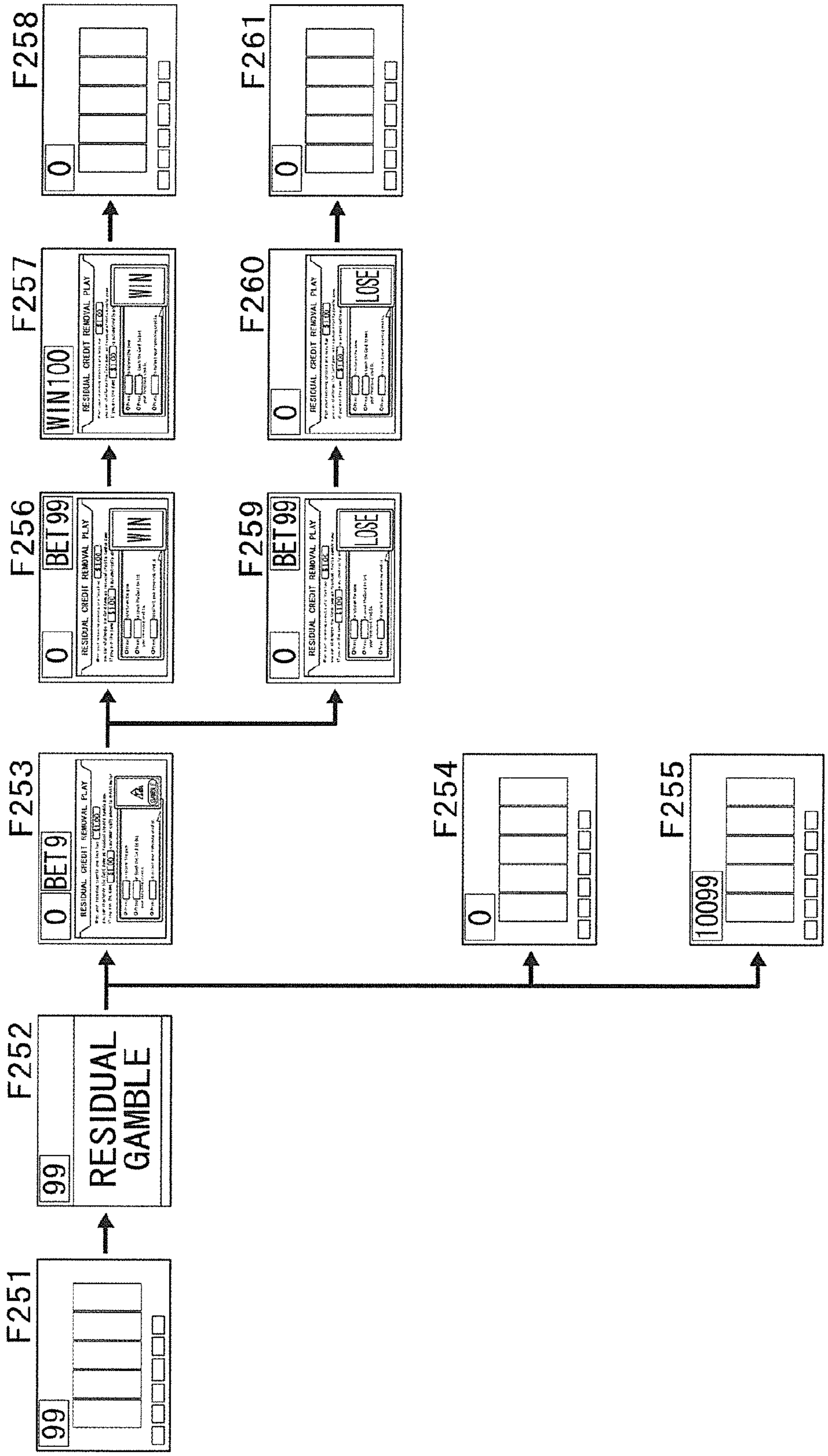

FIG. 83 is a flowchart of a gamble game.

Figure 84:
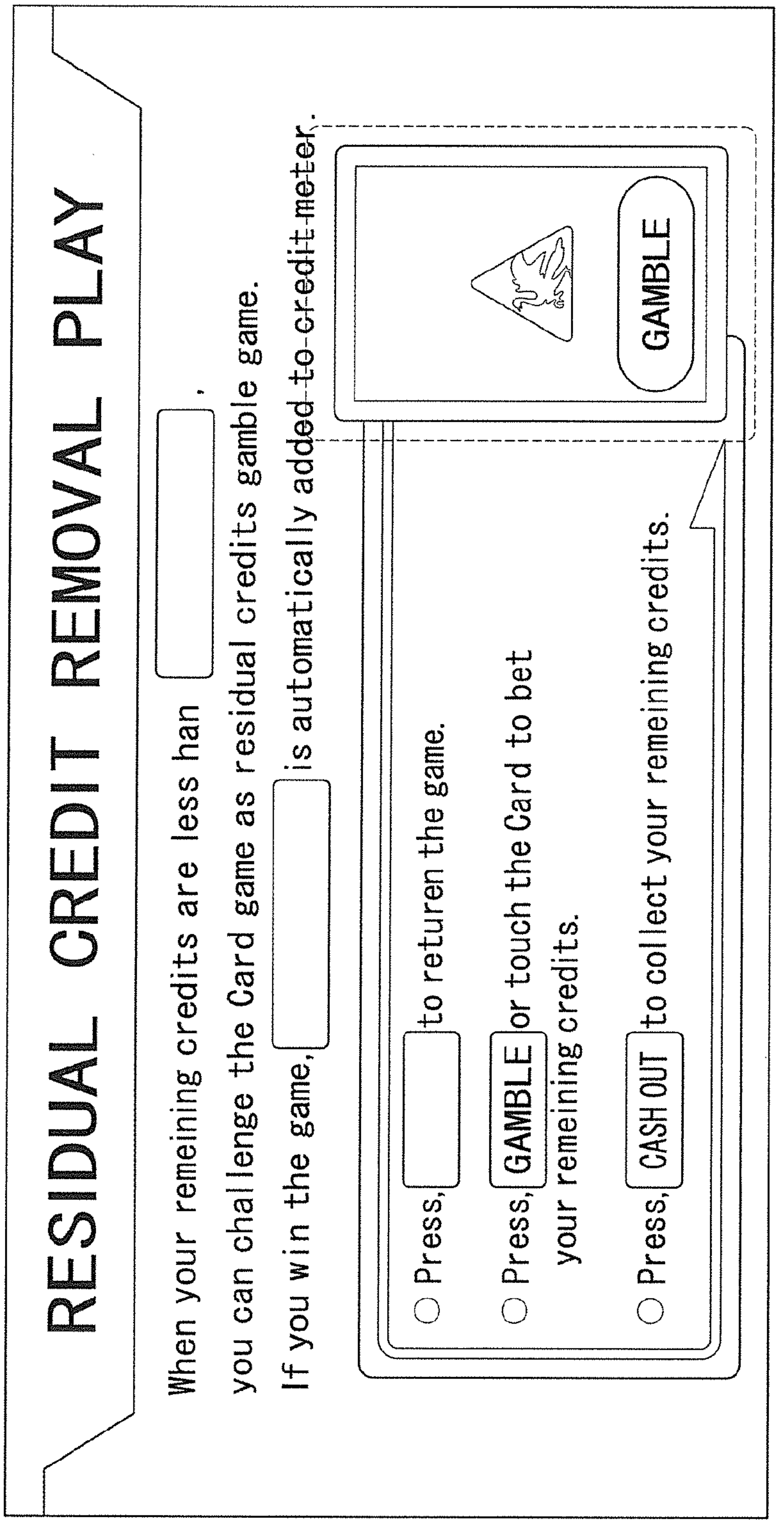

FIG. 84 illustrates a screen in a gamble game.

Figure 85:
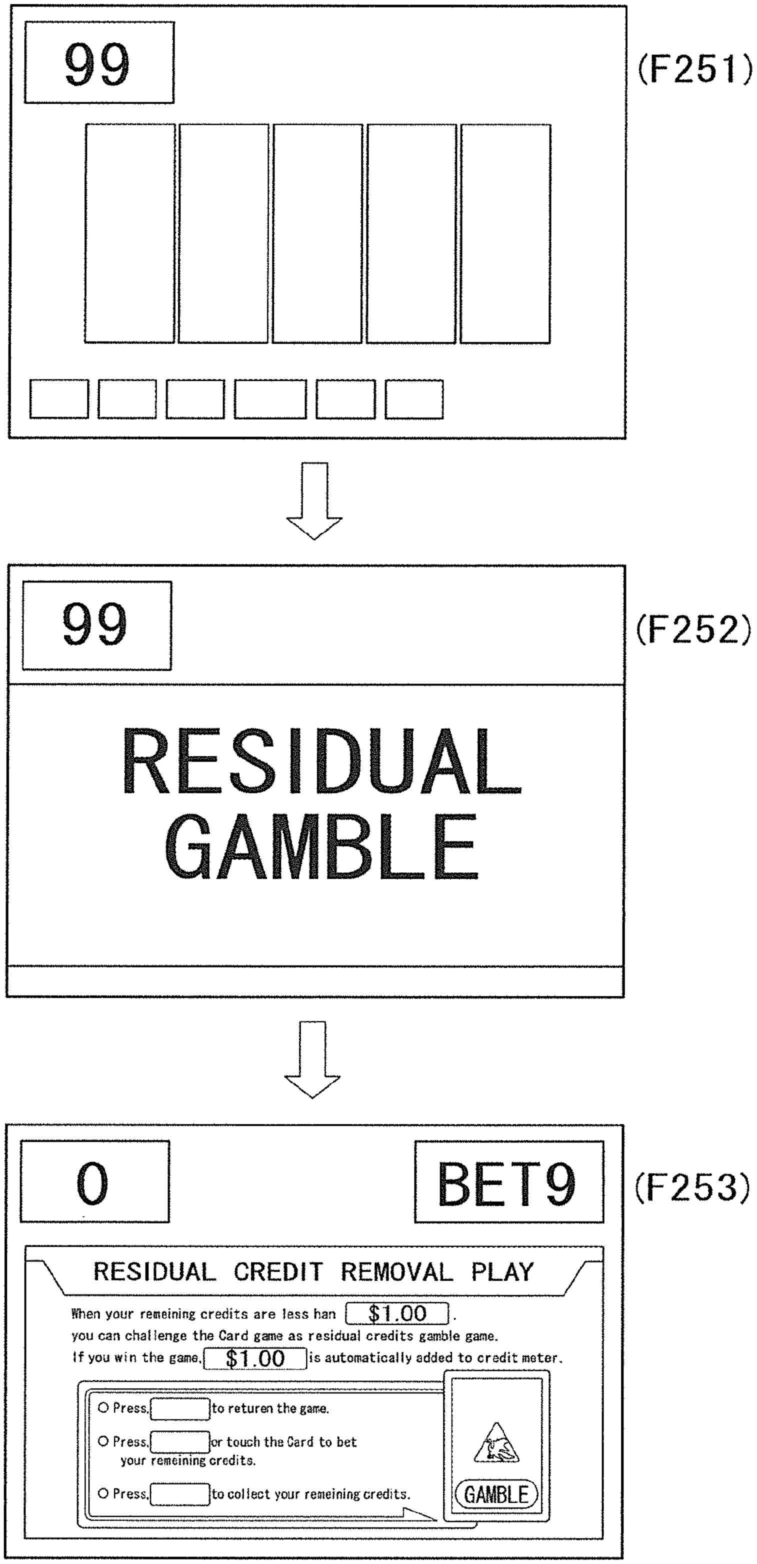

FIG. 85 illustrates operation steps of the gamble game.

Figure 86:
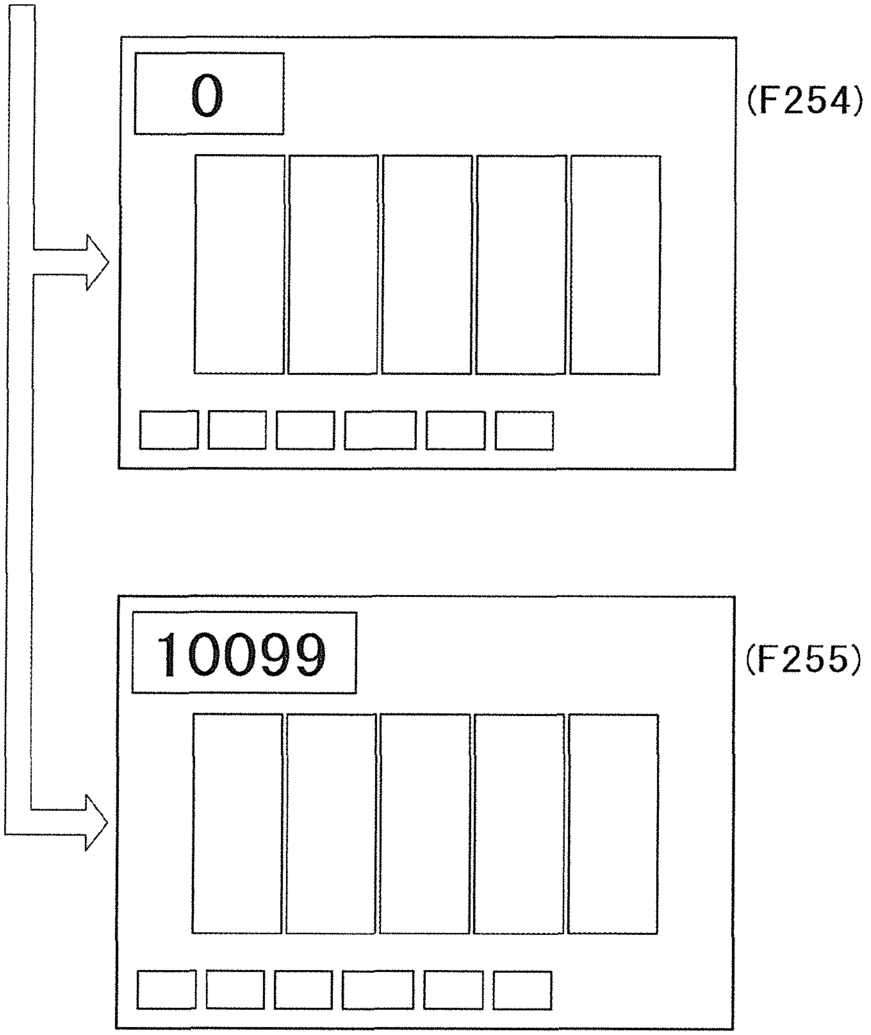

FIG. 86 illustrates operation steps of the gamble game.

Figure 87:
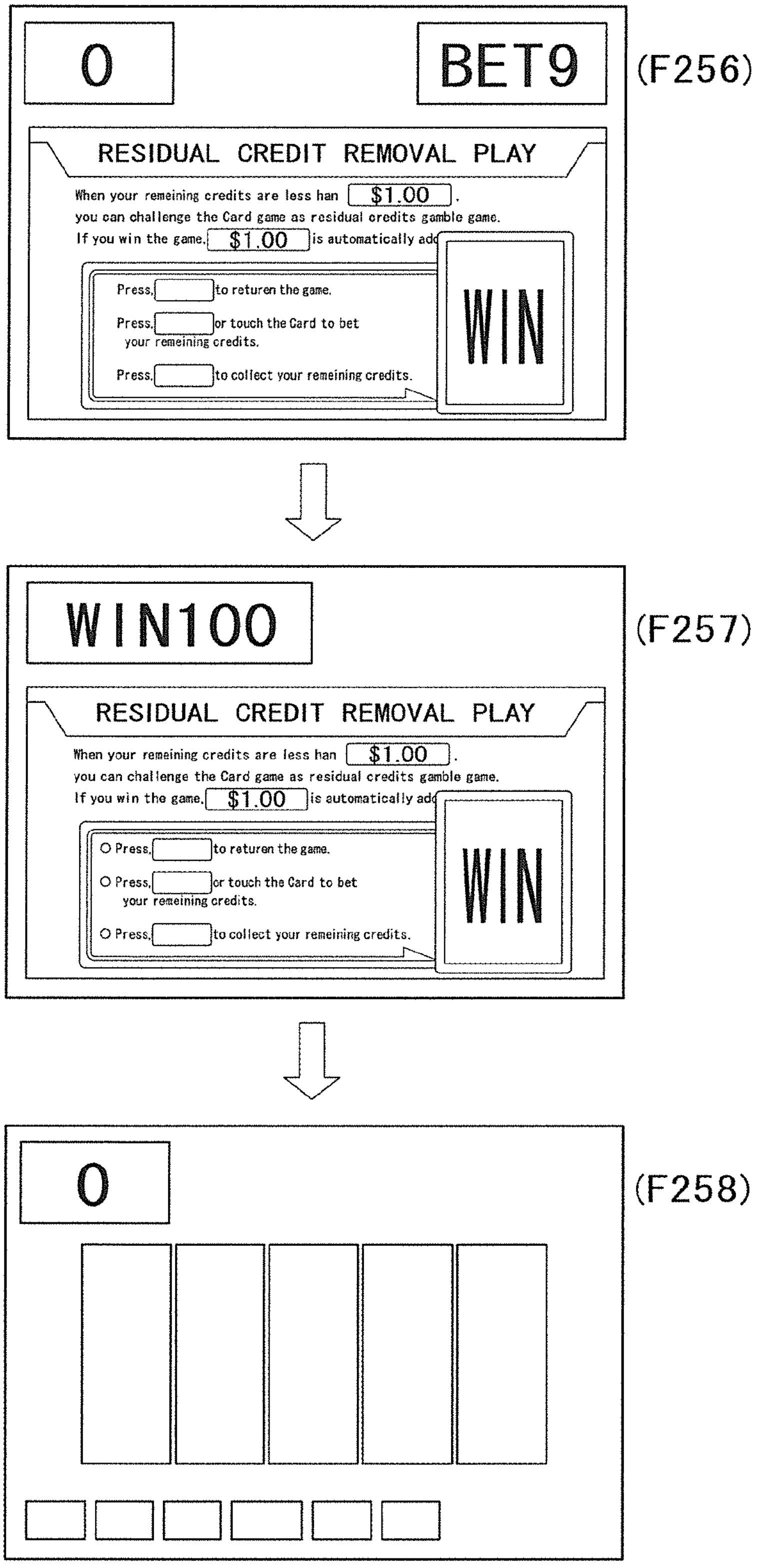

FIG. 87 illustrates operation steps of the gamble game.

Figure 88:
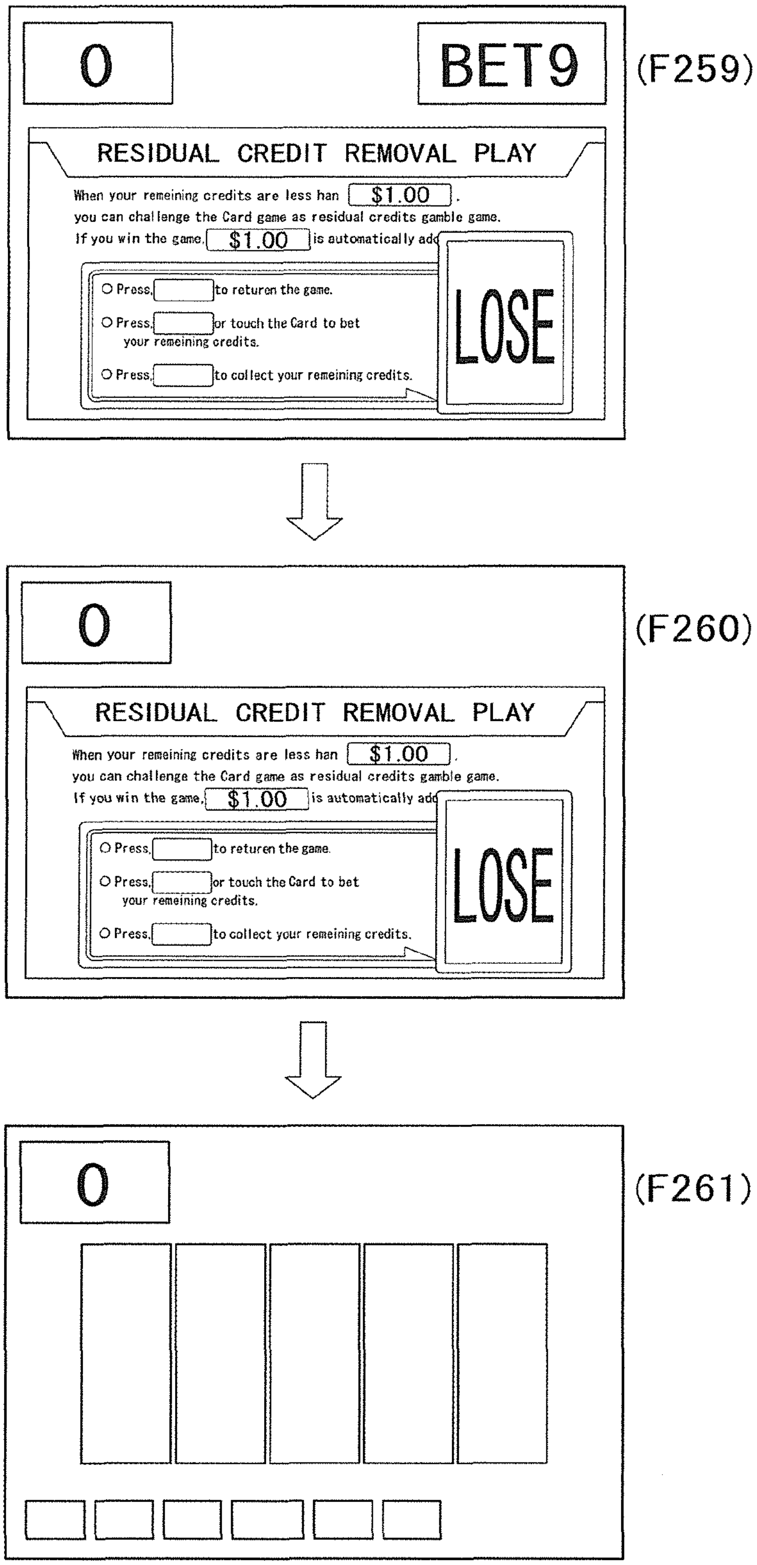

FIG. 88 illustrates operation steps of the gamble game.

DESCRIPTION OF THE PREFERRED EMBODIMENTS

The following will describe a gaming machine of the present invention with reference to figures.

(Outline of Gaming Machine)

Figure 1:
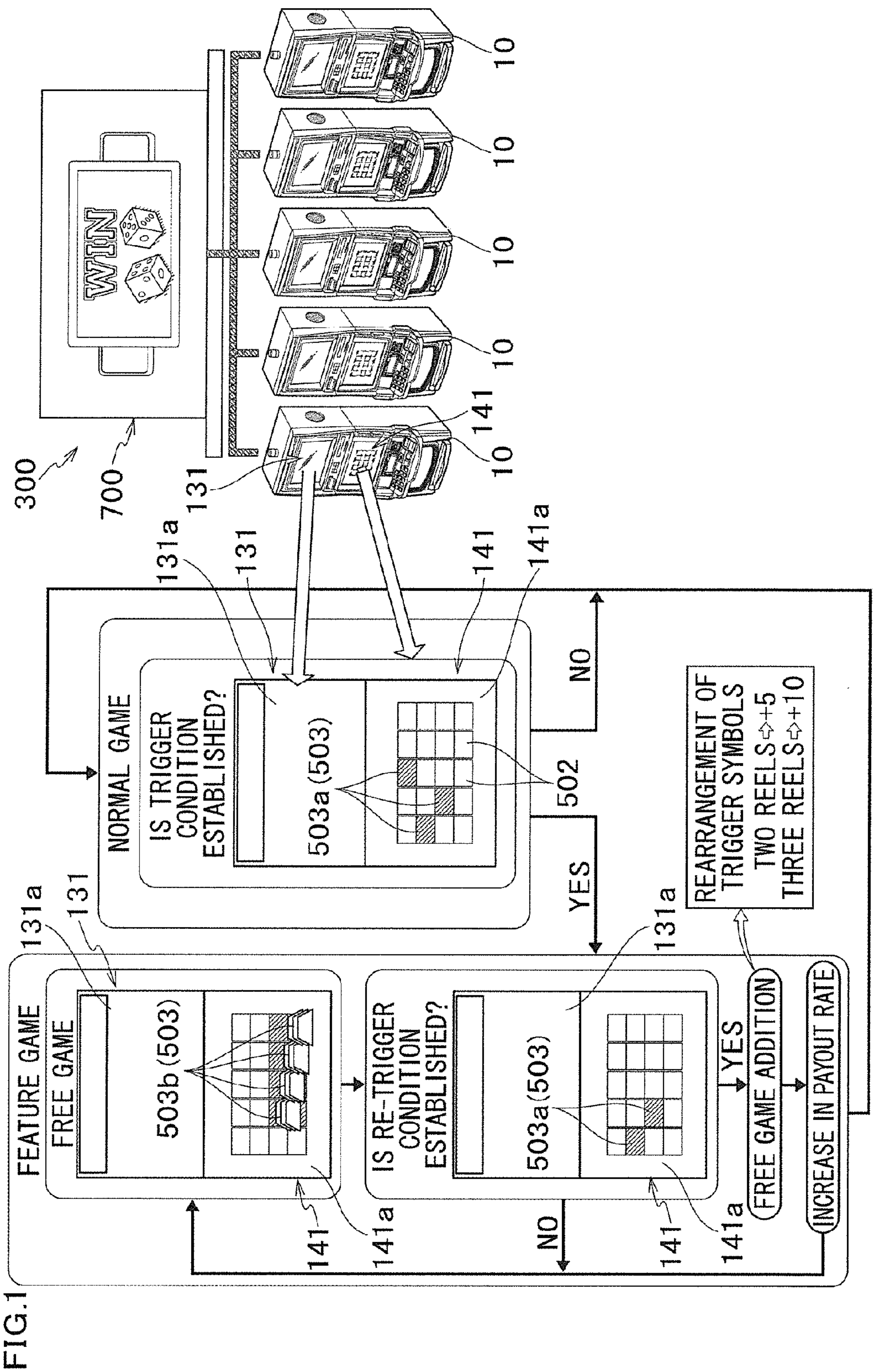
FIG. 1 illustrates an operation state of a gaming machine.

As shown in FIG. 1, when a trigger condition is established in a normal game, the gaming machine 300 executes: a process of shifting to a bonus game in which a re-trigger condition which is less stringent than the trigger condition may be established; in the bonus game, a process of executing a free game at least once; and increasing the number of times of execution of the free game in the bonus game when the re-trigger condition is established in the bonus game. In addition to the above, the gaming machine 300 is arranged to increase the payout rate of the free game in the bonus game and to increase the number of times of execution of the free game in the bonus game, when the re-trigger condition is established in the bonus game.

In this regard, the phrase "re-trigger condition which is less stringent than the trigger condition" indicates that the re-trigger condition is established at an establishment probability higher than the probability of the establishment of the trigger condition. The term "establishment probability" indicates a probability of which the execution of a normal game or a bonus game results in the establishment of the trigger condition or the re-trigger condition. For example, the trigger condition is the rearrangement of trigger symbols on a predetermined number or more of neighboring reels, whereas the re-trigger condition is the rearrangement of the trigger symbols on reels fewer in number than the predetermined number of reels in the trigger condition. Alternatively, for example, the trigger condition is the rearrangement of the trigger symbols on a predetermined number or more of successive different reels, whereas the re-trigger condition is the rearrangement of the trigger symbols on reels fewer in number than the predetermined number of reels in the trigger condition.

To more specifically describe the arrangement above, a gaming machine 300 is a multi-player gaming machine in which a plurality of slot machines 10 that are gaming terminals are connected to a center controller 200 (FIG. 2 and FIG. 3) to be able to communicate with one another. The gaming machine 300 is able to run a base game such as a slot game at each slot machine 10 and run a common game at a common display device 701 or the like while synchronizing the slot machines 10. The slot machines 10 and the center controller 200 are connected wireless, by wires, or by both of them. A unit of bet amount may be a currency of a country or area such as dollar, yen, euro, or the like, or may be a game point used exclusively in a hall having the gaming machine 300 or in the industry.

Figure 2:
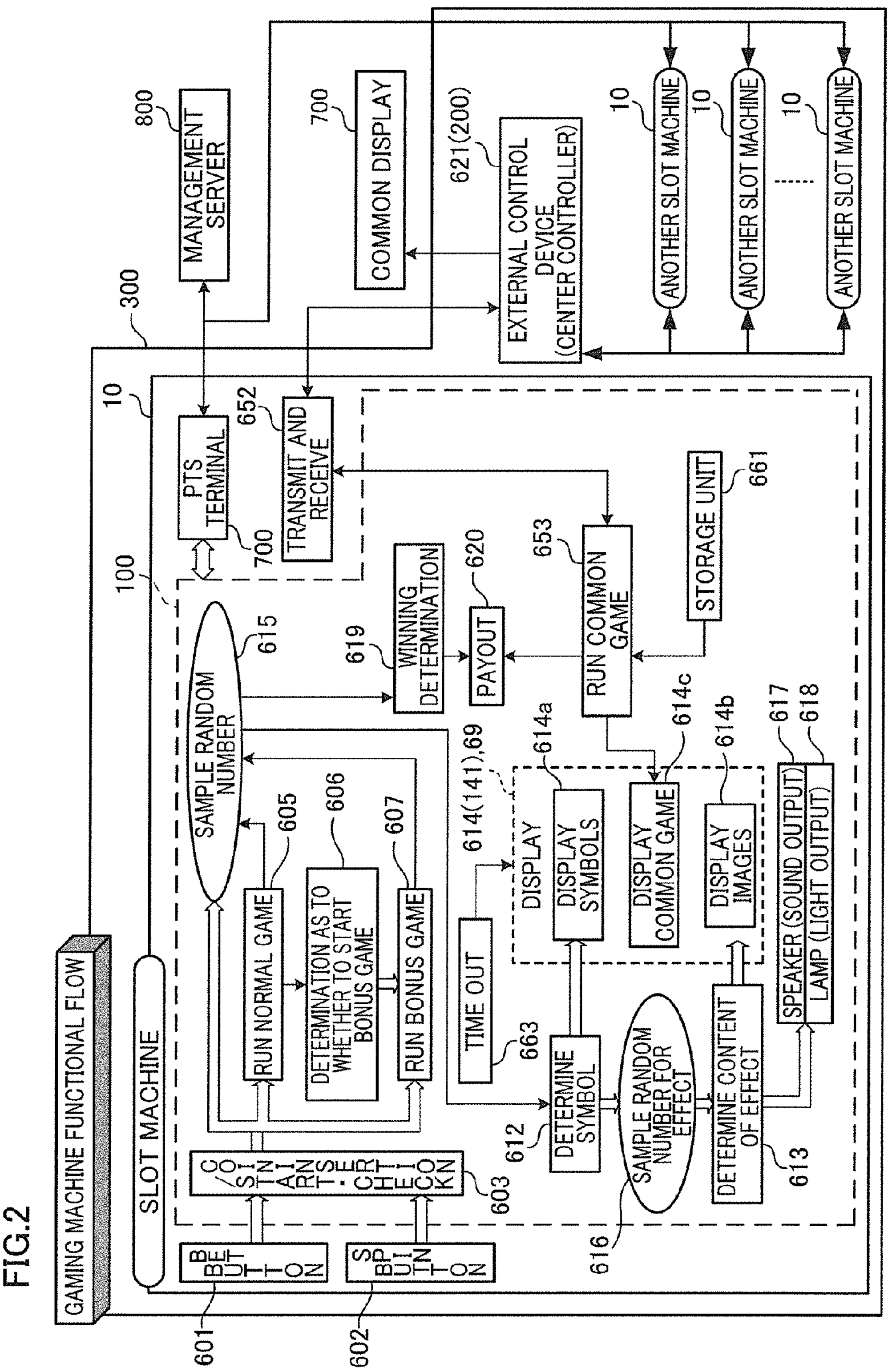
FIG. 2 is a diagram showing a function flow of the gaming machine of the present invention.

More specifically, as shown in FIG. 2, the gaming machine 300 includes a lower image display panel 141 (symbol display device) including reels on which symbols including a trigger symbol are variably displayed and rearranged, and a game controller 100 programmed to execute the processes (a1) to (a5) below.

In regard to the processes (a1) to (a5) executed by the game controller 100 of the slot machine 10, the process (a1) is a process for running a game by rearranging the symbols on the lower image display panel 141. In the process (a2), whether a trigger condition indicating that the predetermined number of reels on each of which the trigger symbol is rearranged neighbor one another is established in the normal game or not is determined. In the process (a3), when determined that the trigger condition is established, the free game is executed for a predetermined number of times as the bonus game. In the process (a4), each time the free game is executed in the bonus game, whether the re-trigger condition indicating that the trigger symbols are rearranged on the reels fewer in number than the predetermined number is established or not is determined. In the process (a5), when determined that the re-trigger condition is established, the payout rate of the free game in the bonus game is increased.

According to the arrangement above, when the trigger condition is established in the normal game, the normal game shifts to the bonus game, and the free game is executed for the predetermined number of times in the bonus game. When the re-trigger condition is established in the free game, payout rate of the free game in the bonus game is increased. In this connection, the trigger condition is the rearrangement of the trigger symbols on the predetermined number or more of neighboring reels, whereas the re-trigger condition is the rearrangement of the trigger symbols on the reels which are fewer in number than the predetermined number in the trigger condition. Therefore, because the establishment probability of the re-trigger condition is higher than the establishment probability of the trigger condition, after the shifting from the normal game to the bonus game, the re-trigger condition is established more frequently than the re-trigger condition in the normal game, and the player clearly realizes that the bonus game becomes more valuable on account of the increase in the payout rate of the free game. This makes it possible to realize highly entertaining game play because the player's enjoyment at the time of the shifting to the bonus game is enhanced.

Figure 3:
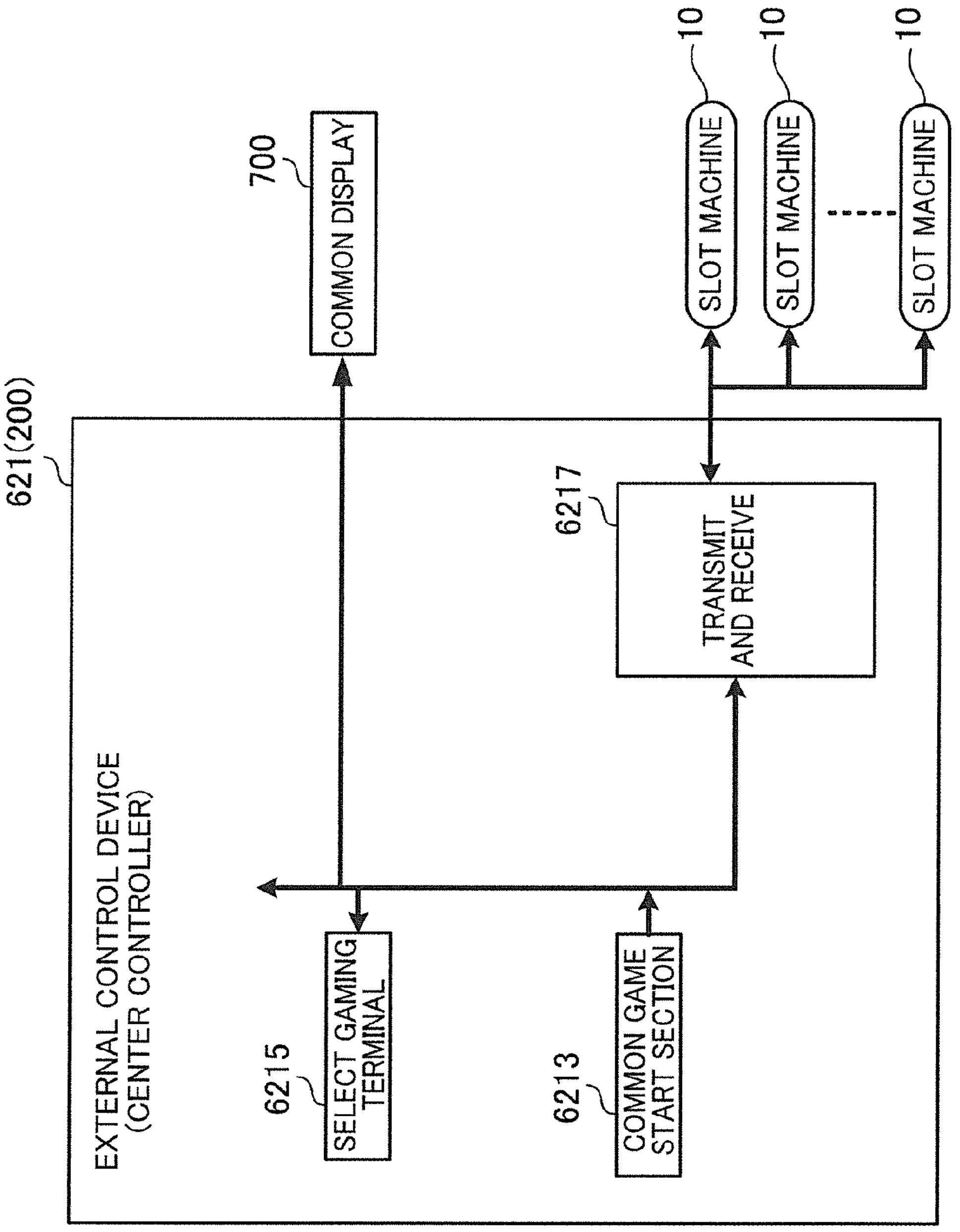
FIG. 3 is a diagram showing a function flow of the gaming machine of the present invention.

Alternatively, as shown in FIG. 1 to FIG. 3, the common game may be replaced with a base game, and the base game and the common game may be executed in a parallel manner. Furthermore, while in the present embodiment the gaming machine 300 includes the center controller 200 in addition to the slot machines 10, the disclosure is not limited to this arrangement. The gaming machine 300 may be arranged such that one or more slot machine 10 has the function of the center controller 200 and the slot machines 10 are connected to be able to communicate with one another. Alternatively, the gaming machine may be a single slot machine 10.

(Outline of Gaming Machine: Definitions)

The slot machine 10 above is a kind of the gaming terminals in the gaming machine 300. Although the present embodiment deals with the slot machine 10 as an example of the gaming terminal, the disclosure is not limited to this and any type of device having a game controller 100 that is able to independently run a base game may be used as the gaming terminal.

A base game of the present embodiment is run by the slot machine 10. The base game is a slot game of rearranging a plurality of symbols. The base game is not limited to the slot game but is any type of games capable of being independently run at a gaming terminal such as the slot machine 10. In other words, the base game is a game in contrast to the common game. For example, a normal game and a bonus game that are described later are types of the base game.

The rearrangement of the symbols in the slot game is performed on the lower image display panel 141. The slot game includes: a process of executing a normal game of rearranging symbols on the lower image display panel 141 when a game value is bet and awarding a normal payout in accordance with the rearranged symbols; a process of, when the symbols are rearranged in a predetermined condition in the normal game, i.e., when a trigger condition is established, shifting to a bonus game in which a re-trigger condition which is less stringent than the trigger condition may be established; and a process of, when the re-trigger condition is established in the bonus game, increasing a benefit awarded to the player in the bonus game.

To be more specific, in the slot game, a feature game is executed as a bonus game. In the feature game, a free game is executed at least once. Therefore, the slot game includes a process of, when the trigger condition is established, shifting to the feature game (bonus game) in which the re-trigger condition which is less stringent than the trigger condition may be established; a process of executing the free game at least once in the feature game; and a process of, when the re-trigger condition is established in the feature game, increasing the payout rate of the free game in the feature game.

While the present embodiment deals with the slot game in which the normal game and the feature game (bonus game) are executed, in the slot game a bonus game different from the feature game may be executed in place of or in addition to the feature game. For example, the slot game may include a process of rearranging symbols in a condition in which the payout rate is higher than the payout rate in the normal game and a process of executing a bonus game of awarding a bonus payout in accordance with the rearranged symbols. Furthermore, the slot game may include a process of executing a rescue process when a rescue start condition is established.

Symbols 501 are constituted by a specific symbol 503 and a normal symbol 502. In other words, "symbol" is a superordinate concept to the specific symbol 503 and the normal symbol 502. The specific symbol 503 includes a wild symbol **503*b* and a trigger symbol 503*a*. The wild symbol 503*b* can be used as a substitute for any type of the symbol 501. The trigger symbol 503*a* is a symbol that triggers at least the execution of the bonus game. For example, the trigger symbol 503*a* functions as a trigger to shift the normal game to various types of the bonus game. In the present embodiment, the trigger condition and the re-trigger condition are established based on the trigger symbol 503*a*. In the present embodiment, furthermore, the trigger symbol 503*a* functions as a scatter symbol. That is to say, the trigger condition and the re-trigger condition are established based solely on the number of the rearranged trigger symbols 503*a***, irrespective of the payline.

The trigger symbol **503*a* may function as a trigger of increase in the number of the specific symbols 503 in the bonus game, i.e., increase in the number of the specific symbols 503 of at least one of the trigger symbol 503*a* and the wild symbol 503*b*. Furthermore, the trigger symbol 503*a* may function as a trigger of increase in the number of times to run the bonus game. The trigger symbol 503*a*** of the present embodiment causes the establishment of the re-trigger condition which triggers the increase in the number of times of execution of the free game in the feature game which is the bonus game.

A coin, a bill, or electrically valuable information corresponding to these is used as a gaming value. It is to be noted that the gaming value in the disclosure is not limited to these, and for example a medal, a token, electric money or the like can be adopted. Further, a later-described ticket with a barcode is also used. Alternatively, the gaming value may be a game point not including valuable information.

Although the bonus game is regarded to be equivalent to the feature game, the bonus game may be a game of a different type on condition that the gaming state is more advantageous than that of the normal game. Other types of the bonus game may be additionally employed as long as the gaming state is advantageous for the player, i.e., the gaming state is more advantageous than that of the normal game. For example, in the bonus game, various states such as a state in which more gaming values can be achieved as compared to the normal game, a state in which the probability of obtaining a gaming value is higher than the probability in the normal game, and a state in which the number of consumed gaming values is smaller than in the normal game are achieved independently or in combination.

The free game is a game which is executable with a smaller amount of gaming values bet than in the normal game. The expression "executable with a smaller amount of gaming value bet" includes a case where an amount of gaming values bet is zero. Therefore, the free game may be a game which is run without betting a gaming value and the gaming value is paid out for an amount corresponding to rearranged symbols. In other words, the free game may be a game that starts even if no gaming value is consumed. On the other hand, the normal game is run on condition that a gaming value is bet, and is a game of paying out gaming value for an amount corresponding to rearranged symbols. In other words, the normal game is a game that starts with the consumption of the gaming value.

The term "rearrangement" indicates that the symbols are rearranged after the arrangement of the symbols is dismissed. The term "arrangement" indicates a state in which the symbols are visually recognizable by an external player. More specifically, "rearrangement" is a state in which, after the symbols on the reels are variably displayed as the reels rotate, the variable display of the symbols stops as the rotation of the reels stops, and the symbols stop in the display window.

The phrase "normal payout based on the rearranged symbols 501" indicates a normal payout corresponding to a winning combination resulting from the rearrangement. The phrase "bonus payout based on the rearranged symbols 501" indicates a bonus payout corresponding to a winning combination resulting from the rearrangement. It is noted that the term "winning combination" indicates that a prize is established. Details of the winning combination will be given later.

Examples of "a condition in which the payout rate is higher than in the normal game" include the execution of a free game, increase in the number of the wild symbol 503*b* and the trigger symbol 503*a*, and the execution of a game using a symbol table. Examples of "rescue start condition" include a case where the normal game is excessively repeated, i.e., the normal game is repeated for a predetermined number or more of times and a case where the total amount of obtained payout is excessively small, i.e., the obtained normal payout and bonus payout are smaller than a predetermined amount after a single player repeats the game for a predetermined number or more of times. The rescue process is a process to relieve players. Examples of the rescue process include the execution of a free game, the increase in the number of the wild symbol 503*b* and the trigger symbol 503*a*, the execution of a game using a substituted symbol table, and the awarding of an insurance payout.

(Outline of Gaming Machine: Other Arrangements)

In addition to the above, the gaming machine 300 is arranged to increase the payout rate of the free game executed as the bonus game in accordance with the number of reels with which the re-trigger condition is established, when the re-trigger condition is established in the bonus game. More specifically, the game controller 100 of the gaming machine 300 includes a re-trigger data table shown in FIG. 11, in which the number and a combination of reels on which the trigger symbols 503*a* are rearranged, the number of times of execution of the game smaller than a predetermined number, and the rate of increase of the payout rate are associated with one another. In the process (a5), the rate of increase of the payout rate corresponding to the number of reels with which the re-trigger condition is established is calculated based on the re-trigger data table, and a value calculated by multiplying the payout rate by this rate of increase is used as a payout rate in the next execution of the free game. As such, after the shifting from the normal game to the bonus game, the gaming machine 300 increases the payout rate in accordance with the number of reels with which the re-trigger condition is established. This arrangement induces the player to be interested in the number of reels with which the re-trigger condition is established. It is noted that the payout rate multiplied by the rate of increase may be the payout rate of the free game of this time or the payout rate of the free game at the start of the bonus game.

In addition to the above, when the re-trigger condition is established in the bonus game, the gaming machine 300 increases the number of times of execution of the free game in accordance with a combination of reels. More specifically, in the process (a5), the additional number of times of execution of the game corresponding to the combination pattern of the reels with which the re-trigger condition is established is calculated based on the re-trigger data table, and this additional number of times is added to the number of times of execution of the free game. Because the gaming machine 300 can increase the number of times of execution of the free game in accordance with the combination of the reels, the game enjoyment is enhanced as compared to cases where the number of times of execution of the free game is increased always in the same way.

Furthermore, the gaming machine 300 is arranged to increase the payout rate of the free game based on the rank corresponding to the number of the rearranged trigger symbols 503*a*, when the re-trigger condition is established in the bonus game. More specifically, the game controller 100 of the gaming machine 300 includes a rank data table shown in FIG. 12, in which the number of rearranged trigger symbols 503*a* is associated with a rank. In the process (a5), a rank corresponding to the number of the rearranged trigger symbols 503*a* with which the re-trigger condition is established is calculated based on the rank data table, and a value calculated by multiplying the rank by the payout rate is added to the number of times of execution of the free game. As such, because the payout rate is multiplied by the rank corresponding to the number of the rearranged trigger symbols 503*a* and a payout of the free game is calculated based on the increased payout rate, the gaming machine 300 provides profound game enjoyment. It is noted that the payout rate multiplied by the rank may be the payout rate of the free game of this time or the payout rate of the free game at the start of the bonus game.

In addition to the above, the gaming machine 300 adds the number of times of execution of the free game based on the rank corresponding to the number of the rearranged trigger symbols 503*a*, when the re-trigger condition is established in the bonus game. More specifically, in the process (a5), calculates, based on the rank data table, the rank corresponding to the number of the rearranged trigger symbols 503*a* with which the re-trigger condition is established, and increases the number of times of execution of the free game by a number calculated by multiplying the additional number of times of the game by the rank. As such, the game enjoyment of the gaming machine 300 is enhanced as the number of times of execution of the free game to be added is finely adjustable on account of the use of the number calculated by multiplying the additional number of times of the game by the rank.

In addition to the above, the gaming machine 300 executes a bonus game using reels having more wild symbols 503*b* than the number of the wild symbols 503*b* in the normal game. More specifically, the gaming machine 300 includes a symbol data storage which is configured to store symbol data of different types of symbols including the trigger symbol 503*a* and the wild symbol 503*b*. The type and number of the symbols on the symbol display device are changeable by using the symbol data. When the trigger condition is not established in the process (a3), the game controller 100 executes the bonus game by using the symbol display device on which more wild symbols 503*b* are provided as compared to the normal game. This makes it possible to realize flexible game enjoyment by taking advantage of the employment of video reels instead of mechanical reels.

More specifically, the gaming machine 300 includes a symbol data storage configured to store symbol data of different types of symbols including the trigger symbol 503*a* and the wild symbol 503*b*, a symbol display device having on which the number and type of symbols are changeable using the symbol data, which includes reels on which symbols are variably displayed and rearranged; and a controller which includes a re-trigger data table in which combination patterns of reels on which the trigger symbols 503*a* are rearranged are associated with additional numbers of times of execution of the game smaller than the predetermined number and is programmed to execute the processes (a1) to (a5) below. In the process (a1), the normal game is executed by rearranging the symbols on the symbol display device. In the process (a2), whether the trigger condition indicating that a predetermined number or more of reels on which the trigger symbols 503*a* are rearranged neighbor one another is established in the normal game or not is determined. In the process (a2-1), when determined that the trigger condition is established, the number of the wild symbols 503*b* is increased as compared to the number in the normal game, except at the first stages of the reels on the symbol display device. In the process (a3), when determined that the trigger condition is established, the free game is executed for a predetermined number of times using the symbol display device with the wild symbols 503*b* that are increased in number in the process (a2-1). In the process (a4), each time the free game is executed in the bonus game, whether the re-trigger condition indicating that the trigger symbols 503*a* are rearranged on neighboring reels that are smaller in number than the predetermined number is established or not is determined. In the process (a5), when determined that the re-trigger condition is established, an additional number of times of execution of the game corresponding to the combination pattern of the reels with which the re-trigger condition is established is calculated based on the re-trigger data table, and the calculated additional number of times of execution of the game is added to the number of times of execution of the free game which is executed as the bonus game, and the payout rate of the free game executed as the bonus game is increased.

The arrangement above makes it possible to realize flexible game enjoyment by taking advantage of the employment of video reels instead of mechanical reels, and to finely adjust the number of times of execution of the free game to be added when the re-trigger condition is established in the bonus game. Furthermore, as the payout rate of the free game in the bonus game is increased, the player realizes the increase in the value of the bonus game.

In addition to the above, the gaming machine 300 may be arranged such that, when the re-trigger condition is established, the payout rate of the free game executed as the bonus game may be increased in accordance with a predetermined rule. More specifically, the gaming machine 300 includes a symbol display device having reels on which symbols including a trigger symbol 503*a* are variably displayed and rearranged and a controller programmed to execute the following processes (a1) to (a5). In the process (a1), the normal game is executed by rearranging symbols on the symbol display device. In the process (a2), whether a trigger condition is established in the normal game is determined. In the process (a3), when the trigger condition is established, the free game is executed for a predetermined number of times as the bonus game. In the process (a4), each time the free game is executed in the bonus game, whether a re-trigger condition which is more likely to be established than the trigger condition is established is determined. In the process (a5), when the re-trigger condition is established, the payout rate of the free game executed as the bonus game is increased in accordance with a predetermined rule.

In this regard, the “predetermined rule” may define that, for example, the payout rate is increased at a predetermined rate each time the re-trigger condition is established, a predetermined value is added to the payout rate, or the payout rate is increased based on how many times the re-trigger condition is established.

According to the arrangement above, when the trigger condition is established in the normal game, shifting to the bonus game occurs, and in this bonus game the free game is executed for a predetermined number of times. When the re-trigger condition is established in the free game, the payout rate of the free game in the bonus game is increased. In this regard, because the re-trigger condition is more likely to be established as compared to the trigger condition, the re-trigger condition is more frequently established after the shifting from the normal game to the bonus game, as compared to the re-trigger condition in the normal game. For this reason, the player realizes the increase in the value of the bonus game as the payout rate of the free game is increased based on the predetermined rule. This realizes a highly entertaining game that enhances the player’s enjoyment at the shifting to the bonus game.

The gaming machine 300 arranged as described above realizes a game control method of: executing the normal game by rearranging symbols on the symbol display device; determining whether a trigger condition indicating that trigger symbols are rearranged on at least a predetermined number of successive different reels in the normal game; when the trigger condition is established, executing the free game for a predetermined number of times as the bonus game; each time the free game is executed in the bonus game, determining whether a re-trigger condition indicating that trigger symbols are rearranged on reels the number of which is smaller than the predetermined number is established; and when the re-trigger condition is established, increasing the payout rate of the free game executed as the bonus game.

According to the game control method, when the trigger condition is established in the normal game, the shifting to the bonus game occurs, and in this bonus game the free game is executed for a predetermined number of times. When the re-trigger condition is established in the free game, the payout rate of the free game in the bonus game is increased. In this connection, the trigger condition indicates that the trigger symbols are rearranged on a predetermined number or more of neighboring reels, whereas the re-trigger condition indicates that the trigger symbols are rearranged on reels the number of which is smaller than the predetermined number in the trigger condition. The establishment probability of the re-trigger condition is therefore higher than the establishment probability of the trigger condition. For this reason, after the shifting from the normal game to the bonus game, the re-trigger condition is more frequently established as compared to the re-trigger condition in the normal game, and hence the player realizes the increase in the value of the bonus game on account of the increase in the payout rate in the free game. This realizes a highly entertaining game in which the player's enjoyment at the shifting to the bonus game is enhanced.

(Outline of Gaming Machine: Increase Pattern of Wild Symbols 503*b*)

The number of the wild symbols 503*b* may be increased in accordance with a first wild increase pattern with which the number of the symbols is increased only on a particular reel, a second wild increase pattern with which the number of the symbols is increased on all reels, or a third wild increase pattern with which the number of the symbols is increased on reels included in a predetermined combination. These first to third wild increase patterns may be set in advance by a setting switch, or may be randomly set when the trigger condition is established. The increase of the wild symbols 503*b* may be done by successively rearranging the wild symbols 503*b* on one reel or rearranging the wild symbols 503*b* in a scattered manner. Whether to increase the number of the symbols in the successive manner or in the scattered manner may be randomly determined when the trigger condition is established.

In the first wild increase pattern, one of the first reel to the fifth reel is selected as a specific reel, and the number of the wild symbols 503*b* is increased on this specific reel. The specific reel may be selected in advance by using a selection switch or may be randomly selected when the trigger condition is established. Alternatively, a trigger condition is associated with each of the first reel to the fifth reel, and the specific reel is selected in accordance with the established trigger condition. For example, combination patterns of the reels are associated with the first to fifth reels, and the specific reel is selected based on the combination pattern of the reels with which the trigger condition is established as the execution result of the normal game. The specific reel is preferably not the first reel. This is because, if the number of the wild symbols 503*b* is increased on the first reel, an award is too easily established and the player notices the establishment of an award in an early stage of the game, when the reels stop serially from the first reel to the fifth reel.

In the second wild increase pattern, all of the first reel to the fifth reel are specified as the specific reels, and the number of the wild symbols 503*b* is increased on these specific reels. In the second wild increase pattern, the number of the wild symbols 503*b* may be equally increased on all reels or may be differently increased on the reels. How many wild symbols 503*b* is increased may be determined in advance, may be randomly determined when the trigger condition is established, or may be determined in accordance with a combination pattern of reels.

In the third wild increase pattern, a combination of at least one reel selected from the first reel to the fifth reel is selected as a specific reel, and the number of the wild symbols 503*b* is increased on this specific reel. A combination of reels used as the specific reel in the third wild increase pattern may be determined in advance or may be randomly determined when the trigger condition is established. In the third wild increase pattern, the number of the wild symbols 503*b* may be equally increased on all specific reels or may be differently increased on the specific reels. How many wild symbols 503*b* is increased may be determined in advance, may be randomly determined when the trigger condition is established, or may be determined in accordance with a combination pattern of specific reels.

The increase in the number of the wild symbols 503*b* based on the first to third wild increase patterns described above may be conducted when a second trigger condition is established in the bonus game. The number of the increased wild symbols 503*b* when the second trigger condition is established may be identical with or different from the number of the increased wild symbols 503*b* when the first trigger condition is established.

(Function Flow of Gaming Machine 300: Slot Machine)

The gaming machine 300 arranged as above includes, as shown in FIG. 2, slot machines 10 and an external controller 621 (center controller 200) connected to the slot machines 10 to be able to communicate therewith. The external controller 621 is able to communicate with the slot machines 10 provided in a hall.

Each slot machine 10 includes a BET button 601, a spin button 602, and a display 614 (such as a lower image display panel 141 shown in FIG. 1), and further includes a game controller 100 configured to control these units. The BET button 601 and the spin button 602 are kinds of input devices. The slot machine 10 further includes a transceiver unit 652 that makes it possible to perform data communication with the external controller 621.

The BET button 601 above has a function of receiving a bet amount input by the player. The spin button 602 has a function of receiving an instruction to start a game such as a normal game in response to an operation by the player, i.e., a start operation. The display 614 has a function of displaying still image information such as various symbols 501, numbers, and characters and moving image information such as effect movies. Furthermore, the display 614 has a touch panel 69 as an input device, and has a function of receiving various instructions input by a pressing operation by the player. The display 614 has a symbol display region 614*a*, an image display region 614*b*, and a common game display region 614*c*. The symbol display region 614*a* displays a reel screen including the symbols 501 shown in FIG. 1. The image display region 614*b* displays various types of effect image information (including the common indication effect and the individual indication effect) executed during a game, by means of moving images and still images. The common game display region 614*c* displays a common game.

Although in the present embodiment the symbol display region 614*a*, the image display region 614*b*, and the lower image display panel 141 are provided on the same screen, the disclosure is not limited to this arrangement. The common game display region 614*c* may be formed together with the symbol display region 614*a* and the image display region 614*b*, or may appear as a substitute only when a common game is run.

The game controller 100 includes a coin insertion/start-check unit 603, a normal game running unit 605, a bonus game start determining unit 606, a bonus game execution unit 607, a random number sampling unit 615, a symbol determining unit 612, an effect-use random number sampling unit 616, an effect determining unit 613, a speaker unit 617, a lamp unit 618, a winning determining unit 619, and a payout unit 620.

The normal game running unit 605 has a function of running a normal game when an operation of the BET button 601 is made. The bonus game start determining unit 606 determines whether to run a bonus game, based on a combination of the symbols 501 rearranged in the normal game. That is to say, the bonus game start determining unit 606 has a function of determining that a bonus game is obtained when a trigger symbol 503*a* or the like is rearranged in a predetermined condition, and shifting the process to the bonus game execution unit 607 so that a bonus game is run from the next unit game.

It is noted that "unit game" is a series of operations from the start of the receiving of a bet to a state in which an award can be established. For example, a unit game in the normal game includes a single bet time for receiving a bet, a single game time of rearranging stopped symbols 501, and a single payout time of a payout process of awarding a payout. A unit game in the normal game is termed unit normal game.

The bonus game execution unit 607 has a function of running a bonus game in which a free game is repeated only by an operation of the spin button 602.

The symbol determining unit 612 has functions of: determining symbols to be rearranged with reference to a random number from the random number sampling unit 615; rearranging the determined symbols on the symbol display region 614*a* of the display 614; outputting rearrangement information of the symbols to the winning determining unit 619; and outputting an effect specifying signal to the effect-use random number sampling unit 616 based on the state of the rearrangement of the symbols.

The effect-use random number sampling unit 616 has a function of sampling an effect random number when receiving an effect instruction signal from the symbol determining unit 612 and a function of outputting the effect random number to the effect determining unit 613. The effect determining unit 613 has a function of determining the effect content by using the effect random number, an effect of outputting the image information of the determined effect content to the image display region 614*b* of the display 614, and a function of outputting audio/light information of the determined effect content to the speaker unit 617 and the lamp unit 618.

The winning determining unit 619 has a function of determining the presence of winning when obtaining rearrangement information of the symbols 501, which is a display state of rearrangement on the display 614, a function of calculating a payout amount based on the winning combination when it is determined that winning is achieved, and a function of outputting a payout signal to the payout unit 620 based on the payout amount. The payout unit 620 has a function of paying out a gaming value to the player, in the form of a coin, a medal, a credit, or the like. Furthermore, the payout unit 620 has a function of adding credit data corresponding to the credit to be paid out to credit data stored in an IC card inserted into the later-described PTS terminal 700.

In addition to the above, the game controller 100 includes a storage unit 661 that stores various types of bet amount data. The storage unit 661 stores data in a rewritable manner, e.g., a hard disc device and a memory.

In addition to the above, the game controller 100 has a common game running unit 653. The common game running unit 653 has functions of: outputting bet amount information based on a bet amount bet on a normal game to the external controller 621 in each unit base game; executing a common game in response to a game start command from the external controller 621; and receiving a bet input through the BET button 601 for a bet amount corresponding to bet amount data for a common game, which is stored in the storage unit 661 and is bettable on a common game.

In addition to the above, the game controller 100 is connected to the PTS terminal 700. The PTS terminal 700 is a unit in which an LCD, a microphone, a human body detection camera, etc. are integrated, and has, for example, a function of executing an effect for a game by mutual communications with the game controller 100. In particular, the PTS terminal 700 has a card slot to which an IC card can be inserted. With this, the player is able to insert a IC card into the card slot and use the credits stored in the IC card in the slot machine 10. The mechanical structure of the PTS terminal 700 will be described later.

In addition to the above, when receiving credit data from the PTS terminal 700, the game controller 100 updates the credit display on the display 614. Furthermore, the game controller 100 outputs settled credit data too the PTS terminal 700 when the credits on a game are settled.

Furthermore, the PTS terminal 700 of each of the slot machines 10 constituting the gaming machine 300 is connected to the management server 800 to be able to communicate each other, and centrally manages the download of images, IC cards and credits.

(Function Flow of Gaming Machine 300: External Controller)

The slot machine 10 arranged as above is, as shown in FIG. 3, connected to the external controller 621. The external controller 621 has a function of remotely operating and monitoring the operation state of each slot machine 10 and processes such as changes in game setting values. Furthermore, the external controller 621 has a function of determining a common game start condition for each gaming terminal which is the slot machine 10, and executing a common game at a plurality of slot machines 10 when a determination result at any gaming terminal satisfies the common game start condition.

More specifically, the external controller 621 includes a common game start unit 6213, a gaming terminal selection unit 6215, and a transceiver unit 6217. The common game start determining unit 6213 has functions of: determining whether the common game start condition is established based on the accumulated bet amount information sent from the slot machine 10 in each unit base game; outputting a game start command to a plurality of slot machines 10; and displaying on the common display device 701 states until the common game start condition is established.

The determination as to whether the common game start condition is established is based on the accumulated bet amount information or based on all accumulated values that increase as the unit base game is repeated. For example, the number of times of running the base game and the game time of the base game may be used as the accumulated values.

In addition to the above, the common game start unit 6213 has a function of outputting a game start command to the slot machine 10 in which an accumulated value that increases as a result of the repetition of the base game satisfies a game running condition. With this, because the right to participate in the common game is not awarded to a slot machine 10 in which the accumulated value is lower than the minimum setting value, the common game start unit 6213 motivates the player to actively repeat the base game.

In addition to the above, the common game start unit 6213 has a function of monitoring a non-input time in which no start operation is performed, and outputting the game start command to the slot machines 10 except to the slot machine 10 in which the non-input time is equal to or longer than a timeout time. With this, the common game start unit 6213 is able to determine that no player is at a slot machine 10 where the base game has not been played at least for the timeout time, and able to avoid the execution of the common game at such a slot machine 10.

The gaming terminal selection unit 6215 has a function of selecting a specific slot machine 10 from the slot machines 10 and outputting a common game start command signal to that specific slot machine 10. The common game start command signal provides the specific slot machine 10 with the right to start the common game. The transceiver unit 6217 has a function of exchanging data with the slot machines 10.

(Operations of Gaming Machine 300)

The operations of the gaming machine 300 having the functional blocks above will be described. While in the present embodiment the "gaming terminal" shown in the flowcharts indicates a slot machine 10 executing a slot game, the disclosure is not limited to this arrangement.

(Operations of Slot Machine 10)

A slot machine 10 which is a gaming terminal executes terminal-side processes. More specifically, to begin with, a base game process (e.g., normal game) is executed. That is, a series of operations below are executed.

(Coin-Insertion/Start-Check)

First, the slot machine 10 checks whether or not a BET button 601 has been pressed by a player, and subsequently checks whether or not a spin button 602 has been pressed by the player.

(Symbol Determination)

Next, when a spin button unit 602 has been pressed by the player, the slot machine 10 extracts a random number for symbol determination, and determines symbols to be displayed for the player at the time of stopping the scroll of the symbol array, for respective video reels displayed on a display unit 614.

(Symbol Display)

Then the slot machine 10 starts the scroll of the symbol array of each video reel, and stops the scroll so that the determined symbols 501 are displayed for the player.

(Winning Determination)

Subsequently, as the rotation of the symbol array of each video reel is stopped, the slot machine 10 determines whether the combination of the symbols 501 displayed for the player is a combination related to winning.

(Payout)

When the combination of the symbols 501 displayed for the player is a combination related to winning, the slot machine 10 offers, to the player, benefit according to the combination.

For example, when a combination of symbols related to a payout of coins has been displayed, the slot machine pays out coins of the number corresponding to the combination of symbols to the player.

Subsequently, whether to win a bonus combination is determined. When winning the bonus combination, a bonus game process is executed. On the other hand, when not winning the bonus combination, the normal game is run again. During a period in which the base game including such a normal game and bonus game is being run, execution state information indicating the start and end of the unit game such as the normal game and the bet amount on the unit game is transmitted to the external controller 621. With this, the external controller 621 centrally manages the execution state information of each slot machine 10.

(Operation of External Controller 621)

When the slot machines 10 operate as above, the external controller 621 executes the following center-side processes in synchronization with the slot machines 10.

To begin with, the external controller 621 receives the execution state information from each slot machine 10 and obtains the execution state of the base game. Thereafter, based on the number of the repetition of the base game, the accumulated bet amount, or the like, whether the common game start condition is established at any slot machine 10 is determined. When the common game start condition is not established, the acquisition of the execution state of the base game at each slot machine 10 is continued.

In the meanwhile, when the common game start condition is established, the game start command is simultaneously output to the slot machines 10 that satisfy the game running condition. Thereafter, a specific slot machine 10 is selected from the slot machines 10 satisfying the game running condition, and a common game start right instruction is output to the specific slot machine 10.

Thereafter, the external controller 621 waits for the common game start command to be supplied from the specific slot machine 10. Upon receiving the common game start command, the result of the common game is determined as a game result. The game result is, for example, win, lose, or draw. When the game result is not draw, at least a part of a draw game result is skipped among a series of temporarily-stored game results, and the remaining game results are serially output to the slot machines 10, as game result information.

Thereafter, based on the winning or losing game result, whether to win in the common game is determined. When lost, the execution state of the base game at each slot machine 10 is newly obtained. On the other hand, when won, a payout amount is calculated based on the bet amount bet on the common game at each slot machine 10, and the payout amount is sent to each slot machine 10 as payout information.

(Overall Structure of Game System)

A game system 350 including the gaming machine 300 having the functions above will be described.

Figure 4:
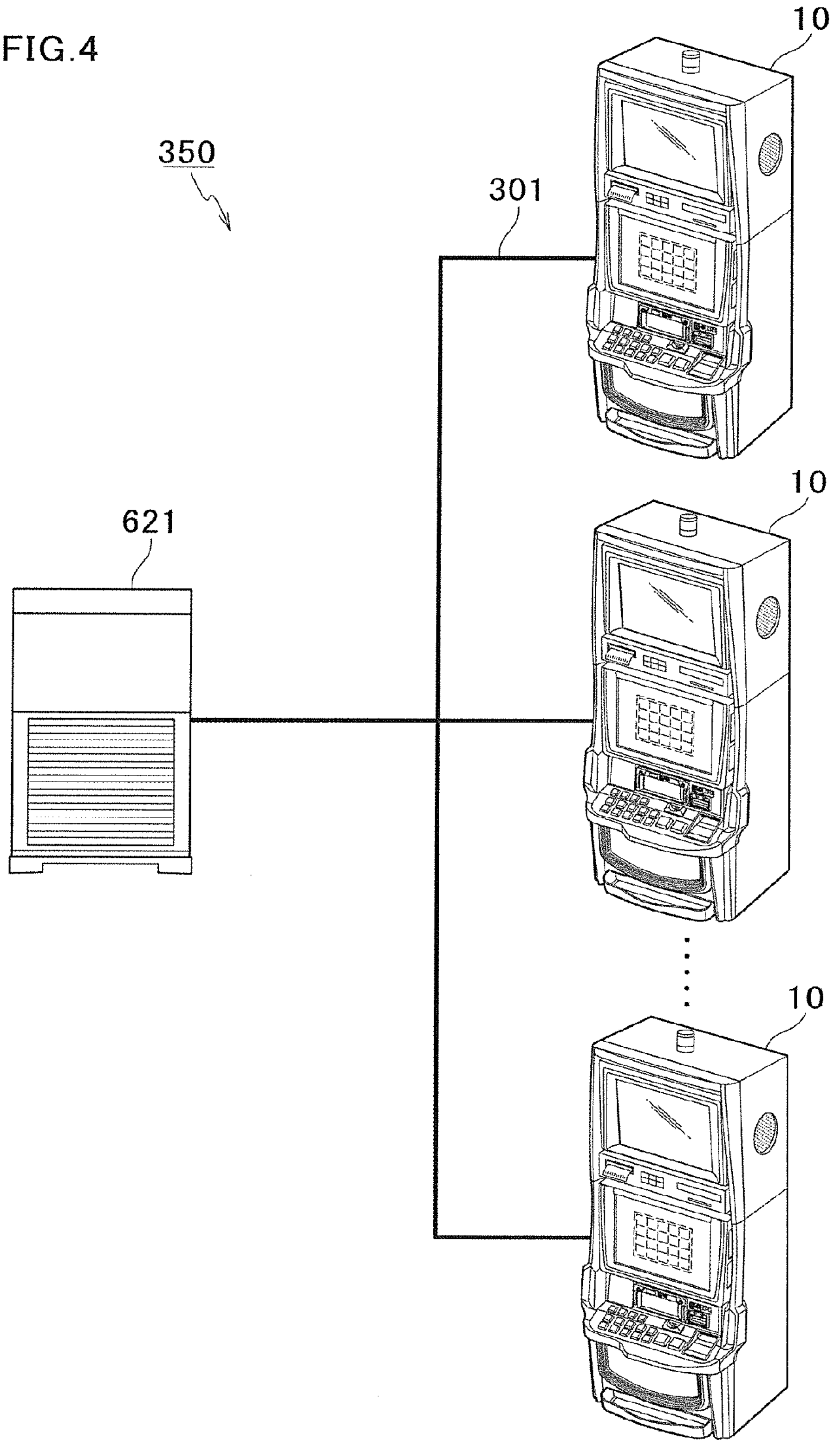
FIG. 4 is a block diagram of a gaming system.
Figure 5:
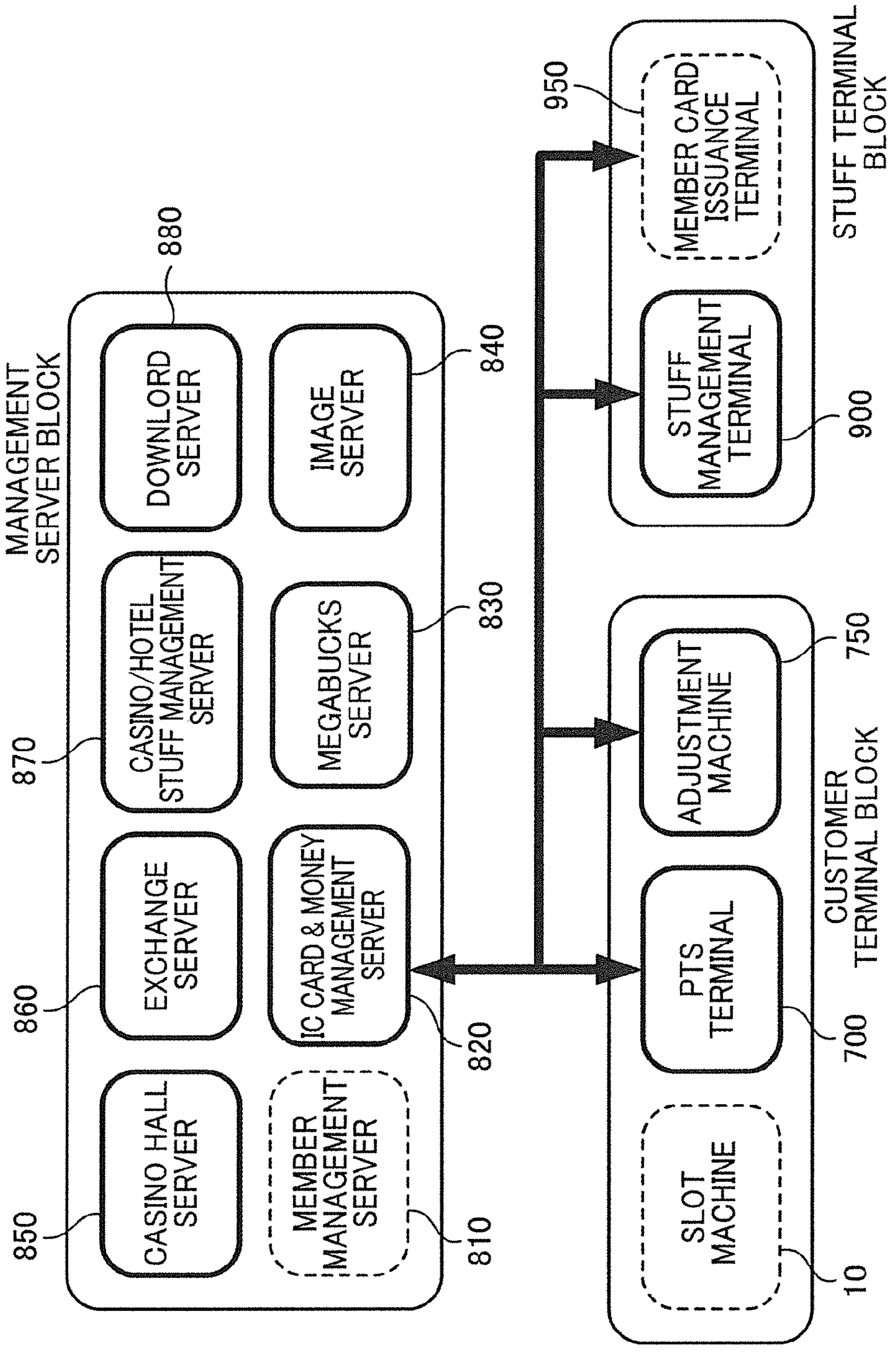
FIG. 5 is a block diagram of a PTS system.

As shown in FIG. 4, the game system 350 includes the slot machines 10 and the external controller 621 connected to the slot machines 10 over a communication line 301.

The external controller 621 is configured to control the slot machines 10. In the present embodiment, the external controller 621 is a so-called hall server provided in a gaming facility where a plurality of slot machines 10 are provided. Each of the slot machines 10 has a unique identification number, and the external controller identifies which one of the slot machines 10 transmitted data, by referring to the identification number. Further, when transmitting data from the external controller to any of the slot machines 10, the identification number is used for designating the transmission destination.

The game system 350 may be constructed in a single gaming facility where various games such as casino games are playable or constructed for a plurality of gaming facilities. Further, when the gaming system is constructed in a single gaming facility, the gaming system may be constructed in each floor or section of the gaming facility. The communication line may be a wired or wireless line, and can adopt a dedicated line, an exchange line or the like.

Figure 35:
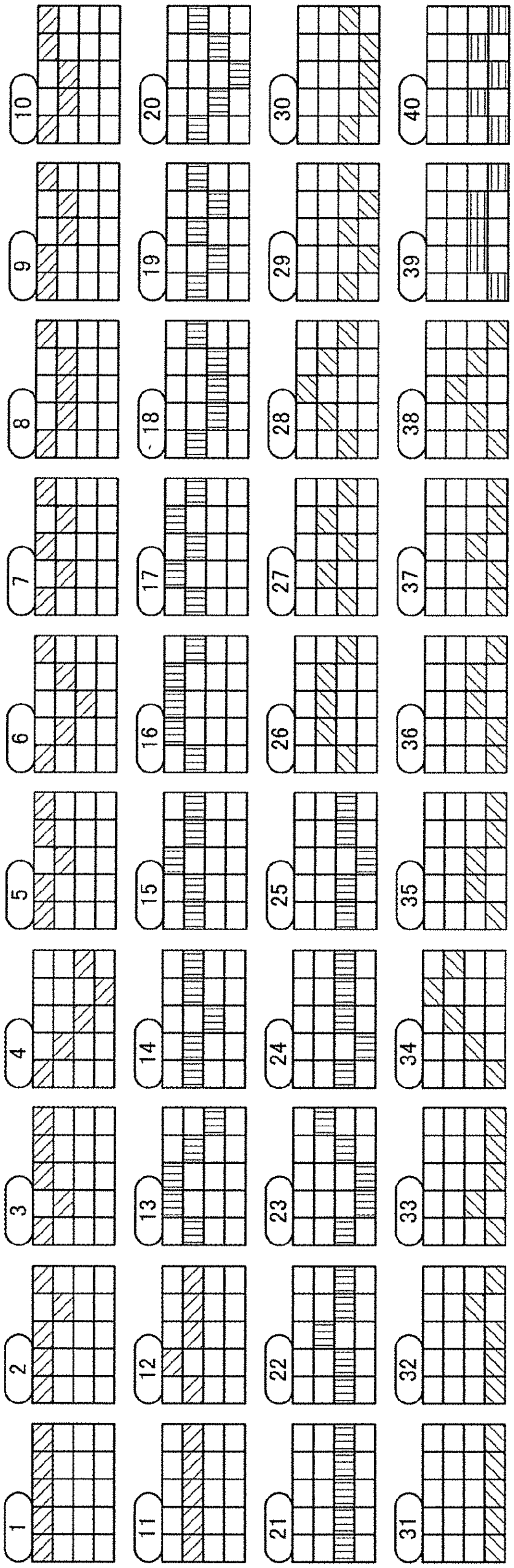
FIG. 35 illustrates a bet line box.

As shown in FIG. 35, the game system is roughly divided into a management server block, a customer terminal block, and a stuff terminal block. The management server block includes a casino hall server 850, an exchange server 860, a casino/hotel stuff management server 870, and a download server 880.

The casino hall server 850 is a server for managing the entire casino hall where the slot machines 10 are provided. The exchange server 860 is a server for generating exchange rate data based on exchange rate information or the like. The casino/hotel stuff management server 870 is a server for managing the staff members of the casino hall or a hotel related to the casino hall. The download server 880 is a server for, for example, downloading latest information such as game-related information and news and forwarding the information to players via the PTS terminal 700 of each slot machine 10.

The management server block includes a member management server 810, an IC card & money management server 820, a megabucks server 830, and an image server 840.

The member management server 810 is a server for managing member information or the like of the players of the slot machines 10. The IC card & money management server 820 is a server for managing IC cards used in the slot machines 10. More specifically, the IC card & money management server 820 is a server that stores fractional money data in association with an identification code and outputs the fractional money data to the PTS terminal 700. Furthermore, the IC card & money management server 820 generates and manages denomination rate data or the like. The megabucks server 830 is a server for, for example, managing Mega bucks which is a game in which the sum total of amounts bet on a plurality of slot machines 10 in a plurality of casino halls is dealt with as a payout. The image server 840 is, for example, a server that downloads latest images such as game-related images and news images and forwards the images to the player via the PTS terminal 700 of each slot machine 10.

The customer terminal block includes the slot machine 10, a PTS terminal 700, and a settlement machine 750. The PTS terminal 700 is attachable to the slot machine 10 and capable of mutually communicating with the management server 800. The settlement machine 750 exchanges money data stored in a player's IC card to real money and stores coins and bills in an IC card as money data.

The stuff terminal block includes a stuff management terminal 900 and a member card issuance terminal 950. The stuff management terminal 900 is a terminal by which the staff of the casino hall manages the slot machines 10. In particular, in the present embodiment, the staff of the casino hall checks if the number of IC cards in the PTS terminal 700 is too large or too small. The member card issuance terminal 950 is a terminal by which a player obtains a member card to play games in the casino hall.

(PTS Terminal 700)

Figure 6:
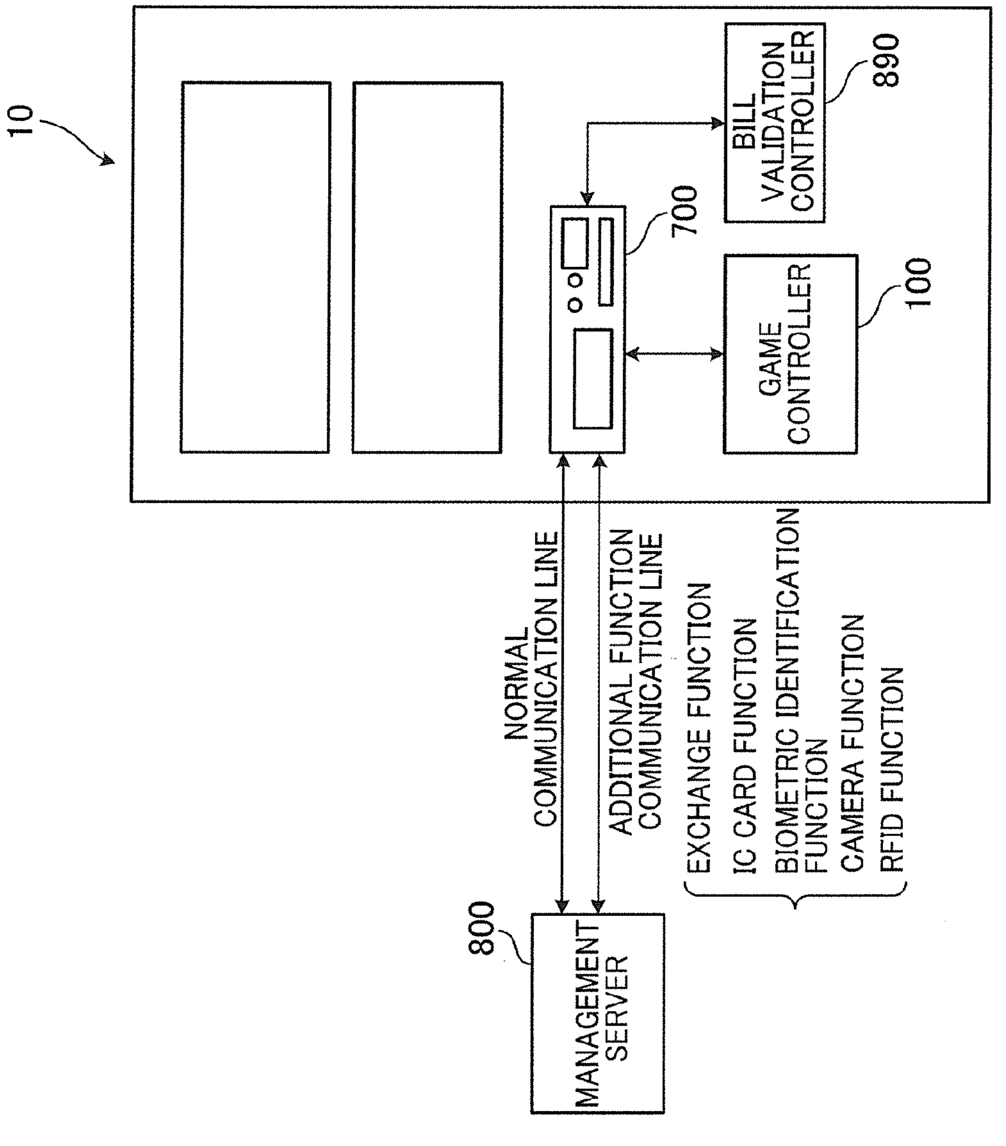
FIG. 6 is a block diagram of a PTS system.

The PTS terminal 700 is incorporated in a PTS system as shown in FIG. 6. The PTS terminal 700 attached to the slot machine 10 is arranged to be able to communicate with the game controller 100 of the slot machine 10 and the bill validation controller 890.

The PTS terminal 700 conducts sound and image effects in games and updates the credit data, based on the communications with the game controller 100. Furthermore, the PTS terminal 700 sends credit data to the bill validation controller 890, which is required at the time of the settlement.

In addition to the above, the PTS terminal 700 is connected to the management server 800 to be able to communicate therewith. The PTS terminal 700 and the management server 800 are connected with each other by two lines, namely, a normal communication line and an additional function communication line.

The PTS terminal 700 exchanges, by the normal communication line, data such as money data, identification code data, member information of a player. On the other hand, by the additional function communication line, the PTS terminal 700 conducts communications concerning newly-added functions. In the present embodiment, the PTS terminal 700 conducts, by the additional function communication line, communications concerning an exchange function, an IC card function, a biometric identification function, a camera function, and an RFID (Radio Frequency IDentification) function of individual identification by radio waves.

(Mechanical Structure of Slot Machine)

Figure 7:
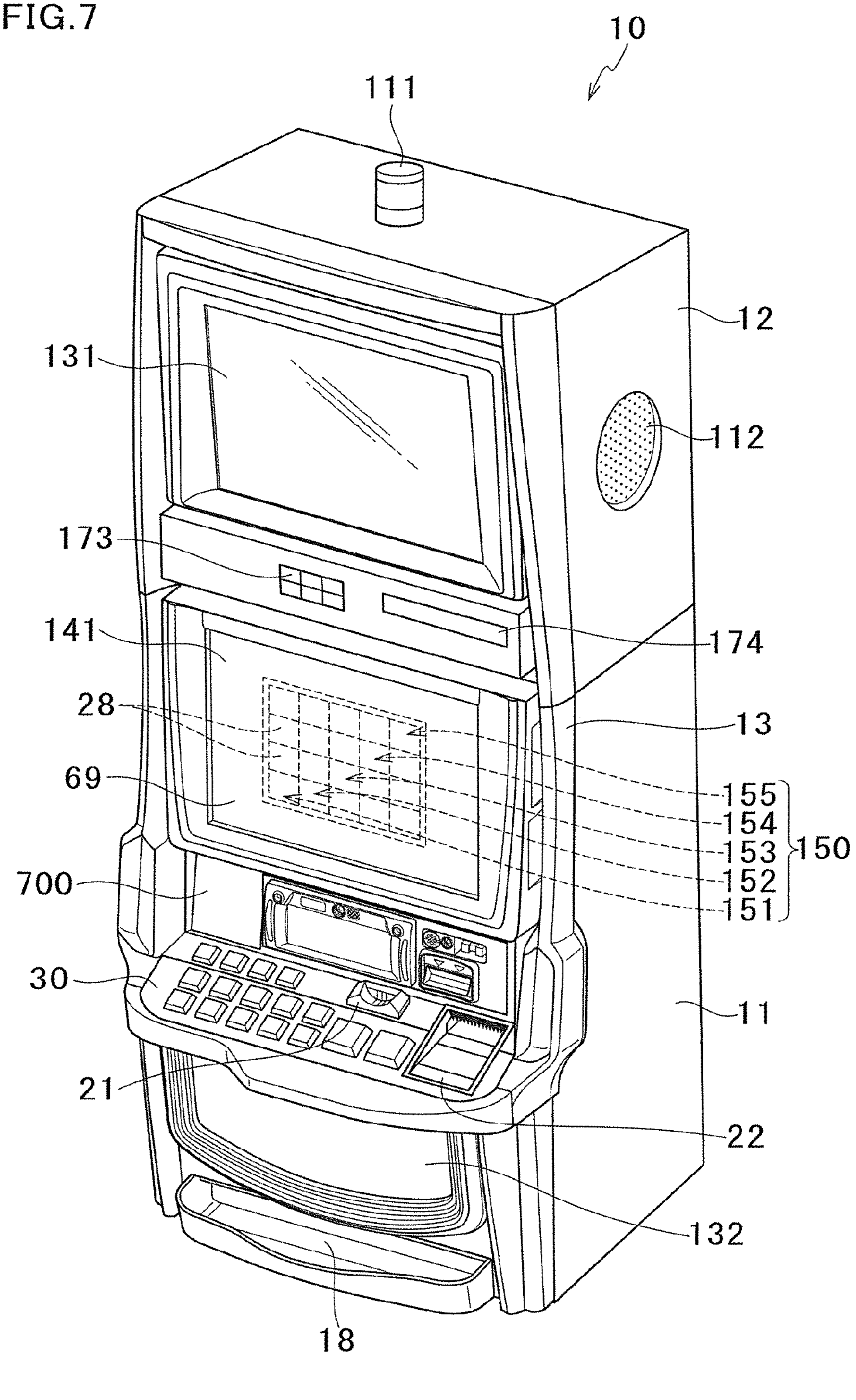
FIG. 7 is a perspective view of a slot machine in the gaming machine.

Referring to FIG. 7, the overall structure of the slot machine 10 will be described.

A coin, a bill, or electrically valuable information corresponding to these is used as a game medium in the slot machine 10. In the present embodiment, in particular, credit-related data such as money data stored in an IC card is used.

The slot machine 10 includes a cabinet 11, a top box 12 installed on the upper side of the cabinet 11, and a main door 13 provided at the front surface of the cabinet 11.

On the main door 13, a symbol display device termed lower image display panel 141 is provided. The symbol display device is formed by a transparent liquid crystal panel. The screen displayed on the lower image display panel 141 has a display window 150 at the central portion. The display window 150 is constituted by 15 display blocks 28 forming a matrix of 5 columns and 3 rows. The three display blocks 28 of each column form pseudo reels 151 to 155. On each of the pseudo reels 151 to 155, three display blocks 28 move downward with changes in speed, so that the symbols 501 on the display blocks 28 are vertically rotated (variably displayed) and then stopped, in other words, the symbols are rearranged. The details of the display screen on the lower image display panel 141 will be given later.

While the present embodiment the slot machines 10 are so-called video slot machines, some mechanical reels in the slot machines 10 of the present invention may be replaced by the pseudo reels 151 to 155.

On the front surface of the symbol display device is provided a touch panel 69. The touch panel 69 allows a player to input various instructions by touching the display screen of the lower image display panel 141. The input signal is transmitted from the touch panel 69 to the main CPU 71.

Below the lower image display panel 141 is provided a control panel 30. The control panel 30 is provided with buttons, a coin entry 21 for inserting coins into the cabinet 11, and a bill entry 22. Details of the control panel 30 will be given later.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The slot machine 10 produces effects by displaying images, outputting sounds, and outputting the light.

On the lower front surface of the main door 13, i.e., below the control panel 30, a belly glass 132 on which a character of the slot machine 10 or the like is depicted are provided. Between the lower image display panel 141 and the control panel 30, the PTS terminal 700 is attached. In the PTS terminal 700, devices having a microphone function, a camera function, a speaker function, a display function and the like form a single unit. More specifically, the PTS terminal 700 includes an LCD, a human detection camera, a microphone, a bass reflex speaker, or the like. The human detection camera makes it possible to detect the presence of a player by the camera function. The microphone is used for the player's participation in a game by voice and the authentication of a player by voice recognition. The speaker produces sound effects in games and outputs notification sound when an IC card is left inserted. Furthermore, the speaker outputs notification sound when an inserted IC card is not authenticated.

In addition to the above, the PTS terminal is provided with an LED and a card insertion slot. The LED emits light with plural colors to notify the remaining number of IC cards in a card stacker. The card insertion slot has a mechanism of allowing IC cards to be inserted and ejected. The IC card has a display region. The IC card is completely inside the machine when the player is playing games, and is ejected to expose the display region at the time of the settlement. This allows the player to recognize the credit-related data such as updated money data. Alternatively, the IC card may be arranged to expose the display region not to be completely inserted, even when the player is playing games. This allows the player to always recognize the update of the credits during games.

When it is confirmed by the human detection camera that no player is present at the time of the settlement of the credits, the IC card is drawn into and stored in the card stacker. With this arrangement, the IC card is not left inserted for a long time, even if the player left the machine without taking the IC card after recognizing that the remaining credits on the display region are small.

(Electrical Configuration of Slot Machine)

Figure 8:
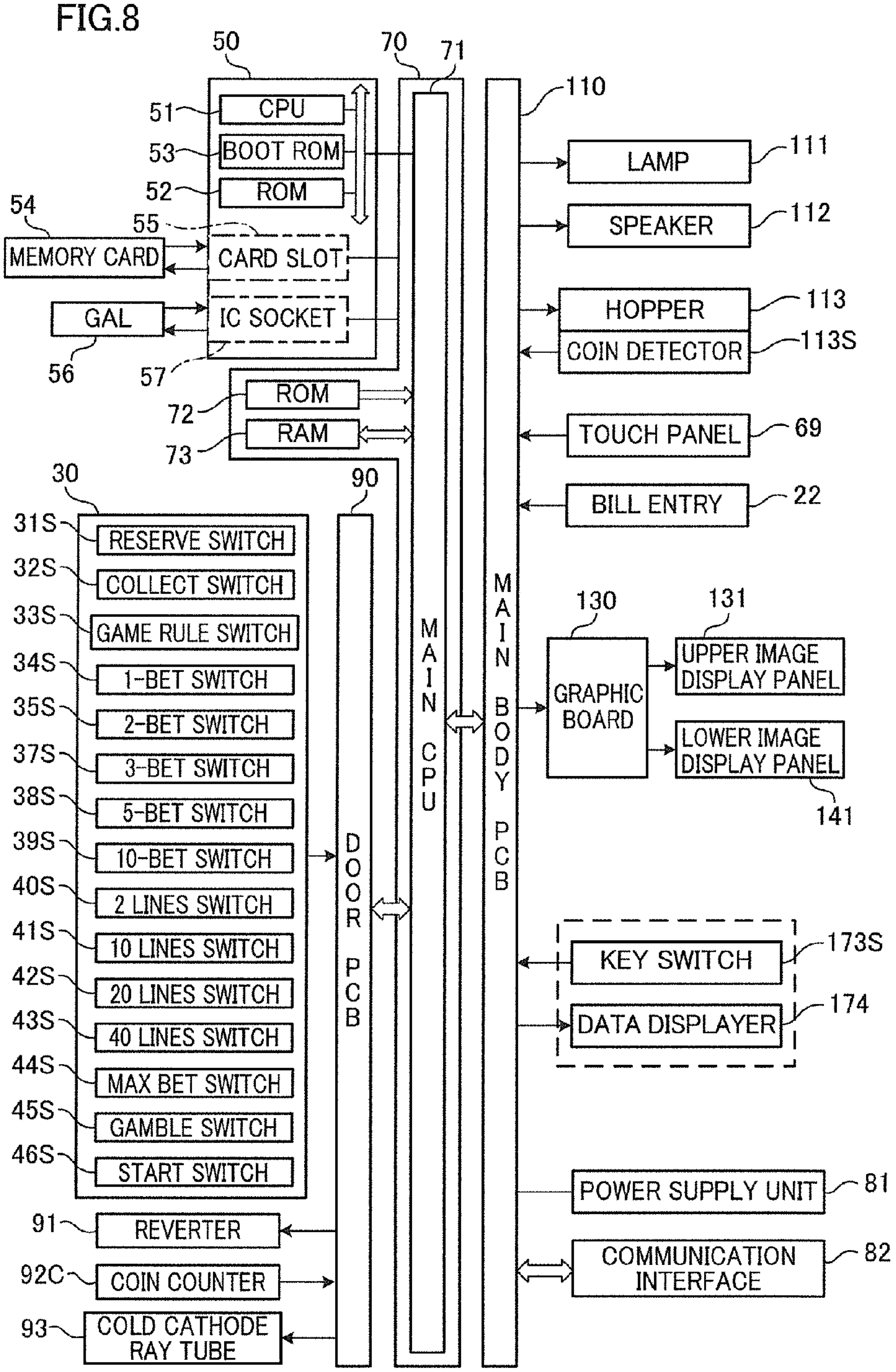
FIG. 8 is an electrical block diagram of the gaming machine.

Now, referring to FIG. 8, the configuration of a circuit in the slot machine 10 will be described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression and a program for producing effects by images and sounds. The game program further includes a symbol determination program. The symbol determination program is a program for determining symbols to be rearranged on the display block 28.

The game program further includes sets of data such as: normal game symbol table data indicating a normal game symbol table that shows the relationship of each symbol in each symbol array of the display block, a code number, and a random number; bonus game symbol table data indicating a bonus game symbol table that shows the relationship of each symbol of each symbol array of the display block, a code number, and a random number; symbol number determination table data indicating a symbol column determination table; code number determination table data indicating a code number determination table; wild symbol increase amount determination table data indicating a wild symbol increase amount determination table; trigger symbol increase number determination table data indicating a trigger symbol increase number determination table; odds data indicating the relationship between the types and the number of symbols rearranged on a payline L and a payout amount.

Further, the card slot 55 is configured so that the memory card 54 can be inserted thereinto and removed therefrom, and is connected to a motherboard 70 by an IDE bus. The type and contents of the game to be played on the slot machine 10 can be changed by drawing out the memory card 54 from the card slot 53S, writing another game program into the memory card 54, and inserting the memory card 54 into the card slot 53S.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is constituted by a commercial general-purpose mother board (printed writing board on which basic components for personal computers are mounted) and is provided with a main CPU 71, a ROM (Read Only Memory) 72, a RAM (Random Access Memory) 73, and a communication interface 82. This motherboard 70 is equivalent to the game controller 100 of the present embodiment.

The ROM 72 includes a memory device such as a flash memory, and stores a program such as BIOS (Basic Input/Output System) to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started. In the present invention, the ROM 72 may be or may not be rewritable.

The RAM 73 stores data used for the operation of the main CPU 71 and programs such as the symbol determination program. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of bets, the number of payouts, the number of credits and the like; and an area that stores symbols (code numbers) randomly determined.

The communication interface 82 is for communicating with the external controller 621 such as a server, through the communication line 301. Further, the motherboard 70 is connected with a later-described door PCB (Printed Circuit Board) 90 and a body PCB 110 by respective USBs. The motherboard 70 is also connected with a power supply unit 81. Furthermore, the motherboard 70 is connected with the PTS terminal 700 by USB.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a play-2-lines switch 40S, a play-5-lines switch 41S, a play-10-lines switch 42S, a play-20-lines switch 43S, a MAX BET switch 44S, a gamble switch 45S, and a start switch 46S, which correspond to the above-described buttons. Each of the switches outputs a signal to the main CPU 71 upon detection of press of the button corresponding thereto by the player.

Inside the coin entry 36 are provided a reverter 91 and a coin counter 92C. The reverter 91 verifies validates a coin inserted into the coin entry 36, and discharges coins other than genuine coins through a coin payout exit. The coin counter 92C detects the received genuine coins and counts the number of the coins.

The reverter 91 operates based on a control signal output from the main CPU 71, and distributes valid coins validated by the coin counter 92C into a hopper 113 or a cash box. That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the effect mechanism 131 and the lower image display panel 141, and lights up based on a control signal output from the main CPU 71.

The body PCB 110 is connected with the upper image display panel 131, the speakers 112, the hopper 113, a coin detecting portion 113S, the touch panel 69, the bill entry 22, a graphic board 130, a key switch 173S, and the data display 174. The speakers 112 output BGM sound or the like in accordance with a control signal output from the main CPU 71.

The hopper 113 operates based on a control signal output from the main CPU 71, and pays out coins of the specified number of payouts from the coin payout exit to an unillustrated coin tray. The coin detecting portion 113S outputs a signal to the main CPU 71 upon detection of coins paid out by the hopper 113.

The touch panel 69 detects a position on the lower image display panel 141 touched by a finger or the like of the player, and outputs a signal corresponding to the detected position to the main CPU 71.

The bill entry 22 authenticates the bills and receives genuine bills into the cabinet 11. The bills received by the cabinet 11 are converted onto the number of coins, and the credits equivalent to the converted coins are added as the credits owned by the player.

The graphic board 130 controls display of images conducted by the effect mechanism 131 and lower image display panel 141, based on a control signal output from the main CPU 71. The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

The key switch 173S is provided in the keypad 173, and outputs a predetermined signal to the main CPU 71 when the keypad 173 has been operated by the player. The data displayer 174 displays data read by the card reader 172 and data inputted by the player through the keypad 173, based on a control signal outputted from the main CPU 71.

(Symbols, Combinations, or the Like)

The symbols, which are displayed on pseudo reels 151 to 155 of the slot machine 10, form a symbol array. Each symbol constituting the symbol array has, as shown in FIG. 40, one of the code numbers 0 to 19 or more. Each symbol array is a combination of the symbols such as a wild symbol, a specific symbol 503, and a normal symbol.

The four successive symbols in the symbol array are, as shown in FIG. 7, displayed (provided) at the upper stage, the upper middle stage, the lower middle stage, and the lower stage of the display region of each of the pseudo reels 151 to 155, so that a symbol matrix of 5 columns and 4 rows is formed on the display window 150. The symbols forming the symbol matrix start to scroll at least when a game starts in response to the pressing of the spin button 46. After a predetermined time elapses from the start of the scroll, the scroll of the symbols stops (rearrangement).

In addition to the above, for the symbols, various winning combinations are set in advance. A winning combination indicates that an award is established. A winning combination is a combination in which symbols having stopped on a payline L is advantageous for the player. The advantageous state indicates states such as a state that coins corresponding to the winning combination are paid out, a state that the number of coins to be paid out is added to the credits, and a state that a bonus game starts.

The winning combination in the present embodiment is a combination in which a predetermined number or more of symbols of at least one type are rearranged on an activated payline L. When a particular type of symbols is set as a scatter symbol, a winning combination is established when a predetermined number or more of such scatter symbols are rearranged, no matter whether a payline L is activated or not.

(Normal Game Symbol Data Table)

A normal game symbol table is a table that relates to the normal game and is used for determining which symbols 501 are the targets of rearrangement. In the normal game symbol table, symbols on the display blocks 28 in each symbol array are associated with code numbers, and 20 numerical ranges defined by dividing a numerical range of 0 to 65535 by 20 are associated with the respective code numbers.

The numerical range of 0 to 65535 may be equally or unequally divided. When unequally divided, it is possible to adjust the probabilities of wining for the respective types of the symbols by determining the ranges of the random numbers. In this regard, the ranges corresponding to the "BONUS" of the trigger symbol 503*a* of the specific symbol 503 and the "WILD" of the wild symbol may be arranged to be narrower than the ranges of the other types of the symbols. In this case, results of games can be easily adjusted in accordance of the progress of the games, by arranging valuable types of the symbols to be less likely to be won.

For example, when a random number randomly selected for the first column is "10000", the symbol having the code number associated with the random number range including the selected random number is chosen as the target of rearrangement on the pseudo reel 151 of the first column. On the other hand, when, for example, a random number for the fourth column is "40000", the symbol having the code number associated with the random number range including the selected random number is chosen as the target of rearrangement on the pseudo reel 151 of the fourth column.

(LED Data Table)

FIG. 9 shows a LED data table by which a condition for controlling the turn-on/off of LED on the slot machine 10. The slot machine 10 reproduces LED data under the control of a program based on the data table.

More specifically, the LED data table includes number fields, folder fields, application part fields, start condition fields, and deletion condition fields. Associated with the number field "1" are the folder field "common/ADVERTISE", the application part field "In Advertise", the start condition field "When credit becomes zero in idle state", and the deletion condition field "When credit is inserted". Associated with the number field "2" are the folder field "common/IDLE", the application part field "in Idle", the start condition field "When credit is inserted in advertise state", and the deletion condition field "When shifted to another state".

Associated with the number field "3" are the folder field "common/FEATURE STOP1", the application part field "During Spinning", the start condition field "When FEATURE symbol stops at first reel", and the deletion condition field "When second reel stops". Associated with the number field "4" are the folder field "common/FEATURE STOP2", the application part field "During Spinning", the start condition field "When FEATURE symbol stops at second reel while FEATURE symbol has stopped at first reel", and the deletion condition field "When third reel stops". Associated with the number field "5" are the folder field "common/FEATURE STOPS", the application part field "During Spinning", the start condition field "When FEATURE symbol stops at third reel while FEATURE symbols have stopped at first and second reels", and the deletion condition field "No Data". Associated with the number field "6" are "original/FREEGAME_0", "FEATURE START, PRESS START FEATURE screen", "At end of bleep sound", and "when START FEATURE button is pressed". Other fields are arranged as shown in FIG. 9.

(Spin Table)

FIG. 10 shows a spin table of sets of spin data used in different gaming states of the slot machine 10. The spin table includes number fields, data name fields, state fields, and status fields.

Associated with the number field "1" are the data name field "RSP_Normal.spn", the state field "Normal Game", and the status field "FEATURE symbols do not form ready-to-win state when first and second reel stop in normal rotation". Associated with the number field "2" are the data name field "RSP_Normal_Reach.spn", the state field "Ready-to-win in Normal Game", and the status field "FEATURE symbols stop at first and second reels". Associated with the number field "3" are the data name field "RSP_FG.spn", the state field "free game", and the status field "FEATURE symbols does not stop at first reel in FG". Associated with the number field "4" are the data name field "RSP_FG_Reach_01.spn", the state field "Ready-to-win at first reel in free game", and the status field "FEATURE symbol stops at first reel and does not stop at second reel in FG". Associated with the number field "5" are the data name field "RSP_FG_Reach_02.spn", the state field "Ready-to-win at first and second reels in free game", and the status field "FEATURE symbols stop at first and second reels in FG".

(Re-Trigger Data Table)

FIG. 11 is a re-trigger data table showing the relationship among combination patterns of reels with which the re-trigger condition is established, the additional numbers of times of execution of the free game, and the rate of increase of the payout rate. In the re-trigger data table, not all combination patterns are required to be re-trigger conditions. A predetermined combination pattern may be selected in advance or a combination pattern may be randomly selected when a trigger condition is established in the normal game. The additional numbers of times of execution of the game are shown as examples, and the numbers are not limited to them.

The re-trigger data table has reel combination pattern fields and data addition number fields (payout rate increase fields). The reel combination pattern fields are constituted by first reel fields, second reel fields, third reel field, fourth reel fields, and fifth reel fields. For example, when the trigger symbol 503*a* is rearranged only on the first reel, the additional number of times of execution of the free game is "1". When the trigger symbols 503*a* are rearranged on the first reel and the second reel, the additional number of times of execution of the free game is "2". When the trigger symbols 503*a* are rearranged on the second reel and the third reel, the additional number of times of execution of the free game is "2". While in the present embodiment the additional numbers of times field and the rate of increase in payout rate field are the identical field and the additional number of times and the rate of increase are the same value, the disclosure is not limited to this arrangement. For example, for all combination patterns of reels, the additional number of times and the rate of increase may be differentiated from each other. Alternatively, for example, while the additional number of times and the rate of increase are identical for a particular combination pattern, the additional number of times and the rate of increase are different for the other combination patterns.

(Rank Data Table)

FIG. 12 shows a rank data table showing the relationship between the numbers of rearranged trigger symbols 503*a* when the re-trigger condition is established and ranks. The relationship between the rearranged numbers and the ranks is an example and is not limited to that in the table.

The rank data table includes rearrangement number fields each indicating the number of rearranged trigger symbols 503*a* and rank fields each indicating a rank. For example, when two trigger symbols 503*a* are rearranged, the rank is “1” and 1 is added to the additional number of times of execution of the game. When five trigger symbols 503*a* are rearranged, the rank is “2” and 2 is added to the additional number of times of execution of the game.

(Control Panel 30)

Below the lower image display panel 141, as shown in FIG. 7, a control panel 30 is provided. The control panel 30 is provided not only with buttons but also units such as a coin entry 21 that allows coins to enter the cabinet 11 and a bill entry 22.

Figure 13A:
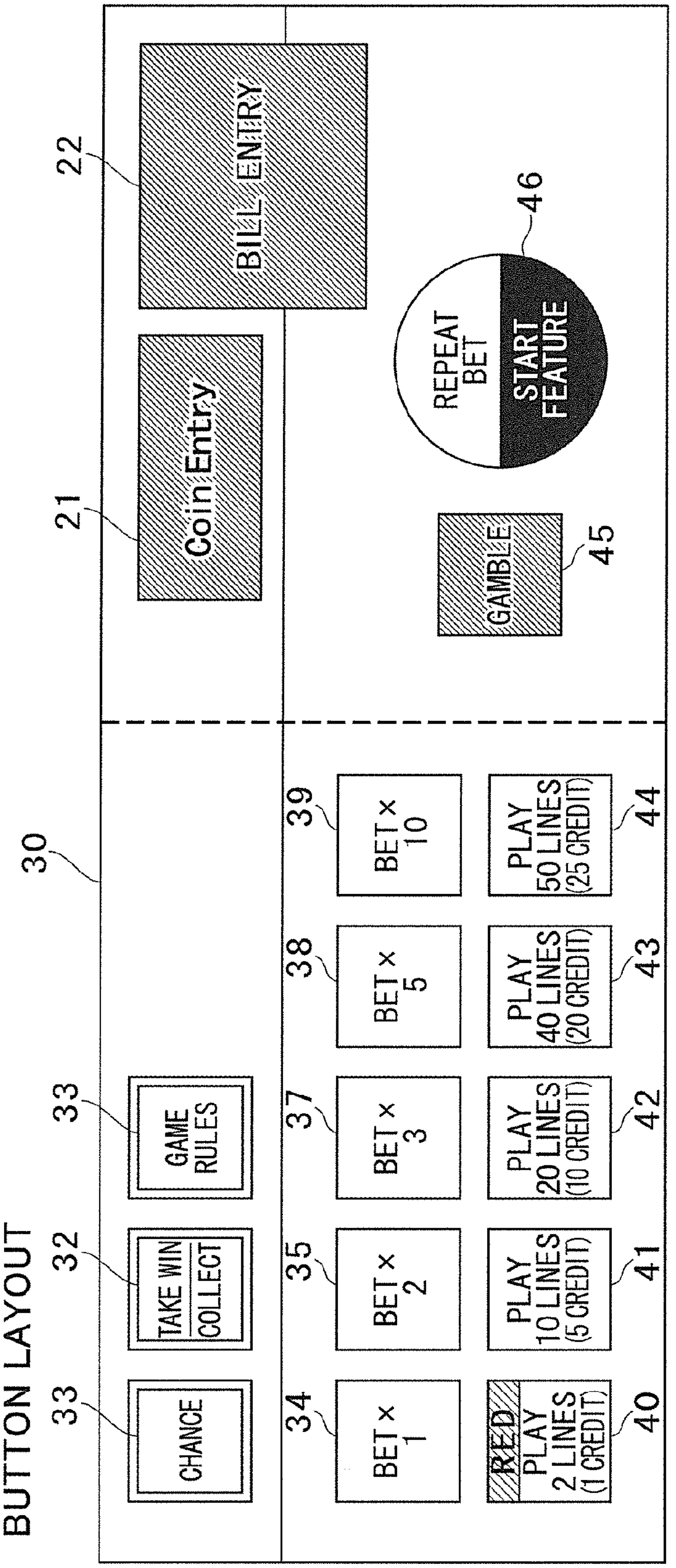
FIG. 13A is a frontal view of the control panel.
Figure 13B:
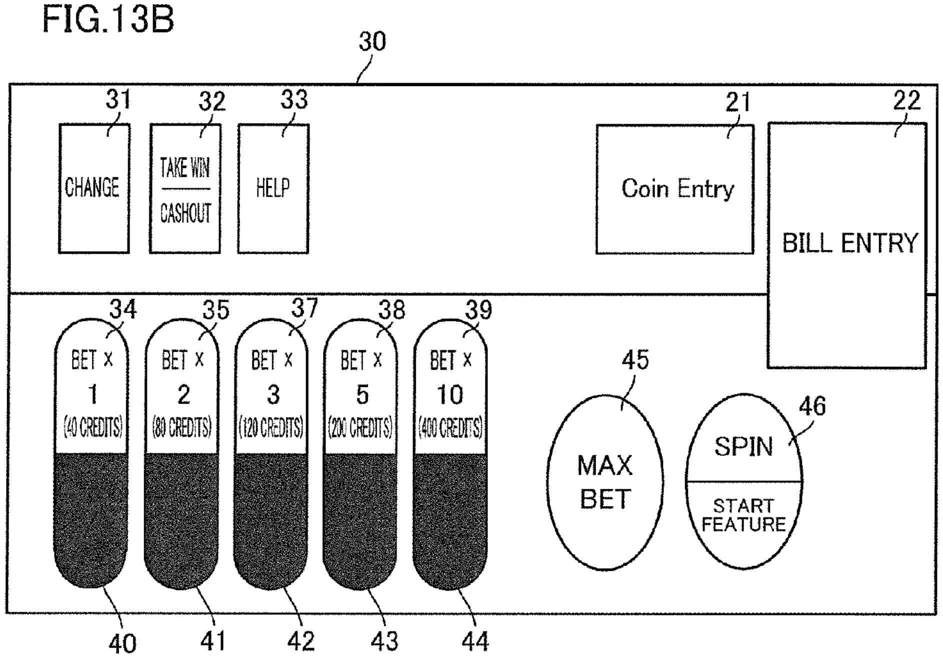
FIG. 13B is a frontal view of the control panel.
Figure 13C:
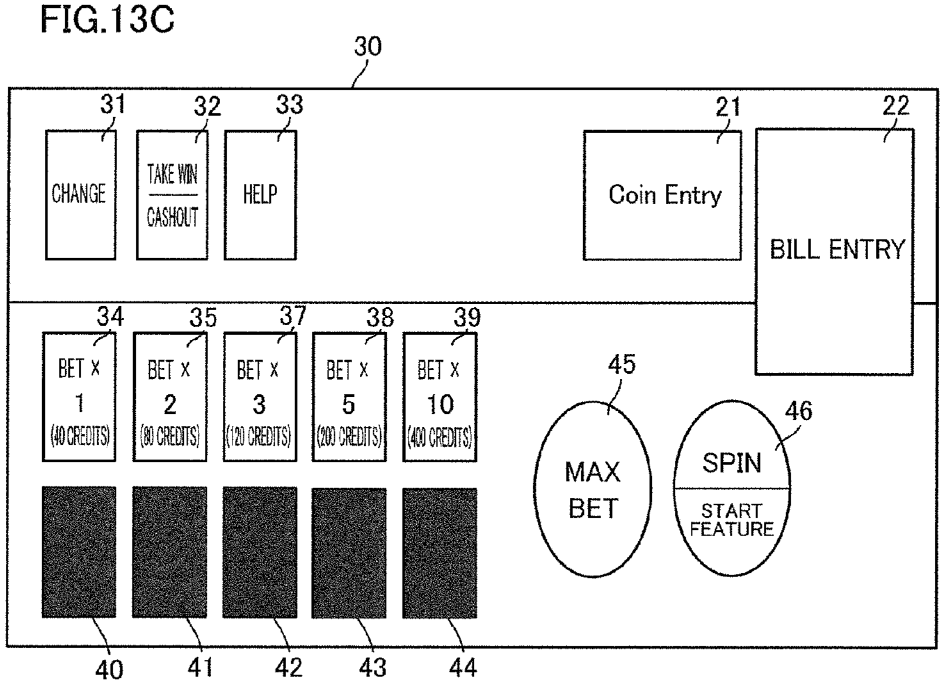
FIG. 13C is a frontal view of the control panel.

More specifically, as shown in FIG. 13A, on the control panel 30, a change button 31, a cashout button 32, and a help button 33 are provided on the upper stage of the left area in front elevation, a 1-BET button 34, a 2-BET button 35, a 3-BET button 37, and a 5-BET button 38 are provided in the middle stage of the left area. To be more specific, as shown in FIG. 13, the control panel 30 is arranged so that the change button 31, the cashout button 32, and the help button 33 are provided on the upper stage of the left area, and the 1-BET button 34, the 2-BET button 35, the 3-BET button 37, the 5-BET button 38, and the 10-BET button 39 are provided on the central stage of the left area. Furthermore, on the control panel 30, a play-2-lines button 40, a play-5-lines button 41, a play-10-lines button 42, a play-20-lines button 43, and a gamble button 44 are provided in the lower stage of the left area. It is noted that the control panel 30 may have a different design of buttons in accordance with the type of the game, as shown in FIGS. 13B and 13B.

Figure 13D:
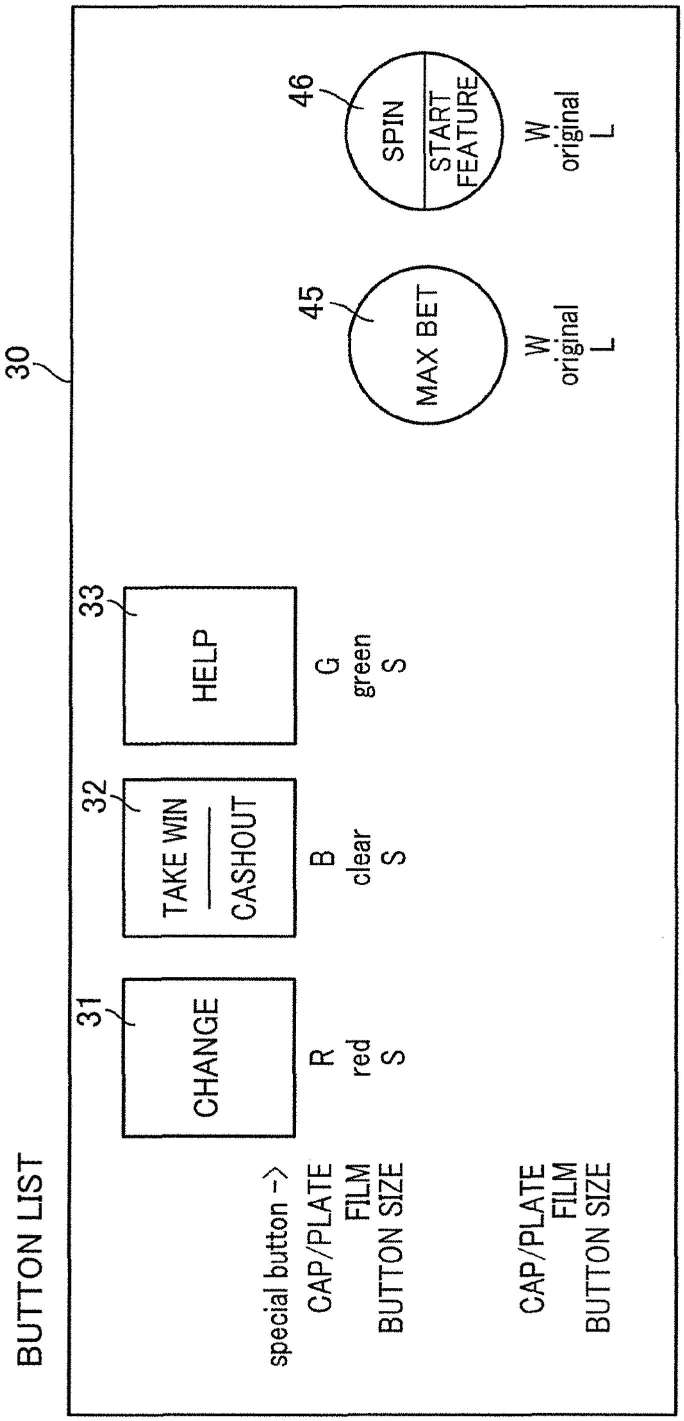
FIG. 13D is a frontal view of the control panel.
Figure 13E:
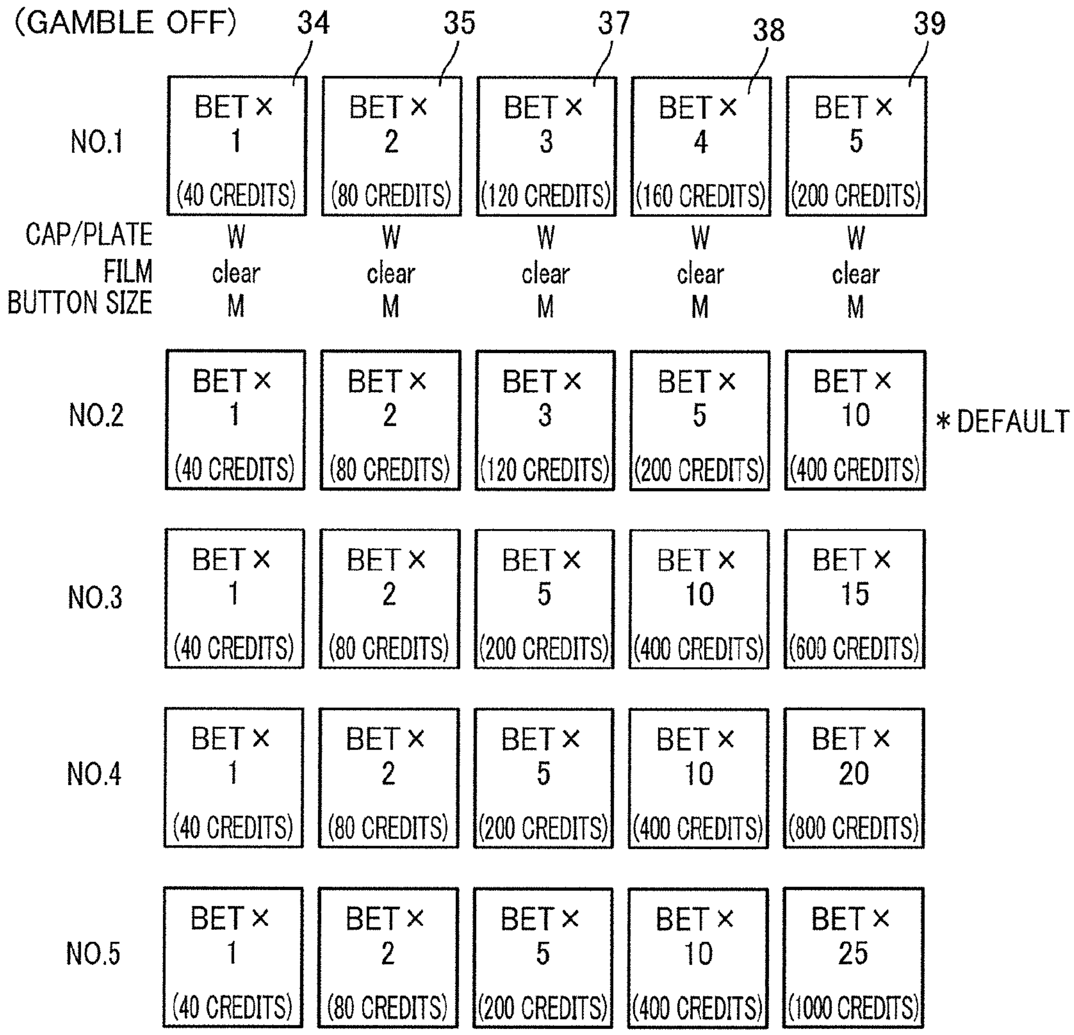
FIG. 13E illustrates the button configuration of the control panel.
Figure 13F:
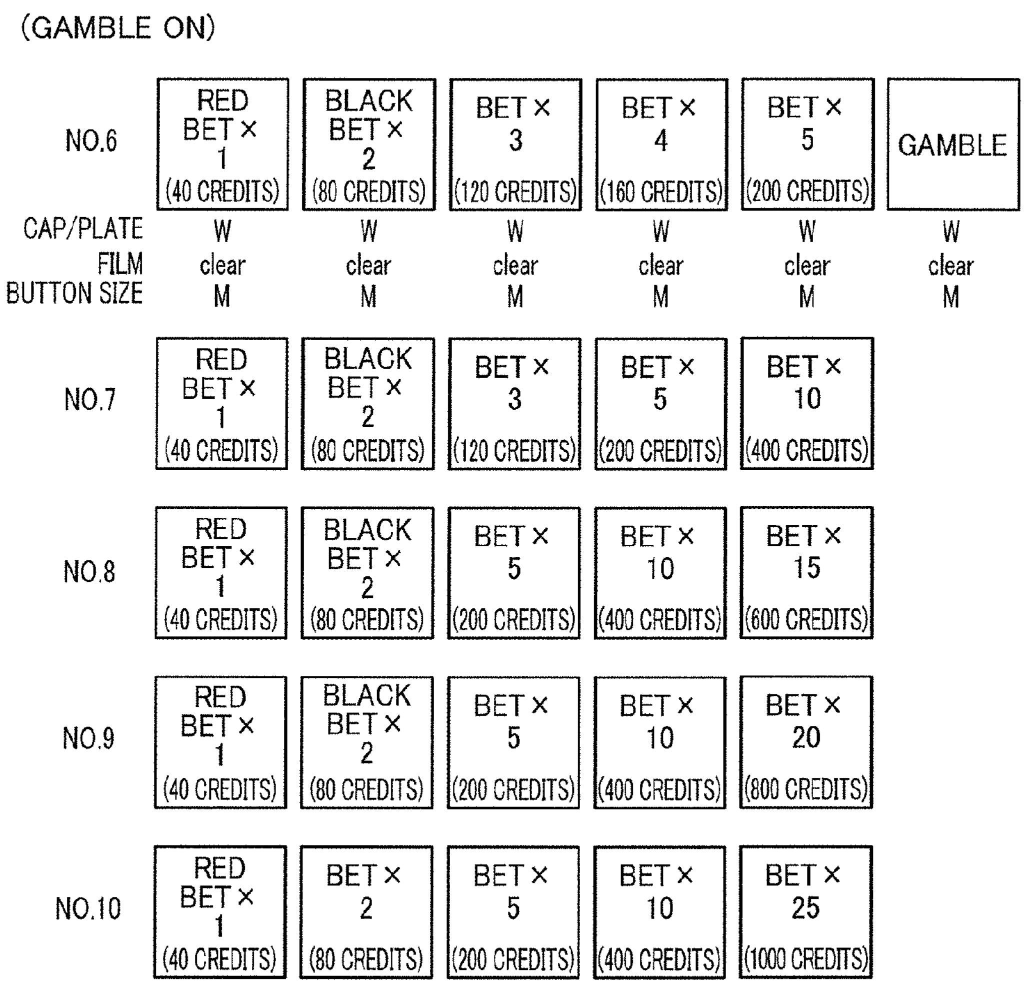
FIG. 13F illustrates the button configuration of the control panel.

Furthermore, the control panel 30 is formed by combining the components on the “BUTTON LIST” shown in FIG. 13D. FIG. 13E shows a case of GAMBLE OFF. FIG. 13F shows a case of GAMBLE ON.

The control panel 30 makes it possible to conduct selections in the same manner as those by the touch panel, on various types of selection screens. For example, the cursor is moved leftward as the 1-BET button 34 is touched, and the cursor is moved rightward as the 10-BET button 39 is touched. When the operation is carried out, the light source in each button is preferably turned on.

In addition to the above, on the control panel 30, the coin entry 21 and the bill entry 22 are provided on the upper stage of the right area, whereas a maximum BET button 45 and a spin button 46 are provided on the lower stage of the right area.

The change button 31 is used when a player leaves the machine or when the player asks a staff person of the gaming facility to exchange money. The cashout button 32 is a so-called settlement button by which credit data concerning credits obtained in games is added to the credit data stored in an IC card inserted into the PTS terminal 700. The help button 33 is pressed when, for example, it is unclear how to play a game. As the help button 33 is pressed, various help information is displayed on a later-described effect mechanism 131 and lower image display panel 141.

Each time the 1-BET button 34 is pressed, one of the credits currently owned by the player is bet on each active payline L. The 2-BET button 35 is used to start a game with two credits bet on each active payline L. The 3-BET button 37 is used to start a game with three credits bet on each active payline L. The 5-BET button 38 is used to start a game with five credits bet on each active payline L. The 10-BET button 39 is used to start a game with ten credits bet on each active payline L. The maximum BET button 45 is used to activate the maximum number of paylines L, i.e., 20 paylines L. With this, the number of activated paylines L becomes the maximum, i.e., 20. As such, the number of credits bet on each active payline L determined by pressing the 1-BET button 34, the 2-BET button 35, the 3-BET button 37, the 5-BET button 38, the 10-BET button 39, and the maximum BET button 45.

The play-2-lines button 40 is pressed for activating two paylines L. As a result, the number of active paylines L becomes two. The play-5-lines button 41 is pressed for activating five paylines L. As a result, the number of active paylines L becomes five. The play 10-lines button 42 is pressed for activating ten paylines L. As a result, the number of active paylines L becomes ten. The play 20-lines button 43 is pressed for activating 20 paylines L. As a result, the number of active paylines L becomes 20.

The gamble button 45 is an operation button used for, for example, shifting to the gamble game after the end of the bonus game or the like. The gamble game is a game played with the consumption of an obtained credit.

The spin button 46 is a button used for starting the scroll of the symbols 501. This spin button 46 also functions as a button for starting a bonus game and for adding a payout awarded in a bonus game to the credits. The coin entry 21 is used for receiving coins into the cabinet 11. The bill entry 22 validate bills and receives genuine bills into the cabinet 11.

(Details of Operation of Control Panel 30)

The operations of the control panel 30 are changed or restricted in accordance with the content of the display screen and the operations on the lower image display panel 141.

(Details of Operation of Control Panel 30: Immediately after Clearance of RAM)

Figure 14:
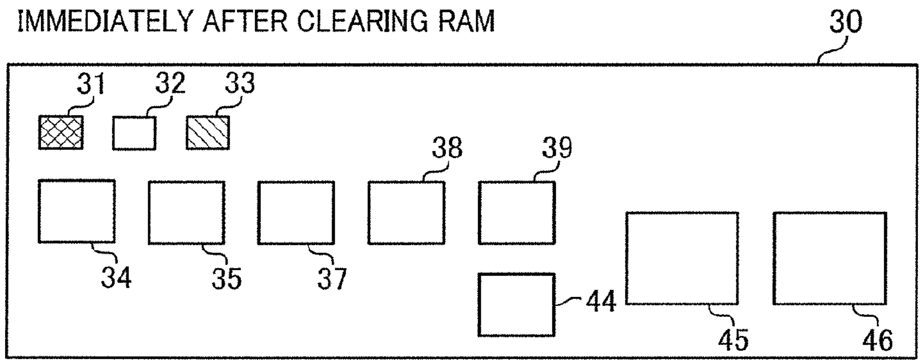
FIG. 14 shows an operation state of the control panel.

As shown in FIG. 14, the change button 31 is in the off state and disabled, and is turned on/off as pressed. The cashout button 32 is in the off state and disabled. The help button 33 is in the on state and active. The 1-BET button 34 to 10-BET button 39 are in the off state but active. The gamble button 44 is turned off and disabled. The maximum BET button 45 is in the off state and disabled. The spin button 46 is in the off state and disabled.

The gamble button 44 appears only when GAMBLE ENABLE is set. The gamble button 44 is basically in the on state and active only when “PLAY ON, GAMBLE OR TAKE WIN” is displayed. The button is in the off state and disabled in other cases.

(Details of Operation of Control Panel 30: Idle State (without Credits))

Figure 15:
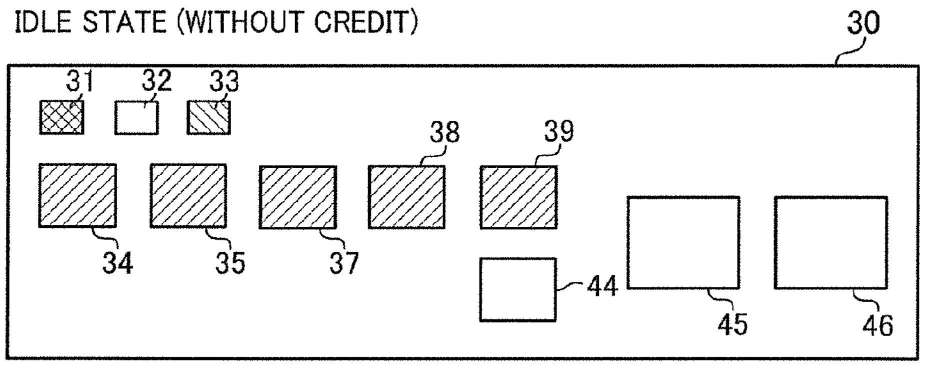
FIG. 15 shows an operation state of the control panel.

As shown in FIG. 15, the change button 31 is in the off state but active. The button is turned on/off as pressed. The cashout button 32 is in the off state but active. The help button 33 is in the on state and active. The 1-BET button 34 to 10-BET button 39 are in the off state or are in the on state and active. In other words, these buttons retain the state of the previous game play. The gamble button 44 is in the off state but active. The maximum BET button 45 is in the off state but active. The spin button 46 is in the off state but active.

(Details of Operation of Control Panel 30: Idle State (with Credits))

Figure 16:
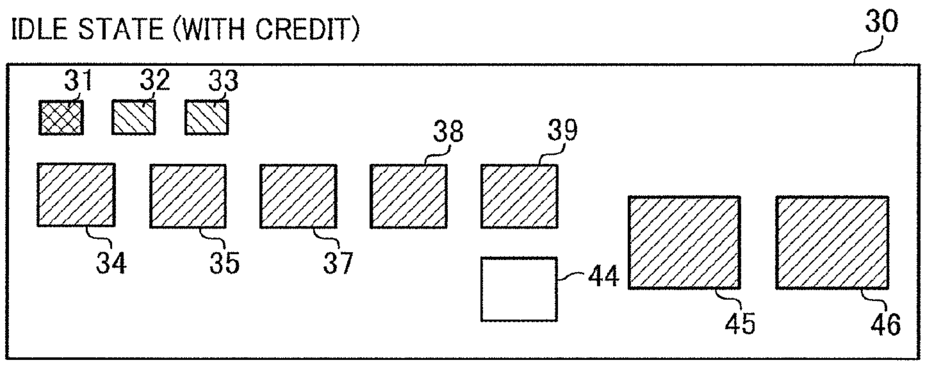
FIG. 16 shows an operation state of the control panel.

As shown in FIG. 16, the change button 31 is in the off state but active. The button is turned on/off as pressed. The cashout button 32 is in the on state and active. The help button 33 is in the on state and active. The 1-BET button 34 to 10-BET button 39 are in the off state or are in the on state and active. In other words, these buttons retain the state of the previous game play. The gamble button 44 is in the off state and disabled. The maximum BET button 45 is turned on when MAX BET is possible, and a game starts with "MAX BET" when the button pressed. When the credits are less than MAX BET, the button is turned on, and the maximum credits bettable are selected when the button is pressed. When the credits are less than the amount for one bet, the button is in the off state and disabled. The spin button 46 is in the on state and active in a bet pattern in which the remaining credits are selected. When the remaining credits are smaller than the selected bet pattern, the button is in the off state and disabled.

(Details of Operation of Control Panel 30: Continuous Pressing of Spin Button 46)

Figure 17:
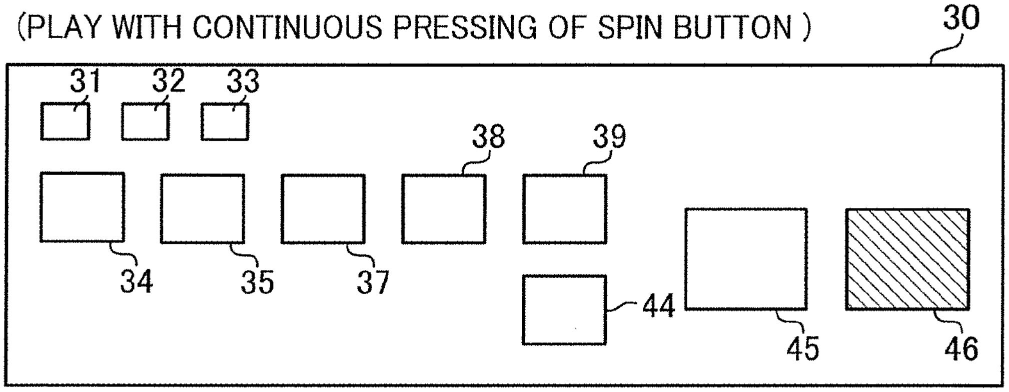
FIG. 17 shows an operation state of the control panel.

As shown in FIG. 17, auto bet starts as the spin button 46 is continuously pressed. The maximum BET button 45 is in the off state and disabled. The other buttons are in the off state and disabled. The auto bet function (button) is the operation identical with those during the reel spin and the WIN increment. However, during the WIN increment, the next game starts rather than the GAME OVER, when the illuminated button is pressed. The button operation when a payout occurs is identical with that of the WIN increment. The button operation when losing in the game is identical with the operation during the reel spin. When the feature is waited for, it is necessary to press the bottom at the time of the pressing of the spin button 46.

(Details of Operation of Control Panel 30: During Help Screen)

Figure 18:
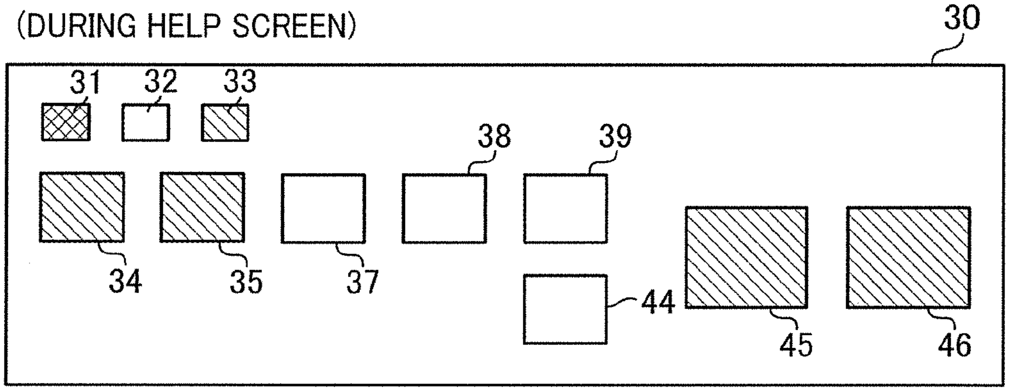
FIG. 18 shows an operation state of the control panel.

As shown in FIG. 18, the change button 31 is in the off state but active. The button is turned on/off as pressed. The cashout button 32 is in the off state and disabled. The help button 33 is in the on state and active. The help ends when the button is pressed. The 1-BET button 34 is in the on state and active. The next page of the help screen is displayed when the button is pressed. The 2-BET button 35 is in the on state and active. The previous page of the help screen is displayed when the button is pressed. The maximum BET button 45 is in the on state and active. The help ends when the button is pressed. The spin button 46 is in the on state and active. The help ends when the button is pressed. The other buttons are in the off state and disabled.

(Details of Operation of Control Panel 30: During Reel Spin (the Same Applies During Free Game))

Figure 19:
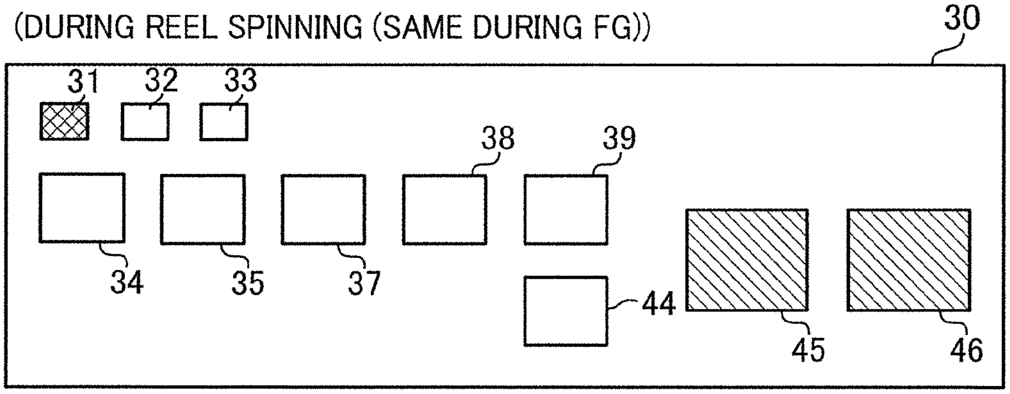
FIG. 19 shows an operation state of the control panel.

As shown in FIG. 19, the change button 31 is in the off state but active. The button is turned on/off as pressed. The cashout button 32 is in the off state and disabled. The help button 33 is in the off state and disabled. The maximum BET button 45 is in the on state and active. Quick stop is executed when the button is pressed. The spin button 46 is in the on state and active. Quick stop is executed when the button is pressed. The other buttons are in the off state and disabled.

(Details of Operation of Control Panel 30: During Cancelable Effect Screen)

Figure 20:
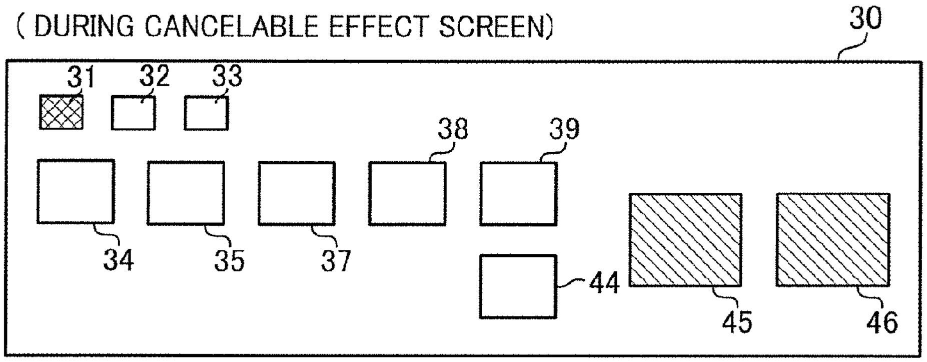
FIG. 20 shows an operation state of the control panel.

As shown in FIG. 20, the change button 31 is in the off state but active. The button is turned on/off as pressed. The cashout button 32 is in the off state and disabled. The help button 33 is in the off state and disabled. The maximum BET button 45 is in the on state and active. The effect is canceled when the button is pressed. The spin button 46 is in the on state and active. The effect is canceled when the button is pressed. The other buttons are in the off state and disabled.

(Details of Operation of Control Panel 30: In WIN Increment—During Normal Game)

Figure 21:
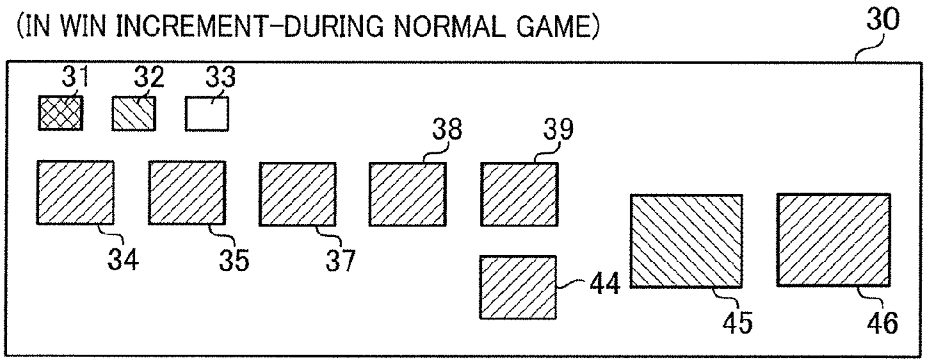
FIG. 21 shows an operation state of the control panel.

As shown in FIG. 21, the change button 31 is in the off state but active. The button is turned on/off as pressed. The cashout button 32 is in the on state and active. The increment is canceled when the button is pressed. The help button 33 is in the off state but active. The 1-BET button 34 to the 10-BET button 39 are in the off state or are in the on state and active. In other words, these buttons retain the state of the previous game play. The increment is canceled when one of the buttons is pressed, and the GAME OVER is executed and the selected bet is set and the button is turned on. The maximum BET button 45 is in the on state and active. The increment is canceled when the button is pressed, and the processes from Take WIN to GAME OVER are executed. The spin button 46 is in the on state and active. The increment is canceled when the button is pressed, and the processes from Take WIN to GAME OVER are executed. When credits allowing repeat bet are retained, the next game starts. The spin button 46 may be in the on state and active, and the increment may be canceled when pressed and the GAME OVER may be executed. The gamble button 44 is in the on state and active when Gamble is active. The increment is canceled when the button is pressed, and a gamble screen is displayed. The button is in the off state and disabled when Gamble is disabled.

(Details of Operation of Control Panel 30: In WIN Increment—During Free Game)

Figure 22:
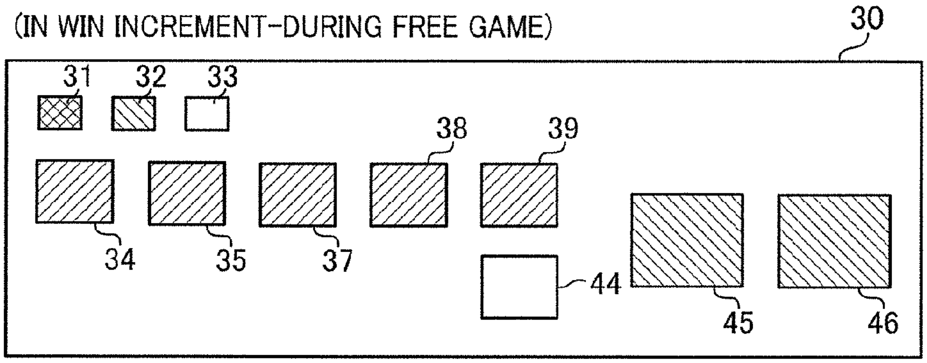
FIG. 22 shows an operation state of the control panel.

As shown in FIG. 22, the change button 31 is in the off state but active. The button is turned on/off as pressed. The cashout button 32 is in the on state and active. The next game starts when the number of remaining games is not zero. When the number of remaining games is zero, the shifting to a total WIN signboard is executed. The help button 33 is in the off state and disabled. The 1-BET button 34 to 10-BET button 39 are in the off state or are in the on state and active. Each button is turned on only at the time of betting with the triggering of a free game. The next game starts when the number of remaining games is not zero. When the number of remaining games is zero, the shifting to a total WIN signboard is executed. The maximum BET button 45 is in the on state and active. The next game starts when the number of remaining games is not zero. When the number of remaining games is zero, the shifting to a total WIN signboard is executed. The spin button 46 is in the on state and active. The next game starts when the number of remaining games is not zero. When the number of remaining games is zero, the shifting to a total WIN signboard is executed. The gamble button 44 is in the off state and disabled.

(Details of Operation of Control Panel 30: In Trigger Payout Increment after Winning Free Game)

Figure 23:
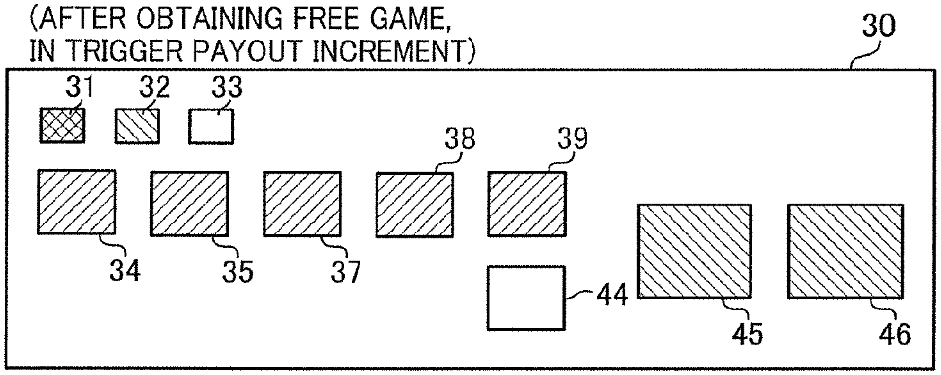
FIG. 23 shows an operation state of the control panel.

As shown in FIG. 23, the change button 31 is in the off state but active. The button is turned on/off as pressed. The cashout button 32 is in the on state and active. The increment is canceled when the button is pressed, and the shifting to the next step is executed. The help button 33 is in the off state and disabled. The 1-BET button 34 to 10-BET button 39 are in the off state or are in the on state and active. Each button is turned on only at the time of betting with the triggering of a free game. The increment is canceled when the button is pressed, and the shifting to the next step is executed. The maximum BET button 45 is in the on state and active. The increment is canceled when the button is pressed, and the shifting to the next step is executed. The spin button 46 is in the on state and active. The increment is canceled when the button is pressed, and the shifting to the next step is executed. The gamble button 44 is in the off state and disabled.

(Details of Operation of Control Panel 30: Waiting for Selection—Direct Selection of Control Panel 30)

Figure 24:
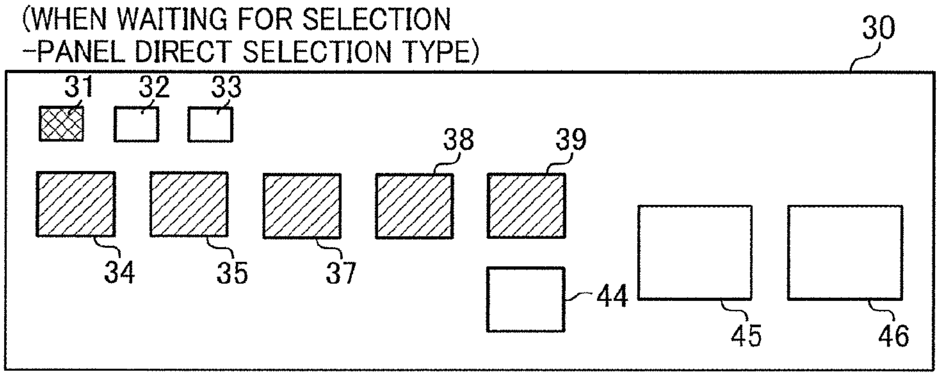
FIG. 24 shows an operation state of the control panel.

As shown in FIG. 24, the change button 31 is in the off state but active. The button is turned on/off as pressed. The cashout button 32 is in the off state and disabled. The help button 33 is in the off state and disabled. The 1-BET button 34 to the 10-BET button 39 are in the on state and active when allocated to selection buttons. The buttons are in the off state and disabled when not allocated to selection buttons. The maximum BET button 45 is in the off state and disabled. The spin button 46 is in the off state and disabled. The gamble button 44 is in the off state and disabled.

(Details of Operation of Control Panel 30: Waiting for Selection—Selection by Moving Cursor)

Figure 25:
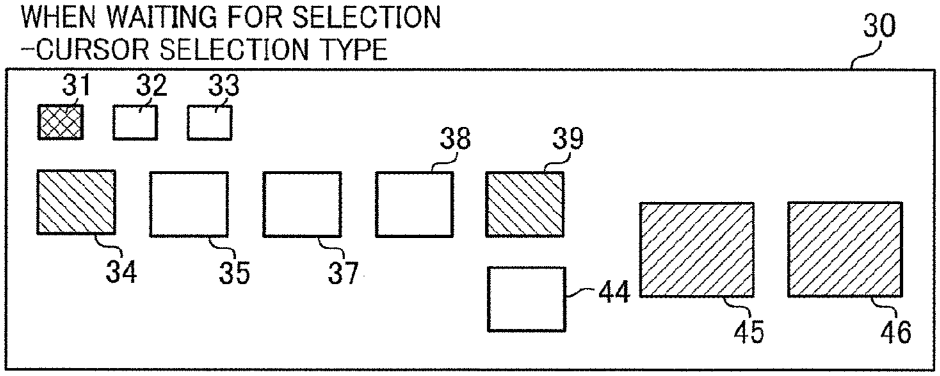
FIG. 25 shows an operation state of the control panel.

As shown in FIG. 25, the change button 31 is in the off state but active. The button is turned on/off as pressed. The cashout button 32 is in the off state and disabled. The help button 33 is in the off state and disabled. The 1-BET button 34 is in the on state and active. The cursor is moved to the next option when the button is pressed. The 10-BET button 39 is in the on state and active. The cursor is moved to the next option when the button is pressed. The maximum BET button 45 is in the on state and active when an icon is selected by the cursor. When no icon is selected by the cursor, the button is in the off state and disabled. The spin button 46 is in the on state and active when an icon is selected by the cursor. When no icon is selected by the cursor, the button is in the off state and disabled. The gamble button 44 is in the off state and disabled.

(Details of Operation of Control Panel 30: When Total WIN Signboard is Displayed after Free Game)

Figure 26:
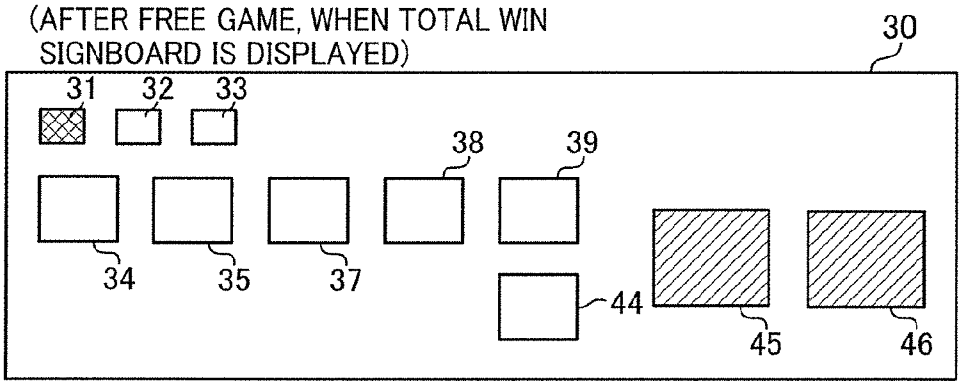
FIG. 26 shows an operation state of the control panel.

As shown in FIG. 26, the change button 31 is in the off state but active. The button is turned on/off as pressed. The cashout button 32 is in the off state and disabled. The help button 33 is in the off state and disabled. The maximum BET button 45 is in the off state and disabled until four seconds elapse. The button is in the on state and active after four seconds elapses. The spin button 46 is in the off state and disabled until four seconds elapse. The determination is confirmed when the button is pressed. The button is in the on state and active after four seconds elapses. The increment is canceled when the button is pressed. The gamble button 44 is in the off state and disabled.

(Details of Operation of Control Panel 30: When PLAY ON, GAMBLE or TAKE WIN is Displayed)

Figure 27:
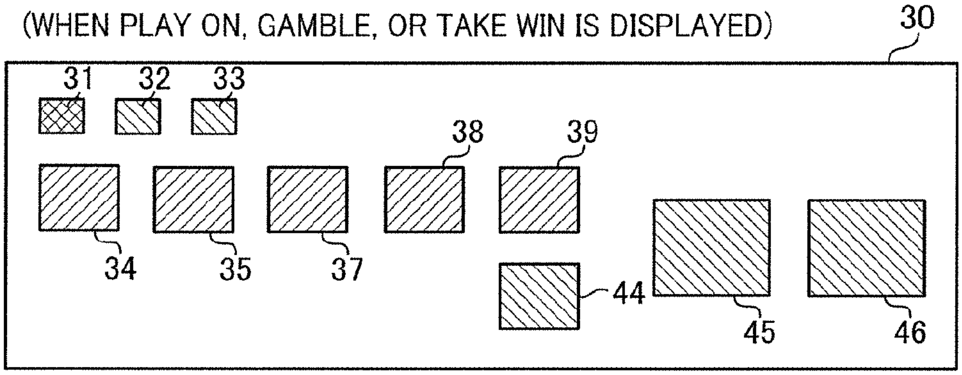
FIG. 27 shows an operation state of the control panel.

As shown in FIG. 27, the change button 31 is in the off state but active. The button is turned on/off as pressed. The cashout button 32 is in the on state and active. Take WIN and GAME OVER are conducted when the button is pressed. The help button 33 is in the on state and active. The help is displayed when the button is pressed. The 1-BET button 34 to 10-BET button 39 are in the off state or are in the on state and active. In other words, these buttons retain the state of the previous game play. Take WIN and GAME OVER are conducted when the button is pressed. The maximum BET button 45 is in the on state and active. The increment is canceled when the button is pressed and the GAME OVER is executed. The spin button 46 is in the on state and active. Take WIN and GAME OVER are conducted when the button is pressed. Then the next game starts. The increment may be canceled and the GAME OVER may be executed when the spin button 46 is pressed. The gamble button 44 is in the on state and active. Gamble is executed when the button is pressed.

(Details of Operation of Control Panel 30: In Gamble)

Figure 28:
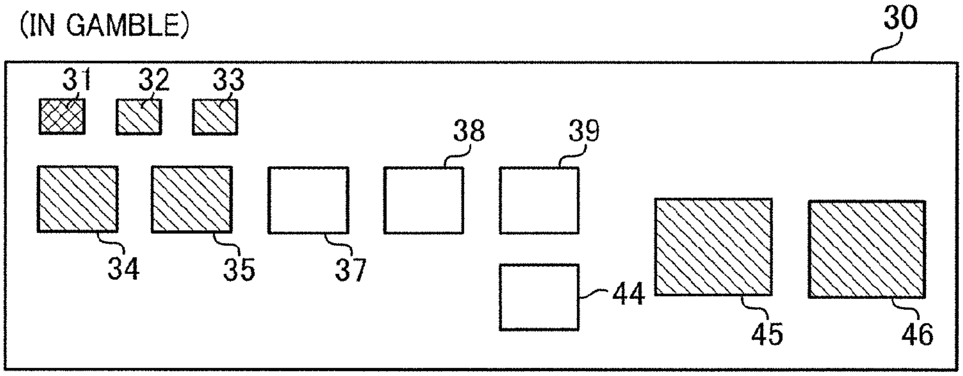
FIG. 28 shows an operation state of the control panel.

As shown in FIG. 28, the change button 31 is in the off state but active. The button is turned on/off as pressed. The cashout button 32 is in the on state and active. Take WIN and GAME OVER are conducted when the button is pressed. The help button 33 is in the on state and active. The help is displayed when the button is pressed. The 1-BET button 34 is in the on state and active. Red is selected when the button is pressed. The 2-BET button 35 is in the on state and active. Black is selected when the button is pressed. The maximum BET button 45 is in the on state and active. Take WIN and GAME OVER are conducted when the button is pressed. The spin button 46 is in the on state and active. Take WIN is conducted when the button is pressed, and the next game starts. Take WIN and GAME OVER may be conducted when the spin button 46 is pressed. The other buttons are in the off state and disabled.

(Details of Operation of Control Panel 30: In RESIDUAL GAMBLE)

Figure 29:
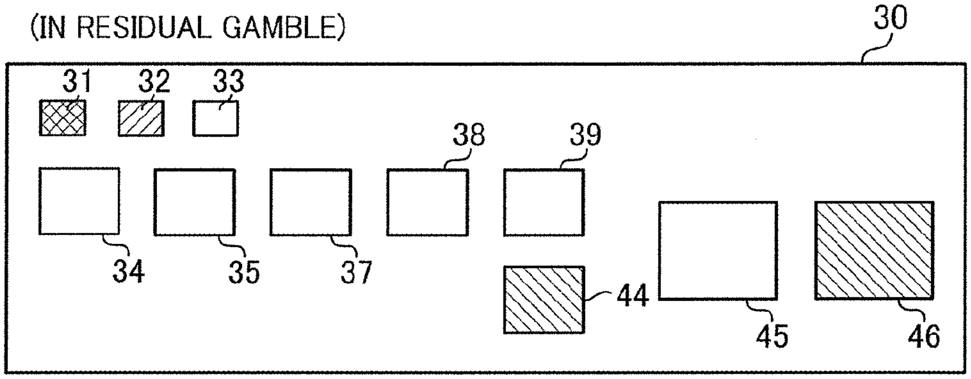
FIG. 29 shows an operation state of the control panel.

As shown in FIG. 29, the change button 31 is in the off state but active. The button is turned on/off as pressed. The cashout button 32 is in the on state and active in case of GAMBLE-ODD SUM. ATTENDANT PAY is conducted when the button is pressed. The button is in the off state and disabled in case of GAMBLE-NONE. The help button 33 is in the off state and disabled. The maximum BET button 45 is in the off state and disabled. The spin button 46 is in the on state and active. The normal game comes back when the button is pressed. The gamble button 44 is in the on state and active. RESIDUAL GAMBLE starts when the button is pressed. The other buttons are in the off state and disabled.

(Details of Operation of Control Panel 30: When Error Occurs)

Figure 30:
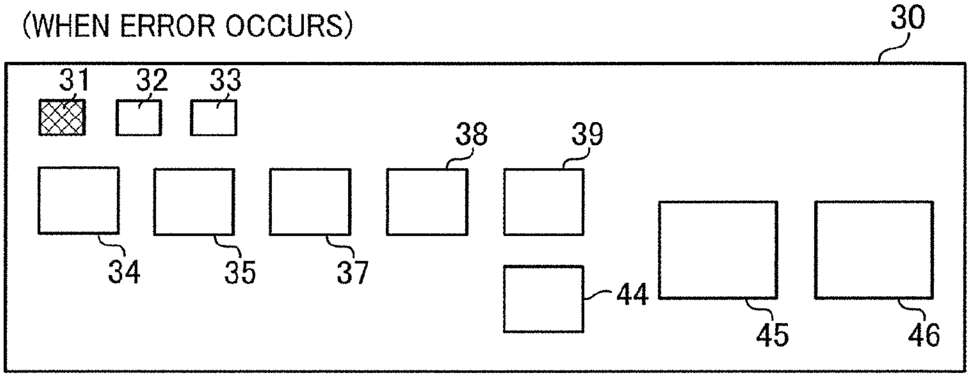
FIG. 30 shows an operation state of the control panel.

As shown in FIG. 30, the change button 31 is in the off state but active. The button is turned on/off as pressed. The cashout button 32 is in the off state and disabled. The other buttons are in the off state and disabled.

(Details of Operation of Control Panel 30: After Return from Error)

Figure 31:
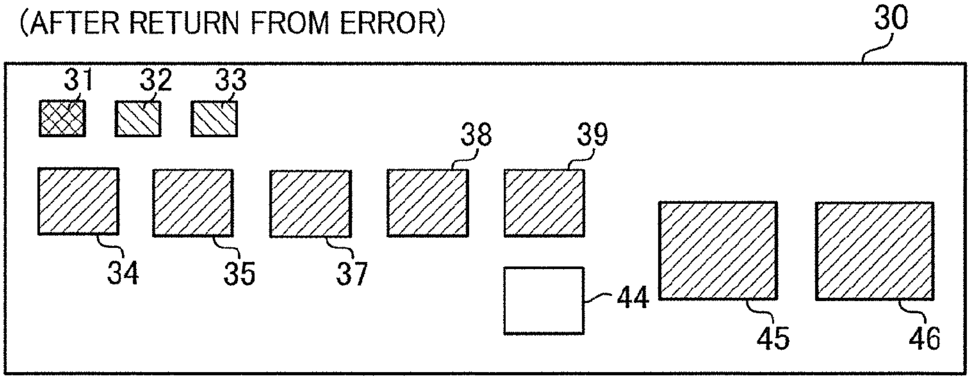
FIG. 31 shows an operation state of the control panel.

As shown in FIG. 31, the change button 31 is in the off state and disabled. The button remains in the off state but active after 120 seconds elapses. The cashout button 32 is in the on state and active. The help button 33 is in the on state and active. The 1-BET button 34 to 10-BET button 39 are in the off state or are in the on state and active. In other words, these buttons retain the state of the previous game play. The gamble button 44 is in the off state and disabled. The maximum BET button is turned on when MAX BET is possible, and a game starts with "MAX BET" when the button pressed. When the credits are less than MAX BET, the button is turned on, and the maximum credits bettable are selected when the button is pressed. When the credits are less than the amount for one bet, the button is in the off state and disabled. The spin button 46 is in the on state and active when the remaining credits>selected bet pattern. The button is in the off state and disabled when the remaining credits<selected bet pattern.

(Image Display on Upper Image Display Panel 131 and Lower Image Display Panel 141)

An example of image display on the upper image display panel 131 and the lower image display panel 141 during the operation of the slot machine 10 above will be specifically described.

Figure 32A:
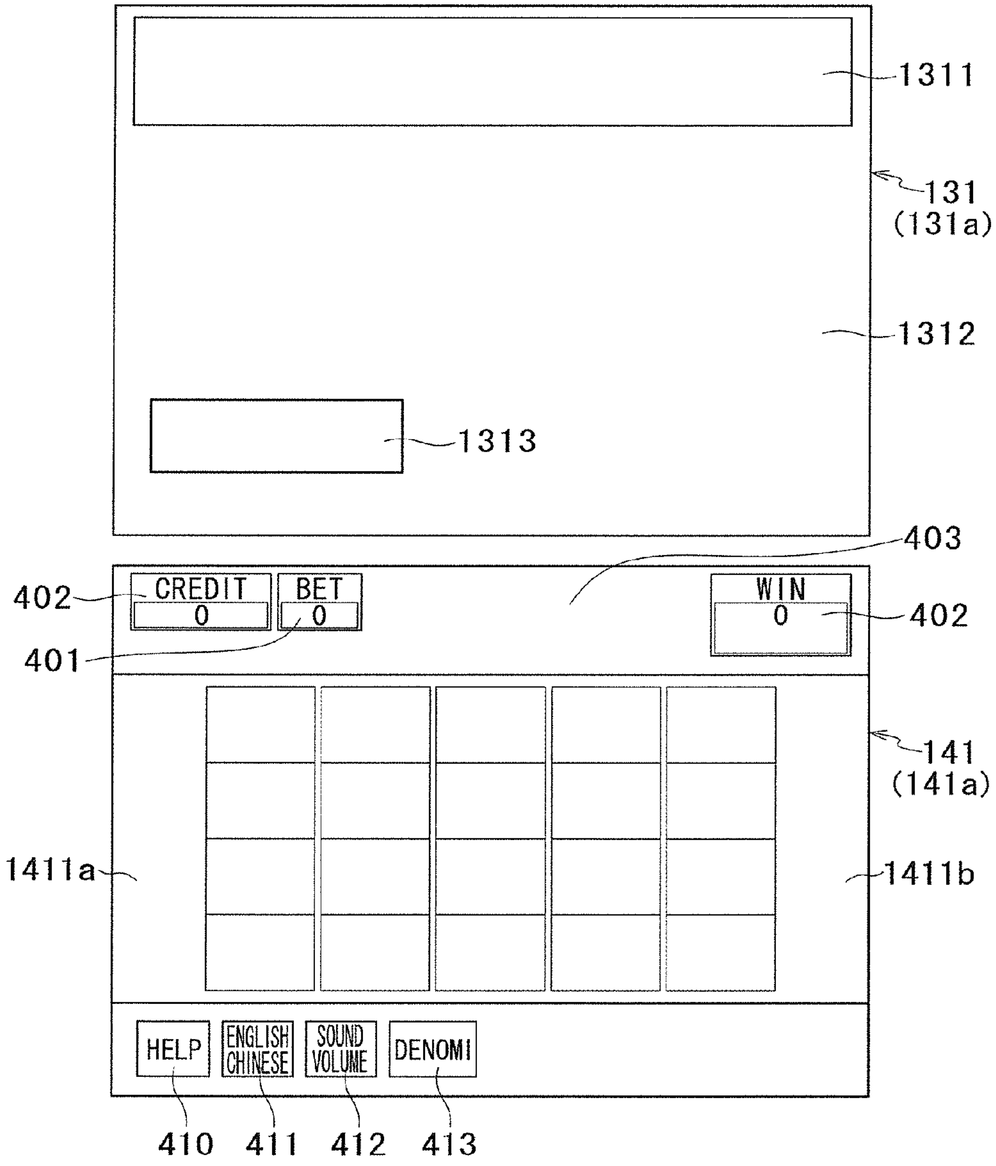
FIG. 32A illustrates a game screen.

FIG. 32A shows image display on the upper image display panel 131 and the lower image display panel 141 in a normal mode. The upper image display panel 131 includes a game title region 1311, an image region 1312, and a catch copy region 1313. The game title region 1311 displays a logotype of the game title. When the language is switched to English or Chinese, the title is displayed in the selected language. For example, transliteration "KINGU I-GURU" is displayed in katakana when Japanese is selected, whereas "KING EAGLE" is displayed when English is selected. The image region 1312 displays an eagle. The catch copy region 1313 displays a catch copy representing the characteristic of the game. The displayed contents do not change in the normal game even if the free game is executed. When the language is switched to English or Chinese, the title is displayed in that language. For example, transliteration "20 KO NO TSUIKA WILD TSUKI 10 FURII GEEMU!" is displayed in Chinese characters, hiragana, katakana, and alphabet when Japanese is selected, whereas "10 FREE GAMES with 20 EXTRA WILDs!" is displayed when English is selected. It is noted that the numbers "10" and "20" are emphasized.

Figure 32B:
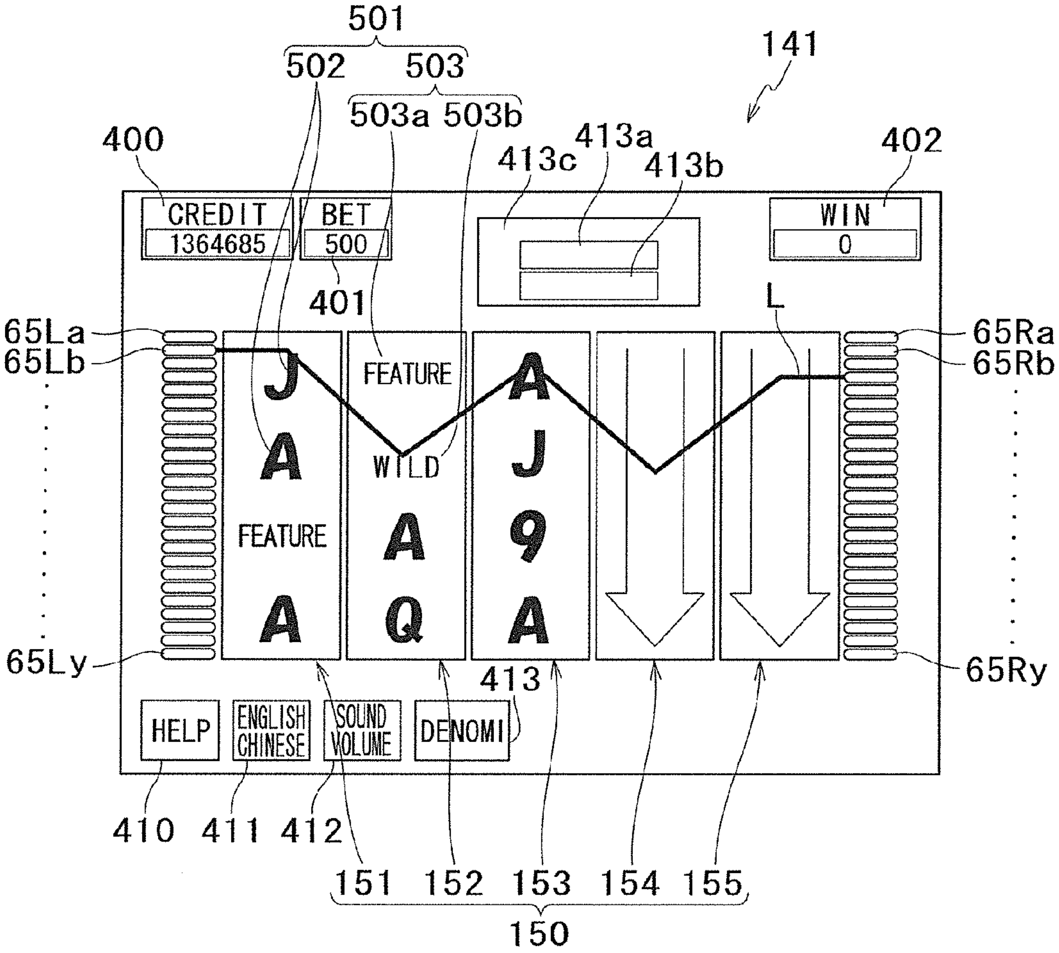
FIG. 32B illustrates a game screen.

As shown in FIG. 32B, the lower image display panel 141 has, at its upper part, a credit meter 400, a bet meter 401, and a WIN meter 402. Between the bet meter 401 and the win meter 402, a system font area 403*c* is provided. Furthermore, the lower image display panel 141 has, at its lower part, a help touch button 410, a language switching touch button 411, a sound volume switching touch button 412, and a denomination button 413.

The system font area 403*c* displays bet information and a game state. That is to say, the system font area 403*c* displays bet information of the game (or the last game). On the right and left sides of the lower image display panel 141, line number regions 1411*a* and 1411*b* are provided, respectively. The line number regions 1411*a* and 1411*b* define 40 lines. Because the games in the present embodiment use all lines, an intermediate stage is not provided. Details will be given later.

The help touch button 410 displays the first page of the help screen when touched. The help touch button is darkened when it is inactivated, e.g., during the rotation of the reels. As the language switching touch button 411 is touched, the language is switched between English and Chinese. The language switching touch button 411 is activated only during the advertisement. The button is darkened when it is invalidated, e.g., during the rotation of the reels. By setting the AUDIT, the displayed national flags are changed to "Britain/China" or "United States/China". When the switching of the language is set at "DISABLE", a "PAYTABLE" button is displayed. In other words, the button is changed to a button displaying a paytable for help. The sound volume switching touch button 412 is used for switching the game sound volume at three stages. Each time the button is touched, the game sound volume is switched such that, for example, from low to middle to high to small to middle. The denomination button 413 displays the current denomination. Details will be given later.

(Display Screen: Normal Game Screen)

FIG. 32B shows an example of a normal game screen which is the display screen of the normal game.

More specifically, the normal game screen has a display window 150 which is provided at the central portion and has five columns of video reels 151 to 155 and payline occurrence parts 65L and 65R which is symmetrically provided to the left and right of the display window 150.

Above the display window 150, a credit meter 400, a bet meter 401, and a win meter 402. The credit amount display unit 400 and the bet-number display unit 401 are displayed at the left edge part when viewed from the player. In the meanwhile, the win meter 402 is provided at the right edge part when viewed from the player. Between the bet meter 401 and the win meter 402, a system font area 403*c* is provided. The system font area 403*c* has, in an upper stage and a lower stage, a bet information display region 403*a* and a game state display region 403*b*, respectively.

The credit meter 400 displays the total number of credits. The default value is 0. The value is increased and decreased as follows: When "take WIN", which indicates winning in a game, is achieved, the credit won in the game is added to the credit meter. When a game is played, the bet number is subtracted from the credit meter. The bet number is also subtracted when the collect ends.

The bet meter 401 displays "Total Bets (=Bets×Lines)". The value is re-calculated in each game play. The win meter 402 displays the total obtained credits in an increment manner. The default value is 0. The win meter 402 switchably displays "Line XX Win XX" or "Total Win XX".

The display is switched in sync with the display of payline at the time of the occurrence of winning. The content above is displayed after the occurrence of winning. The values are determined based on the payline at the occurrence of winning and the number of credits.

The bet information display region 403*a* displays the bet information of a game (or the last game). In the first line, the number of bets per line is displayed. The display content is either singular or plural in line with the number of bets. More specifically, in case of one credit per line in the first line, "CREDIT" is displayed when the number of bets per line is 1. In the meanwhile, in case of two credits per line, "CREDITS" is displayed when the number of bets per line is 1. This content is displayed at the time of button selection by the player.

The game state display region 403*b* displays a current state of the game. A state display message is not displayed during the game, and the message "GAME OVER" is displayed when the game is over. When Gamble is waited for, "PLAY ON, GAMBLE or TAKE WIN" is displayed. The message is displayed until a button operation instructing Play-on or Gamble is conducted during the idle state or after the occurrence of winning.

In the meanwhile, below the display window 150 are provided a help touch button 410, a language switching touch button 411, a sound volume switching touch button 412, and a denomination button 413. These buttons 410, 411, 412, and 413 are provided left to right when viewed from the player.

The help touch button 410 displays the first page of the help screen 4101 when touched. The help touch button 410 is darkened when it is inactivated, e.g., during the rotation of the reels. The button is displayed when the normal screen is displayed. The button disappears in the help screen 4101, the free game screen and the double-up screen.

As the language switching touch button 411 is touched, the language is switched between English and Chinese. The language switching touch button 411 is activated only during the advertisement, and is darkened when it is invalidated, e.g., during the rotation of the reels.

The sound volume switching touch button 412 is used for switching the game sound volume at three stages. Each time the button is touched, the game sound volume is switched such that, for example, from low to middle to high to small to middle. The button is displayed when the normal screen is displayed. The button disappears when the help screen 4101 is displayed.

The denomination button 413 displays the current denomination set in the AUDIT. This button is displayed when screens other than the AUDIT are displayed.

In addition to the above, a number of lines selection touch button and a bet per line selection touch button may be additionally provided. The number of lines selection touch button is used for increasing or decreasing the number of paylines L. In the present embodiment, this button is arranged not to be touchable because the number of lines is fixed to 30. The bet per line selection touch button 415 makes it possible to conduct bet per line. When the button is touched, five selection buttons corresponding to the current bet configuration appear.

(Details of Display Screen: Payline Box)

Figure 33:
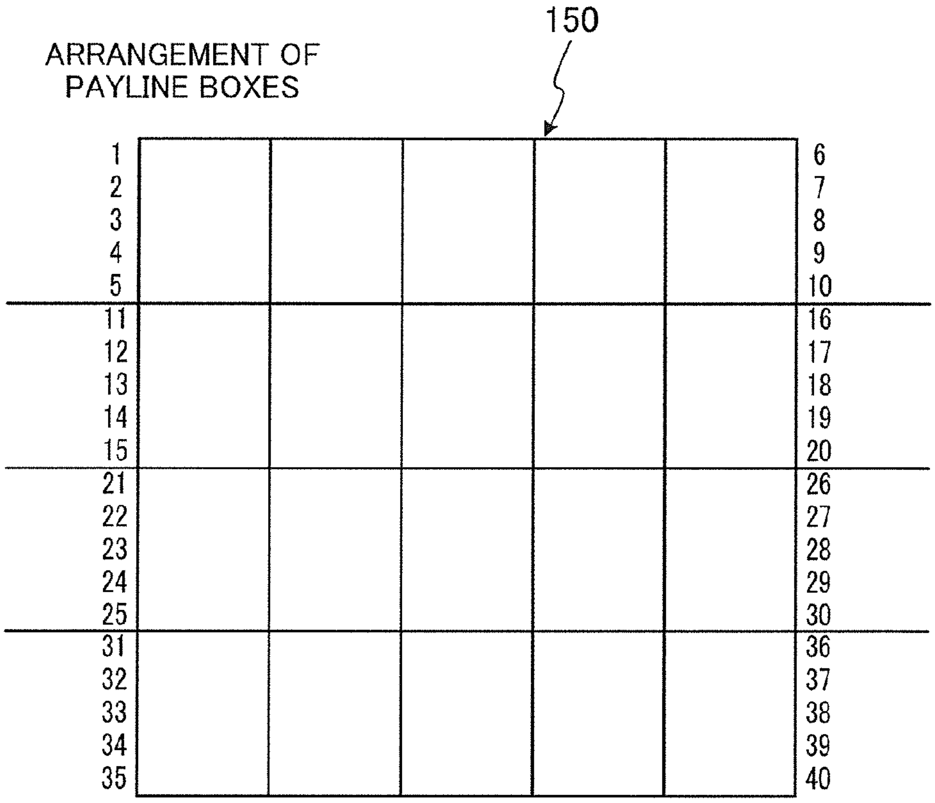
FIG. 33 illustrates bet lines.

The lower image display panel 141 described above forms, as shown in FIG. 33, payline boxes in the display window 150. As the payline boxes forming four rows and five columns are combined, 40 paylines L are formed as shown in FIG. 35. FIG. 36 shows the relationship between reel positions and numbers of reel stages. FIG. 37 shows the relationship between 40 payline numbers and the reels.

Figure 34:
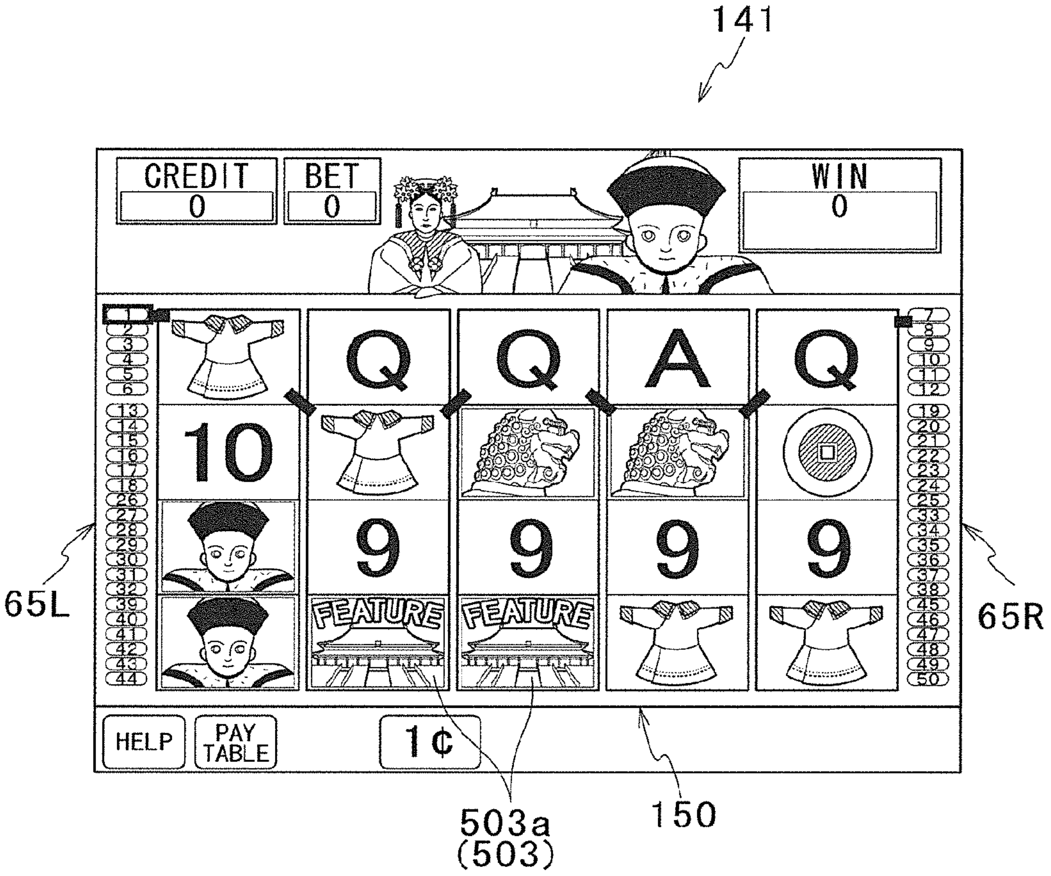
FIG. 34 illustrates bet lines.

Furthermore, as shown in FIG. 34, at the left and right edges of the display window 150, payline occurrence columns are provided in a symmetrical manner on the left and right. The left payline occurrence column on the left side when viewed from the player has 25 payline occurrence parts 65L. The right payline occurrence column on the right side when viewed from the player has 25 payline occurrence parts 65R.

The left payline occurrence parts 65L form pairs with the respective right payline occurrence parts 65R. The left payline occurrence parts 65L form pairs with the respective right payline occurrence parts 65R. From the left payline occurrence parts 65L to the right payline occurrence parts paired with the left payline occurrence parts 65L, paylines L are defined in advance. The paylines L are associated with the above-described payline boxes.

A payline L is activated when left and right payline occurrence parts 65L and 65R are connected with each other. In other cases, the paylines are inactive. The number of activated paylines L is determined based on a bet amount. When the bet amount is maximum, i.e., MAXBET, the upper limit of, i.e. 40 paylines are activated. An activated payline L allows the symbols to establish various types of winning combinations. The paylines L are all displayed one by one each for 0.5 second in the ascending order of the line numbers. In the free game, the display of all lines and each line is continued for at least five seconds.

(Details of Display Screen: WIN Display of Payline L in Free Game)

In the free game, line WIN display is continued until both of the following conditions are satisfied. A condition 1 is satisfied when all winning lines are displayed. A condition 2 is satisfied when five seconds elapse from the start of the display of winning lines. A condition 3 is satisfied when increment of the WIN meter finishes. However, when an operation is performed by the player (i.e., a button is pressed or a part of the screen other than the touch buttons is touched), the process shifts to the next spin.

(Details of Display Screen: WIN Meter 402)

Figure 38:
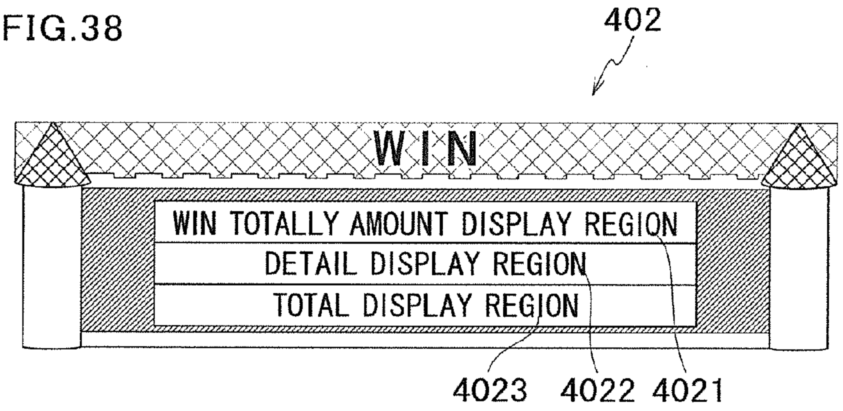
FIG. 38 illustrates a WIN meter.

As shown in FIG. 38, the win meter 402 displays a obtained credit and the details thereof in an integrated meter, when a winning is achieved. The win meter 402 includes a WIN totally amount display region 4021, a detail display region 4022, and a total display region 4023.

(Details of Display Screen: Win Meter 402: WIN Total Amount Display Region 4021)

The WIN total amount display region 4021 displays a WIN total amount display region WIN credit and a money amount. Increment display is performed based on a WIN increment speed sheet, when performed. More specifically, the WIN total amount display region 4021 displays a credit amount obtained in the current game cycle (or in the previous game cycle). When a credit is obtained more than once in one game cycle, the credit is added to the WIN total amount display region 4021 each time it is obtained. For example, when the free game is triggered in the normal game and line WIN 20 and scatter WIN 100 are obtained, increment is conducted from 0 to 120. Thereafter, when a payout amount of 200 is obtained in the free game, the increment is conducted from 120 to 320.

0 is displayed either when the next game cycle starts or when lost in Gamble. When won in Gamble, increment is not performed and the displayed amount is immediately doubled. During the idle state, the state display shows the total amount of WIN immediately after the winning, or 0 in other cases. 0 is displayed when SPIN is pressed. Increment display is performed during WIN increment. At the introduction of the free game, the total amount of WIN up until the game is displayed. During the free game, the total amount of WIN in that game up to the present time is displayed.

(Details of Display Screen: Win Meter 402: Detail Display Region 4022)

The detail display region 4022 displays the number of the winning line and the WIN credit after the stop of the fifth reel, when winning is achieved in the normal game or the free game. When more than one line payout simultaneously occurs, the line payouts are displayed one by one at intervals of 0.5 second. The line payouts are serially displayed from the one having the smallest number, and the one having the smallest number is displayed again after the one having the largest number is displayed. The details of the credits obtained by the spinning is displayed. When there are plural elements (e.g., another line or scatter), the elements are switched at intervals of 0.5 second. The order of switching of image display is from scatter payout to line payouts (from the smallest number to the largest number).

Details of the image display will be described below. Immediately after a normal winning in the idle state, the detail of the payout is displayed. Nothing is displayed in other cases. Furthermore, nothing is displayed when the spin button is pressed. The detail of the payout is displayed during WIN increment. When there are more than one payout, the details of the payouts are switched at intervals of 0.5 second. Furthermore, nothing is displayed at the time of the introduction of the free game. Furthermore, nothing is displayed during the rotation of the reels in the free game. When a line winning exists immediately after the stop of the reels in the free game, the detail of the payout is displayed. Nothing is displayed in other cases. Examples of the displayed image are "Line xx WIN=12345678" (WIN in normal game or free game) and "scatter WIN=12345678" (WIN by trigger symbol 503*a*).

(Details of Display Screen: Win Meter 402: Total Display Region 4023)

The total display region 4023 displays the total credits of the detail display region 4022 when the increment in the WIN total amount display region 4021 is completed. The region is not displayed until the increment in the WIN total amount display region 4021 is completed. More specifically, the total credit amount obtained by the spinning in the game is displayed. After the increment is finished in the WIN total amount display region 4021, the total amount is displayed.

The state display is carried out as below. In the idle state, total WIN is displayed immediately after normal WIN. 0 is displayed in other cases. Nothing is displayed when SPIN is pressed. Nothing is displayed during the WIN increment. The total WIN is displayed after the WIN increment. Nothing is displayed at the time of the introduction of a free game. Furthermore, nothing is displayed during the rotation of the reels in a free game. Immediately after the stop of the reels in the free game, the total WIN is displayed after the increment is finished in the WIN total amount display region 4021 if there is a line WIN. Nothing is displayed in other cases.

(Details of Display Screen: System Font Area 403*c*)

Figure 39:
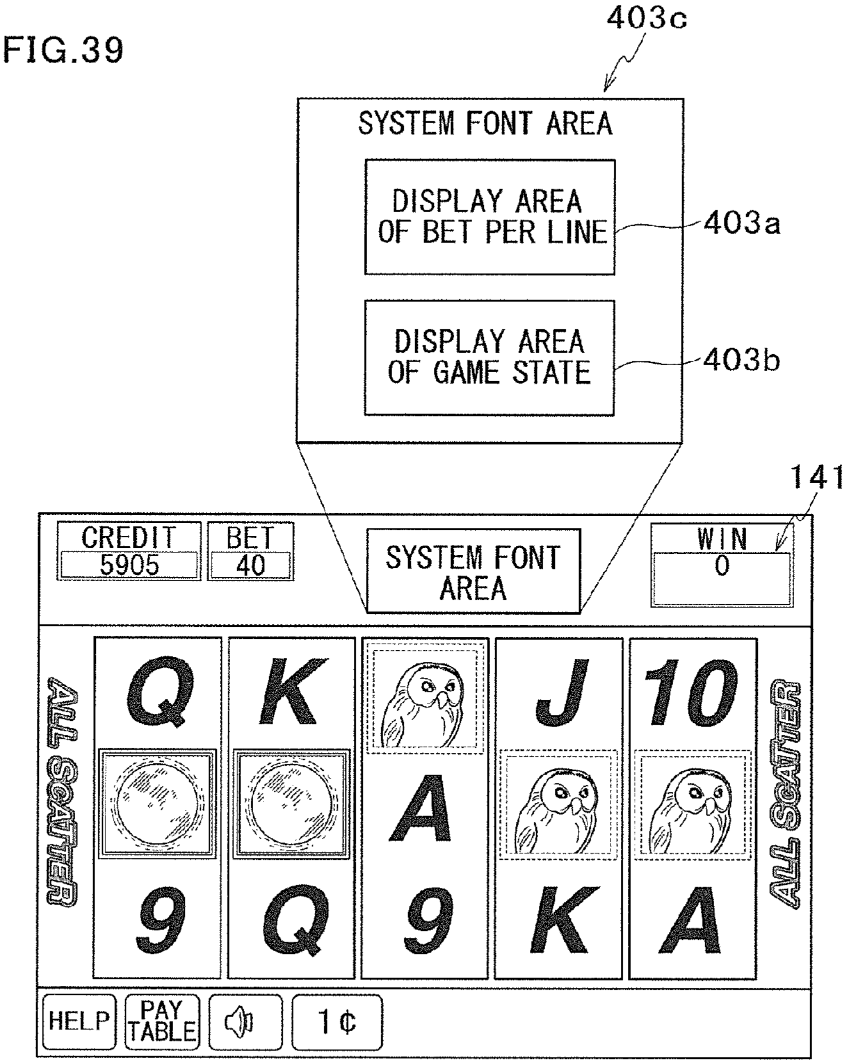
FIG. 39 illustrates a system font area.
Figure 40A:
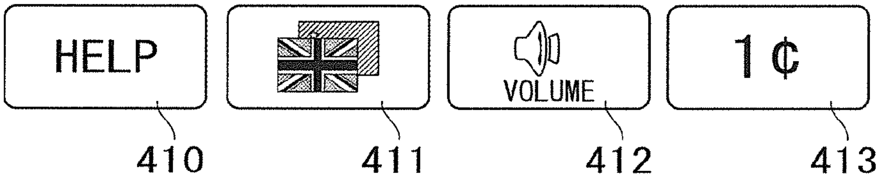
FIG. 40A shows the language switching touch button.
Figure 40B:
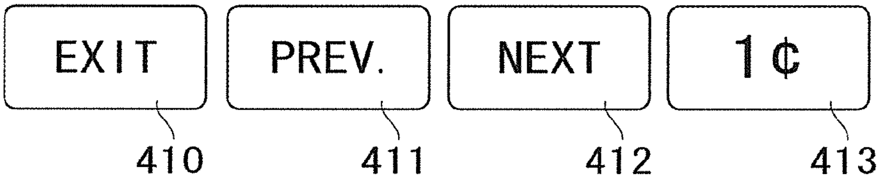
FIG. 40B shows the language switching touch button.
Figure 40C:
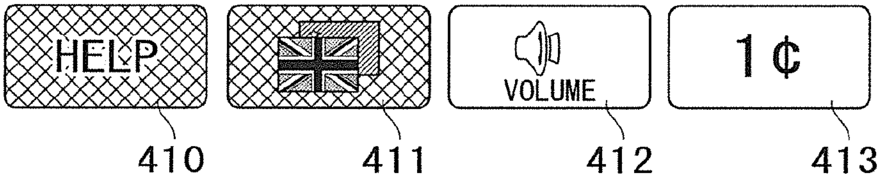
FIG. 40C shows the language switching touch button.
Figure 40D:
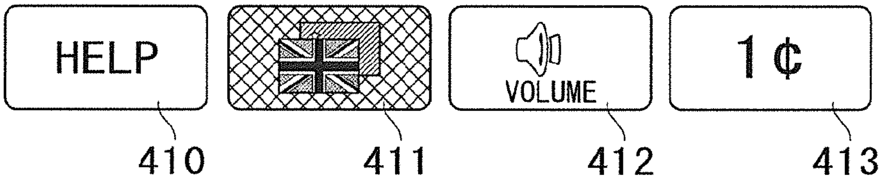
FIG. 40D shows the language switching touch button.
Figure 40E:
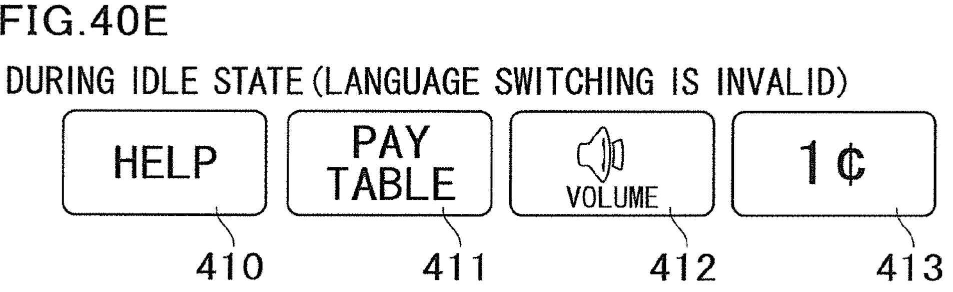
FIG. 40E shows the language switching touch button.
Figure 40F:
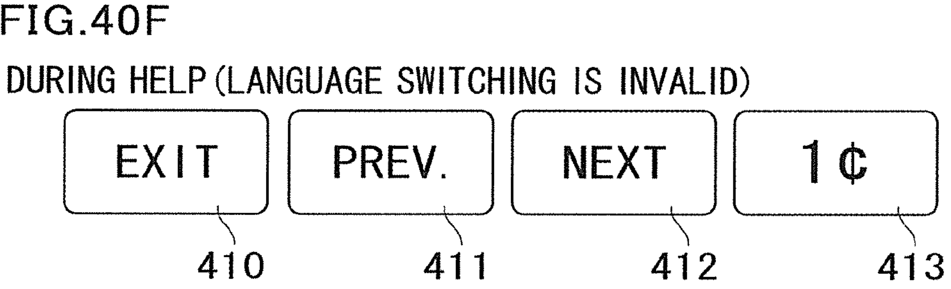
FIG. 40F shows the language switching touch button.
Figure 40G:
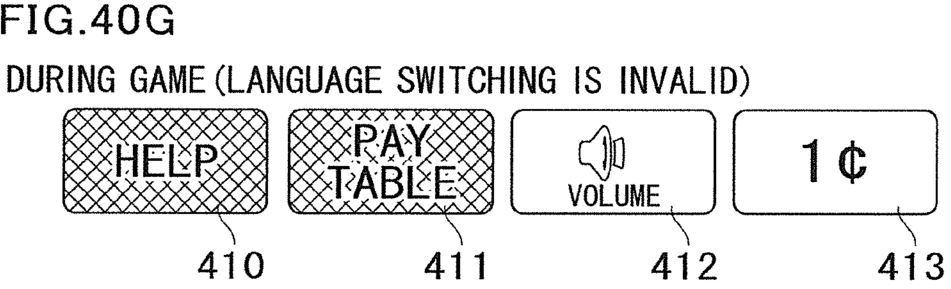
FIG. 40G shows the language switching touch button.
Figure 40H:
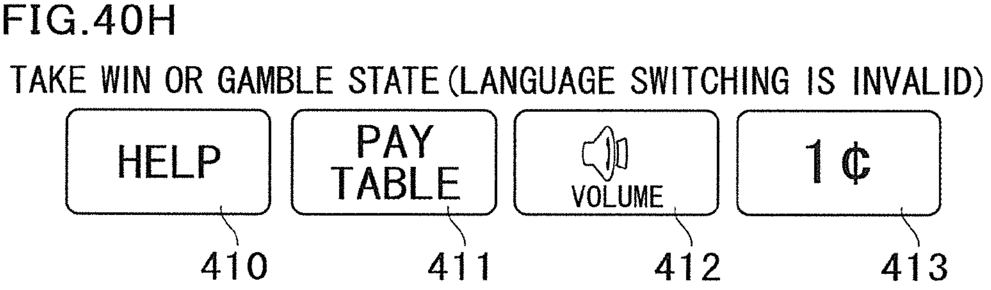
FIG. 40H shows the language switching touch button.

As shown in FIG. 39, the system font area 403*c* has a bet information display region 403*a* and a game state display region 403*b*. The system font area 403*c* shows the bet information of the game (or the last game) to the player. In the system font area 403*c*, a display region for the bet per line is provided in the bet information display region 403*a* and a display region for the game state is provided in the game state display region 403*b*.

The display contents on the bet information display region 403*a* of the system font area 403*c* are as follows. Immediately after the RAM is cleared, 1 Credit Per Line or XX CREDITS PER LINE (XX is the minimum value of the set betting pattern) is displayed. As the BET buttons 34 to 39 are pressed, the 1 Credit Per Line or the XX CREDITS PER LINE (indicating different values for the respective BET buttons) is displayed. In other cases, the immediately preceding display content is kept displayed.

The display contents on the game state display region 403*b* of the system font area 403*c* are as follows. Immediately after the RAM is cleared, GAME OVER is displayed. When the spin button 46 is pressed, nothing is displayed if the reel is rotating, and GAME OVER is displayed in other cases. When Gamble is possible immediately if winning is achieved after the reel stop (without trigger), "PLAY ON, GAMBLE or TAKE WIN" is displayed.

Nothing is displayed at the time of bonus trigger. Immediately after the bonus, if Gamble is possible on condition that winning is achieved, "PLAY ON, GAMBLE or TAKE WIN" is displayed. Immediately after the end of the jackpot, GAME OVER is displayed. When the help button 33 is pressed (to display the help screen 4101), nothing is displayed if Gamble is possible on condition that winning is achieved. GAME OVER is displayed in other cases.

When the help button 33 is pressed (to return to the game screen), the state before the help screen 4101 is displayed comes back. When the gamble button 44 is pressed (to display the gamble screen), nothing is displayed if Gamble is possible on condition that winning is achieved. The button cannot be operated in other cases. GAME OVER is displayed when the BET buttons 34 to 39 are pressed. GAME OVER is displayed when Take Win is selected. The previous states come back when returning from the AUDIT or in case of power failure.

(Details of Display Screen: Details of Screen Touch Buttons)

The positions and operations of the help touch button 410, the language switching touch button 411, the sound volume switching touch button 412, and the denomination button 413 are based on the positions in the operation states shown in FIGS. 40A to 40H, a lighting table shown in FIG. 41, and the language setting shown in FIG. 42. For example, the buttons are operable only in the idle state (game over state) regardless of the presence of credits. The switching is impossible during the help, during games, during an error, and during the AUDIT. (The buttons are not illuminated and invalidated, or are replaced with other buttons). The switching is impossible during the help, during games, during an error, and during the AUDIT. (The buttons are not illuminated and invalidated, or are replaced with other buttons). The national flag associated with the currently used language is displayed on the top. The states of the previous game are maintained even after the switching. The default language in English-speaking countries is English. The default language in Chinese-speaking countries is Chinese.

(Details of Display Screen: Sound Volume Switching Touch Button 412)

Figure 43:
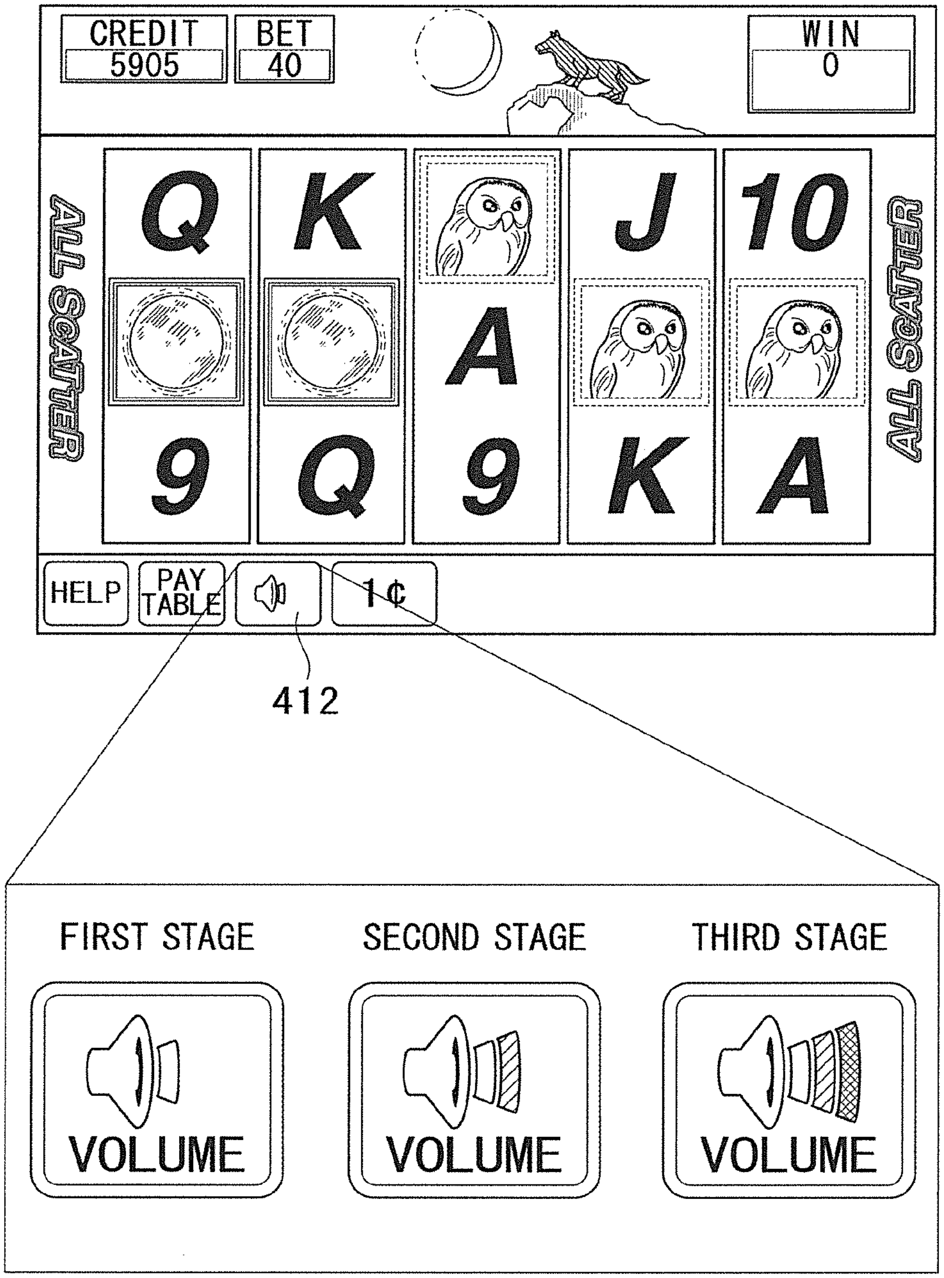
FIG. 43 illustrates a sound volume switching touch button.

As shown in FIG. 43, the sound volume switching touch button 412 has a function of allowing the player to switch the sound volume at will. The volume is switchable in, for example, three stages. The volume may be linearly changeable. The first stage corresponds to the minimum volume. The second stage corresponds to the medium volume. The third stage corresponds to the maximum volume. The volume stages are switched such that from the first stage to the second stage to the third stage to the first stage.

The default volume stage is the first stage. The default bonus stage is set when (1) a game is activated and (2) at the return from the AUDIT (regardless of whether the volume in the AUDIT is changed). The coefficients of volume changes are 30% in the first stage, 70% in the second stage, and 100% in the third stage. The sound volume switching touch button 412 is always activated unless the button is hidden. The button is activated when GUI (Graphical User Interface) such as the help touch button 410 is displayed. However, when a help screen is displayed, the sound volume switching touch button 412 disappears from the GUI (i.e., is covered with the NEXT button), the button is not operable. The operation invalidation time of the sound volume switching touch button 412 after the touch, i.e., the minimum interval between serial touching is 0.15 second (150 msec). The default sound volume setting value in the AUDIT is 12. The default value is 5 when no sound volume adjustment touch panel function is provided. The reproduction sound volume of the volume setting change sound in the AUDIT is identical with the default volume of the sound volume switching touch button 412 (i.e., the volume reflecting the coefficient in the default stage).

(Details of Display Screen: AUDIT Screen)

Figure 44:
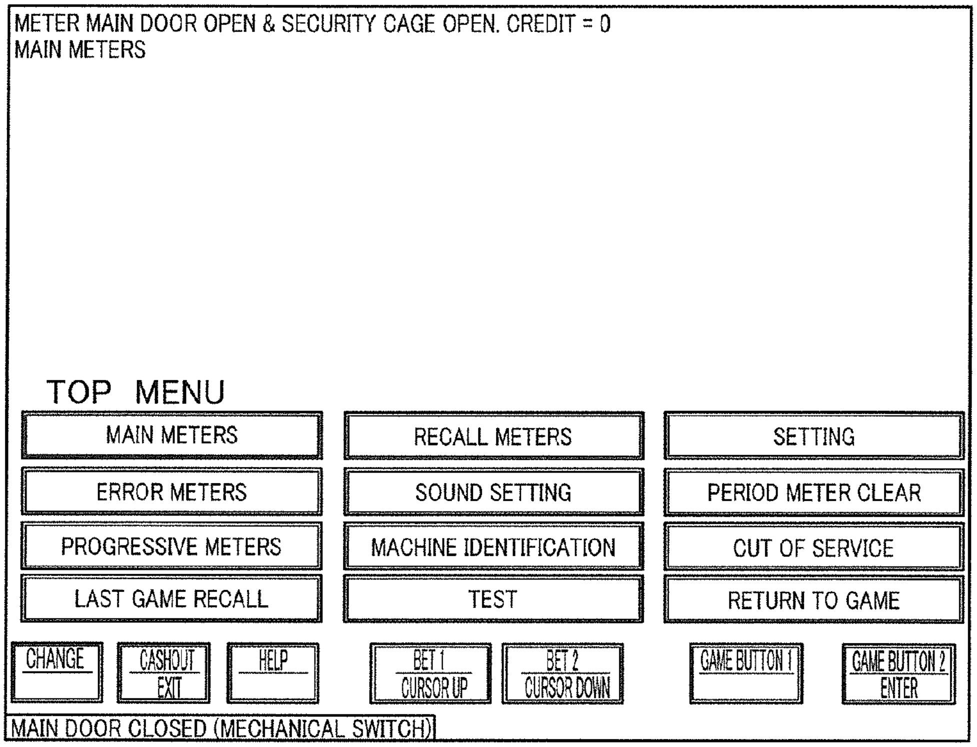
FIG. 44 shows an AUDIT screen.
Figure 45:
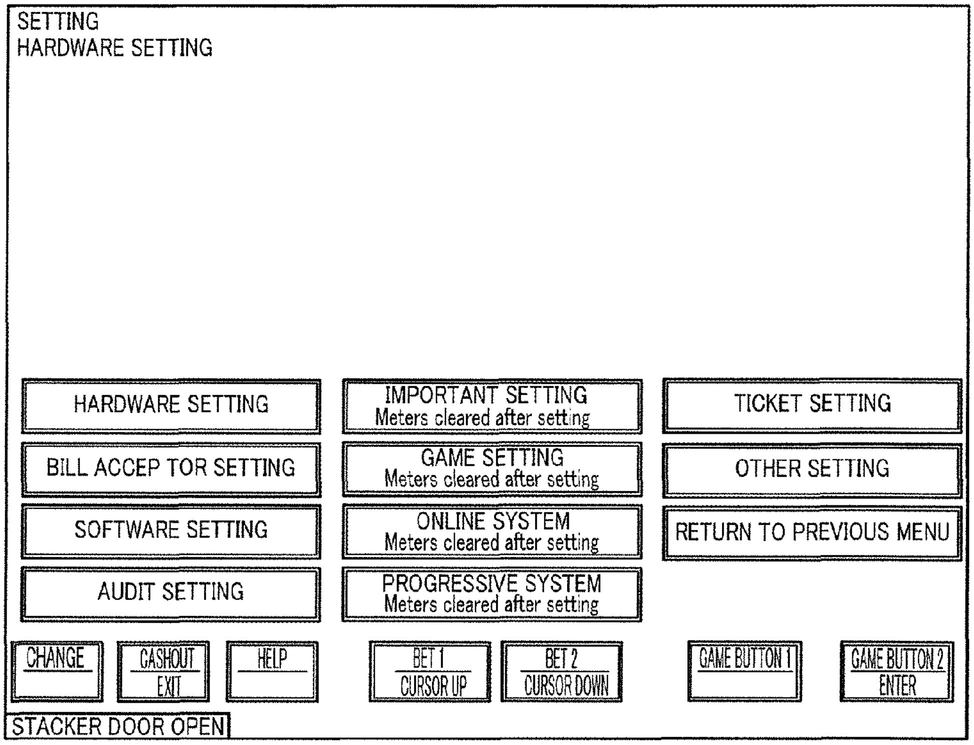
FIG. 45 shows an AUDIT screen.

As shown in FIG. 44, the AUDIT screen allows the switching of the national flag on an AUDIT menu. In the switching of the national flag on the AUDIT menu, "national flag" displayed on the touch button at the switching of the language can be set on the AUDIT menu. For example, the operator enters the "AUDIT menu". Then "SETTING" is pressed, and "SOFTWARE SETTING" is pressed as shown in FIG. 45, a screen shown in FIG. 46 appears. It is noted that the operations by the control panel 30 or the like are not changed from the current settings.

Figures 46, 47:
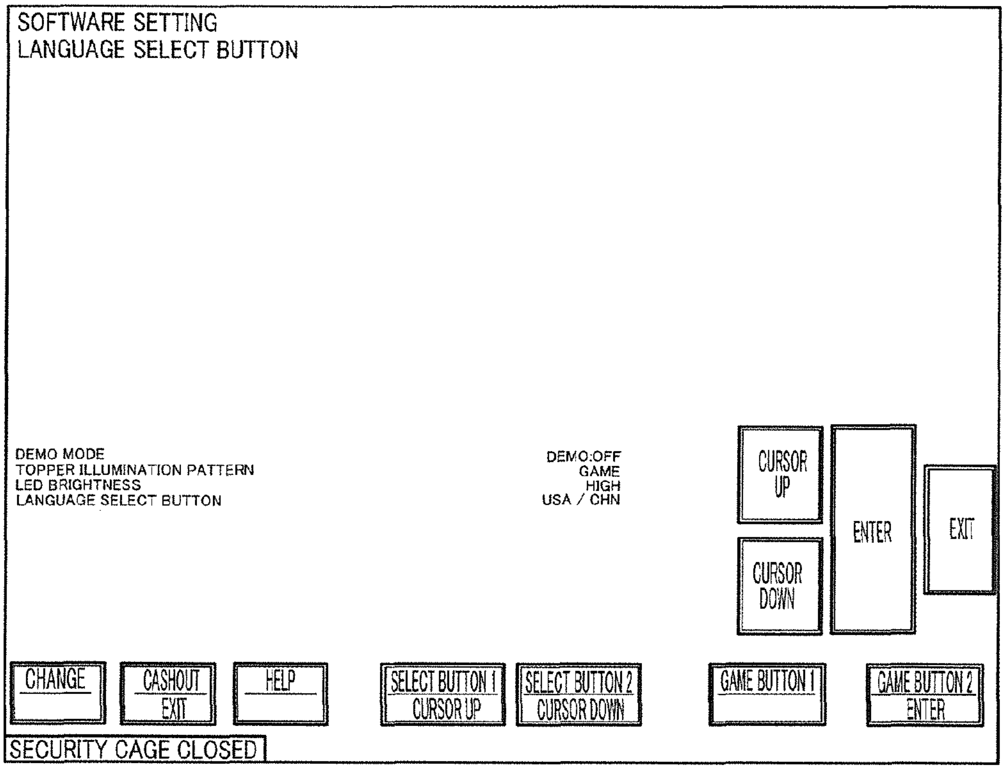
FIG. 46 shows an AUDIT screen.
FIG. 47 illustrates display languages.

In the screen shown in FIG. 46, the item "LANGUAGE SELECT BUTTON DISPLAY" is added. In regard to the language switching button, the display content in this later is one of the followings. That is, "LANGUAGE SELECT BUTTON DISPLAY" is one of "DISABLED", "UK/CHN", and "US/CHN".

In addition to the above, the initial display at the clearance of the RAM is shown in FIG. 47. That is to say, in North America, the display language is English, the national flags are U.S./China, and the U.S. flag is on the front on the function touch button. In the Macau area, the display language is English, the national flags are U.K./China, and the U.K. flag is on the front on the function touch button. In the other areas, the display language is English, the national flags are U.K./China, and the U.K. flag is on the front on the function touch button.

Figure 48:
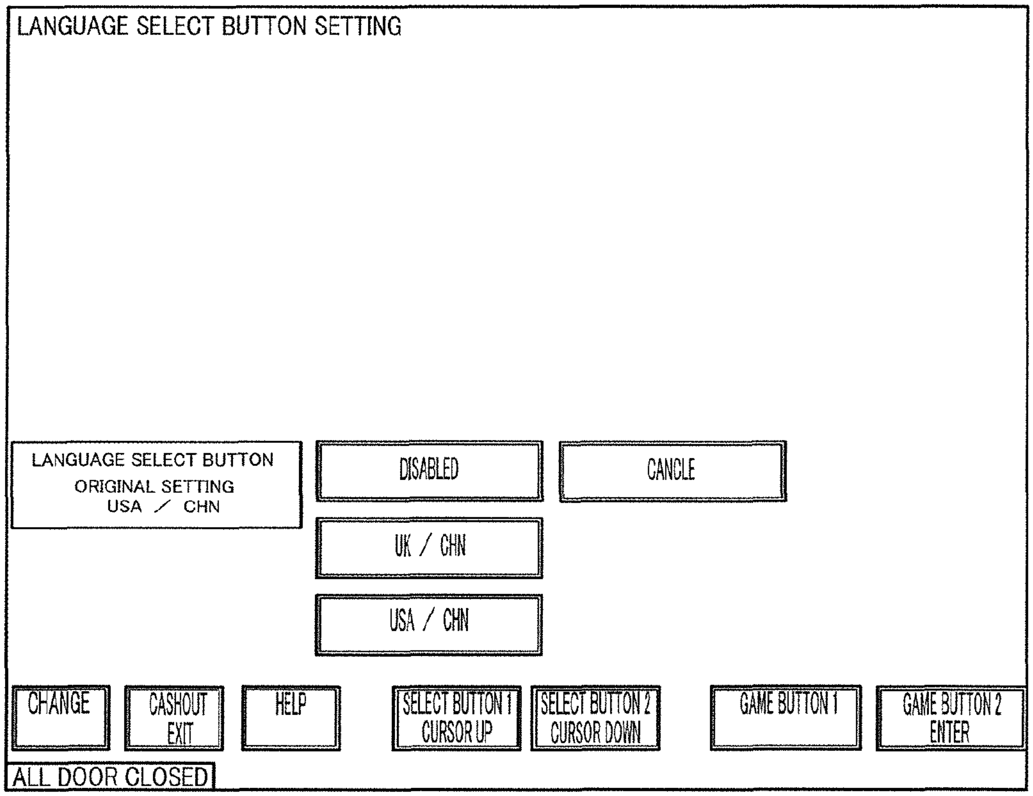
FIG. 48 shows an AUDIT screen.

When the item "LANGUAGE SELECT BUTTON DISPLAY" is selected, a screen shown in FIG. 48 is displayed. It is noted that the selected item is enclosed by a red frame. It is noted that the operations by the control panel 30 or the like are not changed from the current settings. "DISABLED" is setting with which the switching function is disabled (only English). The language switching touch button is switched to "PAYTABLE" touch button. After the touch (i.e., the determination by the button), the screen of the immediately above layer is displayed and the determination is confirmed. "UK/CHN" indicates that the U.K. flag is set. "USA/CHN" indicates that the U.S. flag is set. The button also functions as the activation of the switching function (i.e., the switching touch button is displayed). After the touch (i.e., the determination by the button), the screen of the immediately above layer is displayed and the determination is confirmed. The selected national flag is on the front of the touch button (Chinese flag is on the behind). By "CANCEL", the screen is canceled and the screen of the immediately above layer comes back. The contents that were previously set remain the same.

(Details of Display Screen: Help Screen 4101)

Figure 49:
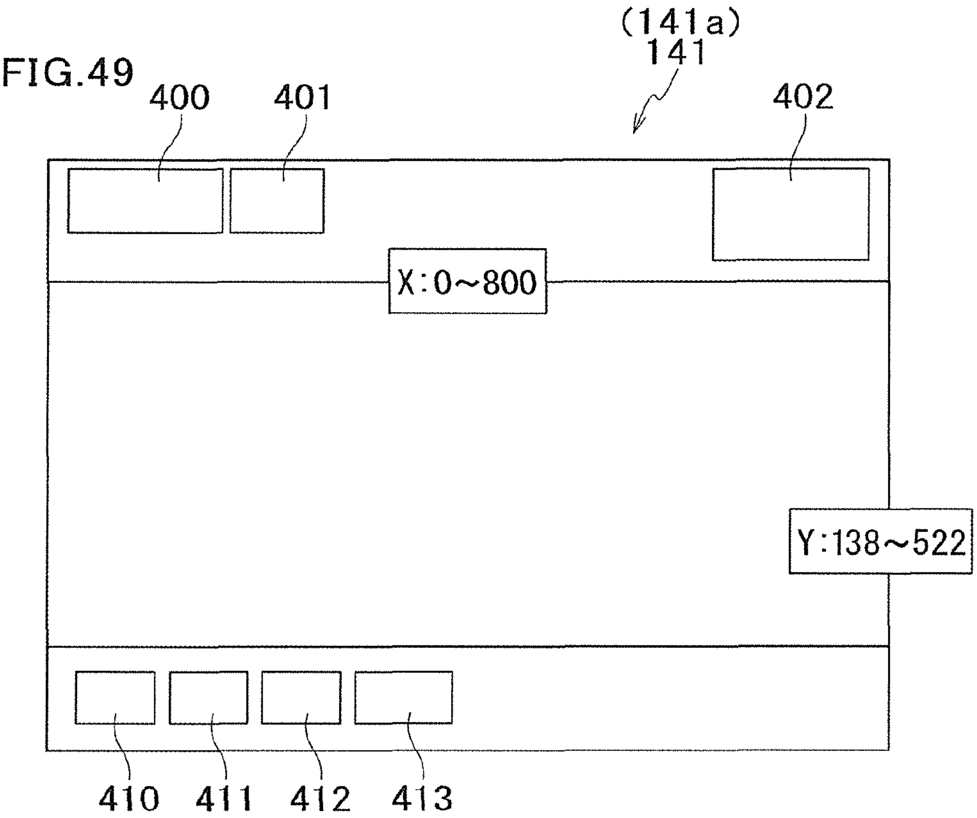
FIG. 49 illustrates a help screen.
Figure 50:
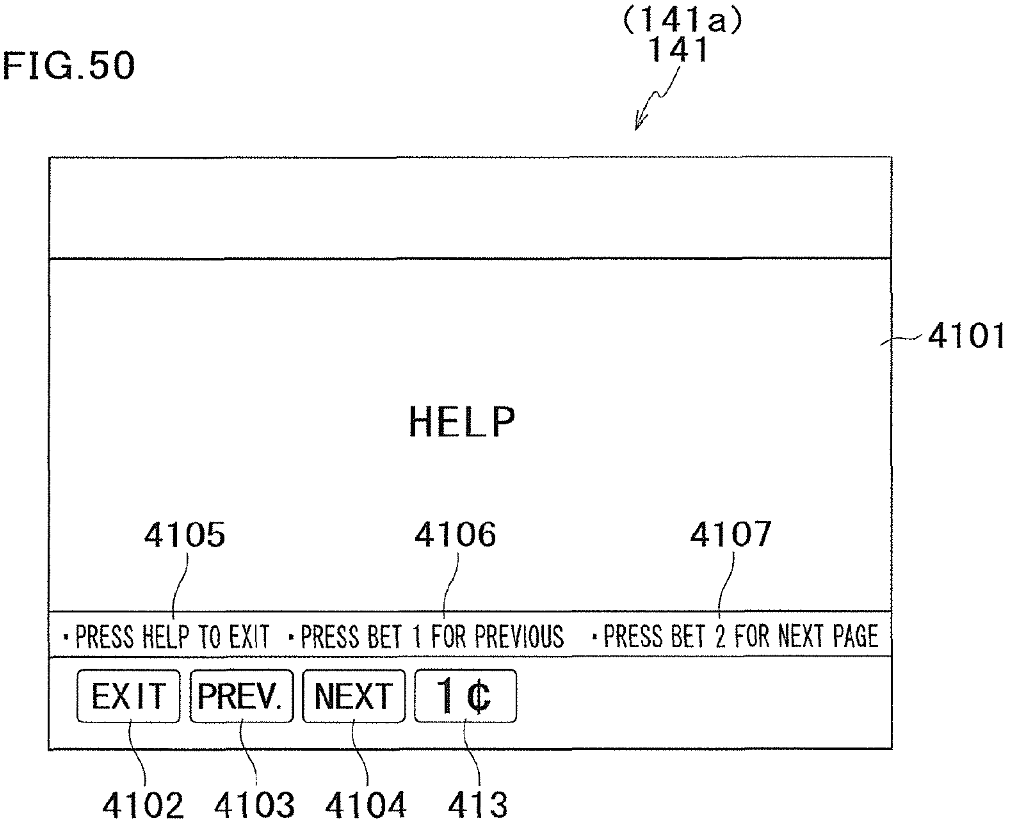
FIG. 50 illustrates a help screen.

As shown in FIG. 49, the lower image display panel 141 displays a help screen 4101 as the help touch button 410 is operated. Below the help screen 4101 are provided text display regions 4105, 4106, and 4107, as shown in FIG. 50. On the text display regions 4105, 4106, and 4107, texts are displayed with the system font. The help touch button 410 is switched to an EXIT button 4102, the language switching touch button 411 is switched to a PREV button 4103, and the sound volume switching touch button 412 is switched to a NEXT button 4104. When the EXIT button 4102 is touched, the help is terminated and the normal game screen comes back. As the PREV button 4103 is touched, the previous help page is displayed. As the NEXT button 4104 is touched, the next help page is displayed.

An example of the text displayed on the text display region 4105 is PRESS HELP TO EXIT. The maximum number of the characters is 25. An example of the text displayed on the text display region 4106 is PRESS BET 1 FOR PREVIOUS PAGE.

The maximum number of characters is 36. An example of the text displayed on the text display region 4107 is PRESS BET 2 FOR NEXT PAGE. The maximum number of these characters is 33.

Figures 51, 52:
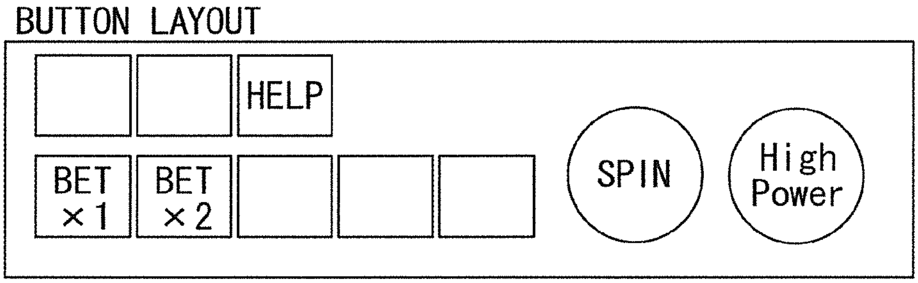
FIG. 51 illustrates the relationship between the control panel and the buttons.
FIG. 52 illustrates the control panel.

As shown in FIG. 51 and FIG. 52, these buttons 4102, 4103, and 4104 and the text display regions 4105, 4106, and 4107 are linked to the control panel 30. Even if the patterns are altered and the values are changed, the text display regions 4105, 4106, and 4107 display correct contents in accordance with the changes.

(Details of Display Screen: Help Screen 4101: Operations: Operation when Entering the Help Screen 4101)

When the help touch button 410 is pressed in the idle state, only the 1st screen is changed to the help screen 4101 while the 2nd screen keeps displaying the basic screen of the idle state. In this regard, the 2nd screen 131*a* is displayed on the upper image display panel 131, whereas the 1st screen 141*a* is displayed on the lower image display panel 141. The help screen 4101 is displayed only on the 1st screen 141*a*. During an error or AUDIT, the help touch button 410 LED is not illuminated so as not to allow the player to enter the help screen 4101. Whether it is possible to enter the help screen 4101 during games is different in each game. Basically, at the destinations of shipment, it is possible to enter the help screen 4101 only in the idle state. The help screen 4101 must be displayed from the first page.

(Details of Display Screen: Help Screen 4101: Operations: Operation in the Help Screen 4101)

When an error or door open occurs, the help screen 4101 is terminated (i.e., the game screen is reinstated and ERROR/DOOR OPEN is displayed. When a bill or a coin is inserted, the help screen 4101 is terminated and the credit is received. When an AUDIT key is turned, the help screen 4101 is terminated and the AUDIT is displayed. After the end of the AUDIT, the idle state comes back. When power interruption occurs, the help screen 4101 is not displayed when the power is turned on and the machine becomes in the idle state. When no input is made for three minutes while the help screen 4101 is being displayed, the help screen 4101 disappears and the machine becomes in the idle state.

(Details of Display Screen: Help Screen 4101: Page Structure)

The required items, i.e., a paytable item, a basic rule item, a winning line item, a feature item, a unique benefit feature item, and a bet-number item are structured into pages in this order. Some items are described over plural pages.

The paytable item describes all winning combinations. The winning combinations are listed from the highest one to the lowest one. For example, picture symbol→royal symbol. The basic rule item describes how to play games and the basic play of the gamble game. The winning line item describes the paylines. In the feature item, each feature is described in a different page when there are plural features. When a paytable different from that of the normal game is used, such a table is described after the feature rules. The unique benefit feature item describes feature rules unique to the games, such as High Power, MAX BET Special, and RESCUE. The bet-number item describes the range of money playable in a game. For example, the item shows the minimum and the maximum of the BET buttons.

(Details of Display Screen: Help Screen 4101: Help 1)

Help 1 shows basic rules. The basic rules include the following contents as display data. "This game must be played with all lines." "Select credits bet on each line.", "All WINs are displayed as credits.", "WIN is determined on successive reels from the leftmost.", "WIN is determined on illuminated line except Feature.", "Target is the highest WIN on each line.", "WIN on different line is also added.", "WIN on line is multiplied by credits bet on each line.", "Scatter payout is multiplied by TOTAL CREDIT BET.", "Scatter payout is added to LINE payout." "All payouts and game play become invalidated when malfunction occurs.", "Player should check whether correct credits are registered before game starts."

(Details of Display Screen: Help Screen 4101: Help 2)

Figure 53:
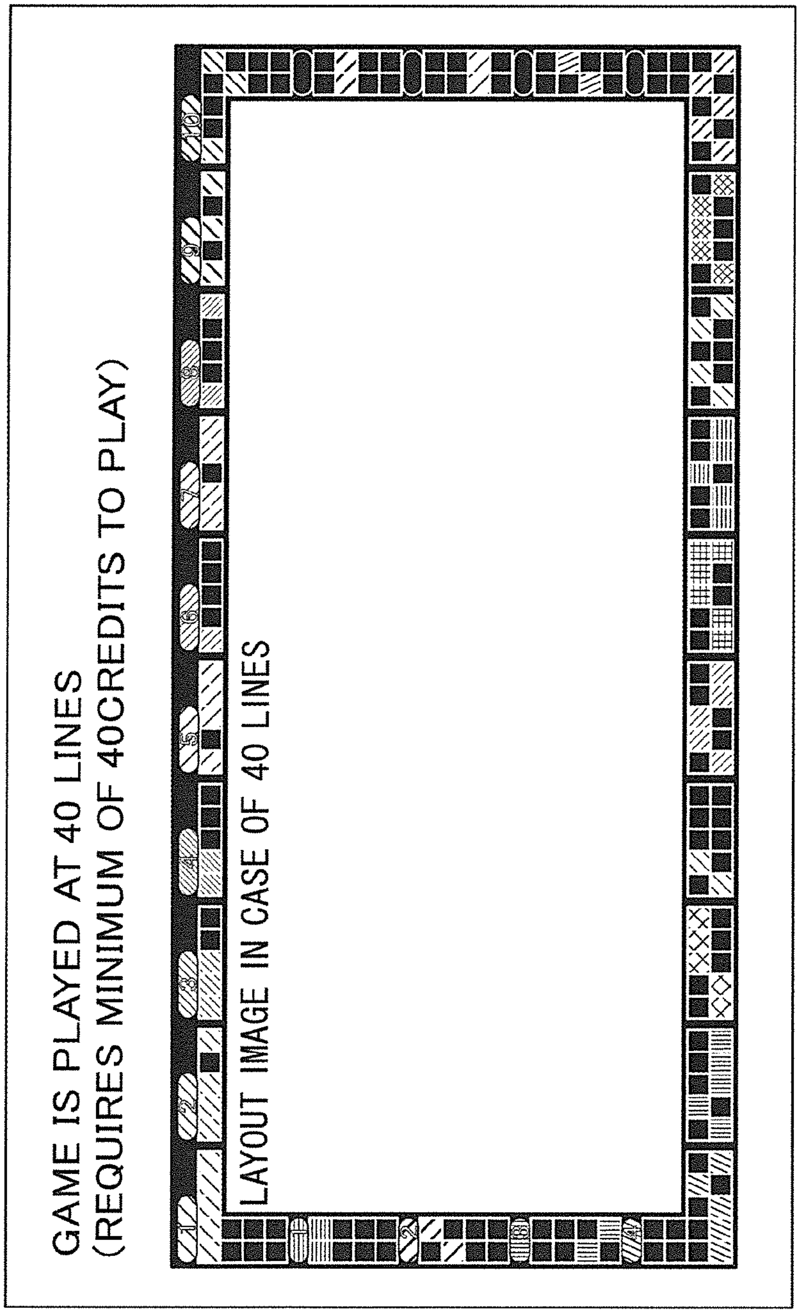
FIG. 53 illustrates payline display.

Help 2 explains payline display in FIG. 53. "Played with 40 lines" and "At least 40 credits are necessary to play" are displayed.

(Details of Display Screen: Help Screen 4101: Help 3)

Help 3 explains Bear free game (free game name). To be more specific, the following contents are displayed. "When three feature symbols stop, Bear free game awarding free game 10 times is triggered." "Different reel strips are used in Bear free game." "Three wild symbols are added to each of second, third, fourth, and fifth reels at start of Bear free game." "When two feature symbols appear on first and second reels in Bear free game, number of execution of free game is increased by five." "When three feature symbols appear on first, second, and third reels in Bear free game, number of execution of free game is increased by ten." "When re-trigger is established in Bear free game, payout rate increases from next spinning." "Maximum payout rate in Bear free game is five." "Bets and lines in free game are identical with those in game in which free game is triggered."

(Details of Display Screen: Help Screen 4101: Help 4)

Figure 54:
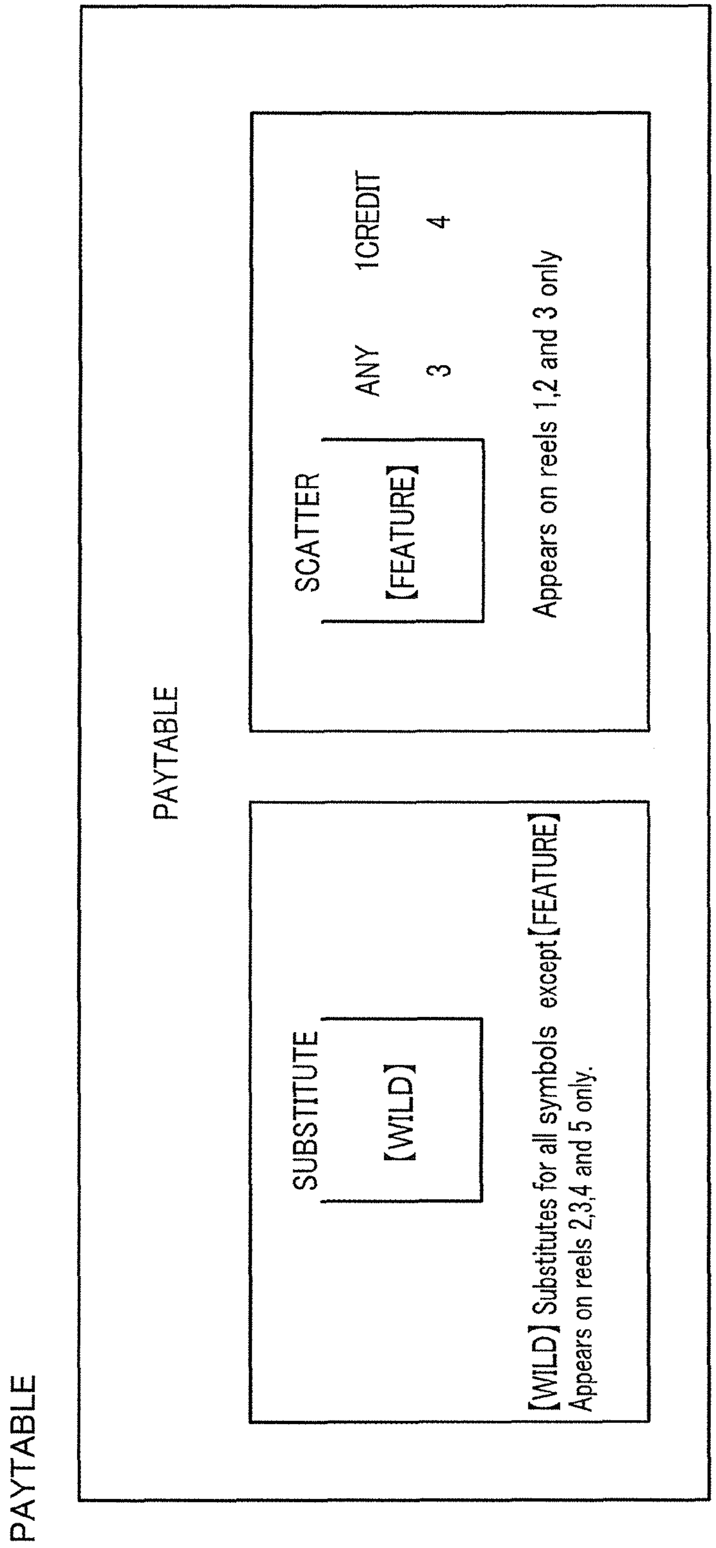
FIG. 54 illustrates a paytable in the help screen.

Help 4 explains the paytable as shown in FIG. 54. More specifically, the following contents are displayed. "PAYTABLE", "SUBSTITUTE", "WILD", and "WILD" "Substitutes for all symbols except "FEATURE"", and "WILD" "Appears on reels 2, 3, 4, and 5 only." Further, "SCATTER" and "FEATURE" "Appears on reels 1, 2 and 3 only" are displayed.

(Details of Display Screen: Help Screen 4101: Helps 5 and 6)

Figure 55:
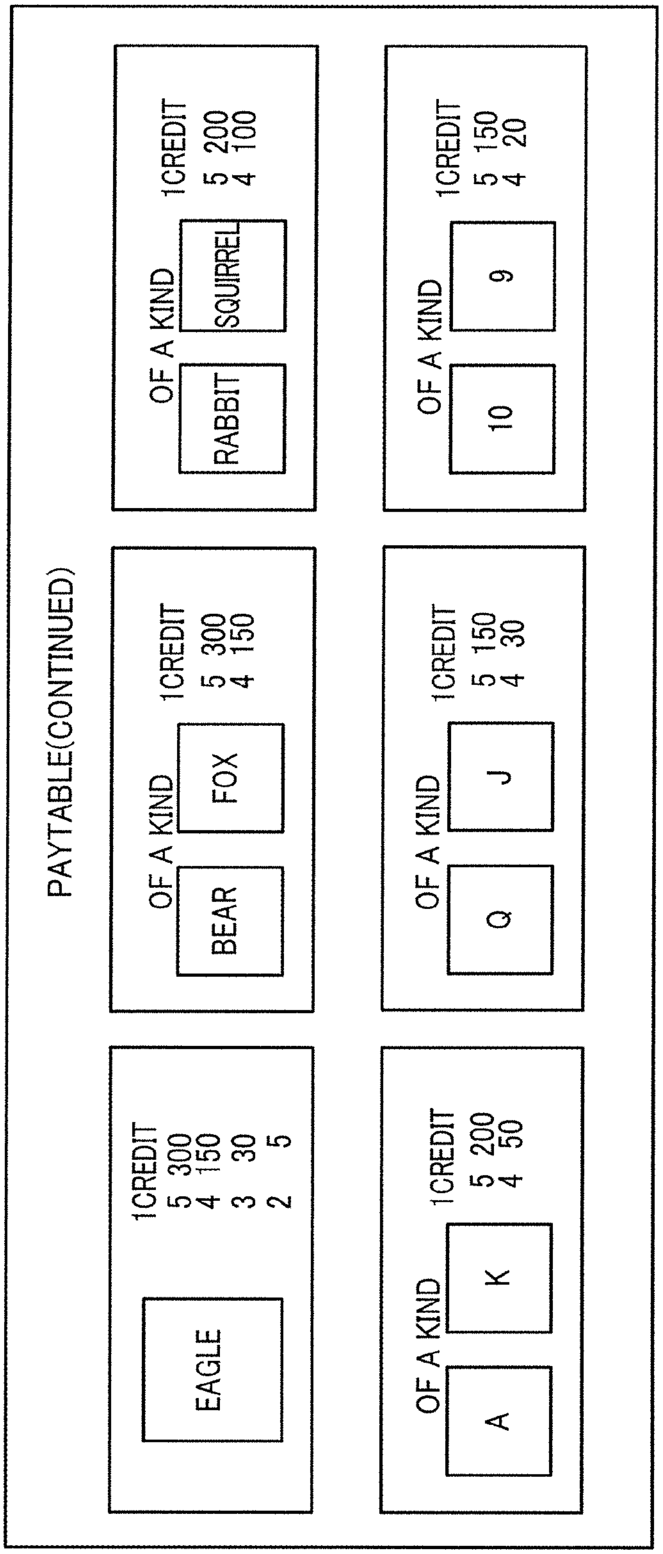
FIG. 55 illustrates a paytable in the help screen.

Help 5 explains the second page of the paytable shown in FIG. 55. In Help 5, "PLAY 40 TO 1000 CREDIT" and "ALL WINS PAID BY MACHINE OR ATTENDANT" are displayed.

(Various Operation Versions)

The slot machine 10 includes programs for executing operation versions such as a show mode and a debug mode. More specifically, the show version is used in international fairs and presentation for executives. In the show version, the appeal of a game is easily reproduced by a specific operation. In the show version, even if the game is played without selecting a command, a feature occurs at a high probability, with the result that players enjoy the feature even if they play the game for a short time in an international fair or the like. The show version automatically starts when power is turned on or when a presentation command is used.

When the game is played in the normal mode, the mode is unchanged until the change button is pressed. Each time the change button is pressed, the next presentation command appears. After the last presentation command, the first presentation command appears. In the free game, the free game is forcibly stopped when the change button is continuously pressed.

The name and outline of each mode will be described. In "SHOW MODE", a forced bonus game bonus-in combination is established at a probability of 1/20. In "NORMAL MODE", the game is played at a normal probability. In "FREE GAME", three feature symbols appear. In "FG RETRIGGER 2K", three feature symbols appear and two-symbol re-trigger occurs in the third execution of the free game (normal random determination is carried out except in the third execution). In "FG RETRIGGER 3K", three feature symbols appear and three-symbol re-trigger occurs in the third execution of the free game (normal random determination is carried out except in the third execution). In "FG BIG WIN", three feature symbols appear, and a large payout is achieved in the third execution of the game (normal random determination is carried out except in the third execution). In "MAX WIN", the maximum payout is achieved in the normal game.

The forced bonus game bonus-in when the command is used is shown in FIG. 56A. The two-symbol re-trigger combinations when the command is used are shown in FIG. 56B. The in-free-game large payout combinations when the command is used are shown in FIG. 56C. The in-normal-game maximum payout combinations when the command is used are shown in FIG. 56D. The three-symbol re-trigger combinations when the command is used are shown in FIG. 56E. In the debug mode, the commands shown in FIG. 57 are used.

(Operations of Slot Machine 10: Normal Game Execution Process)

Figure 58:
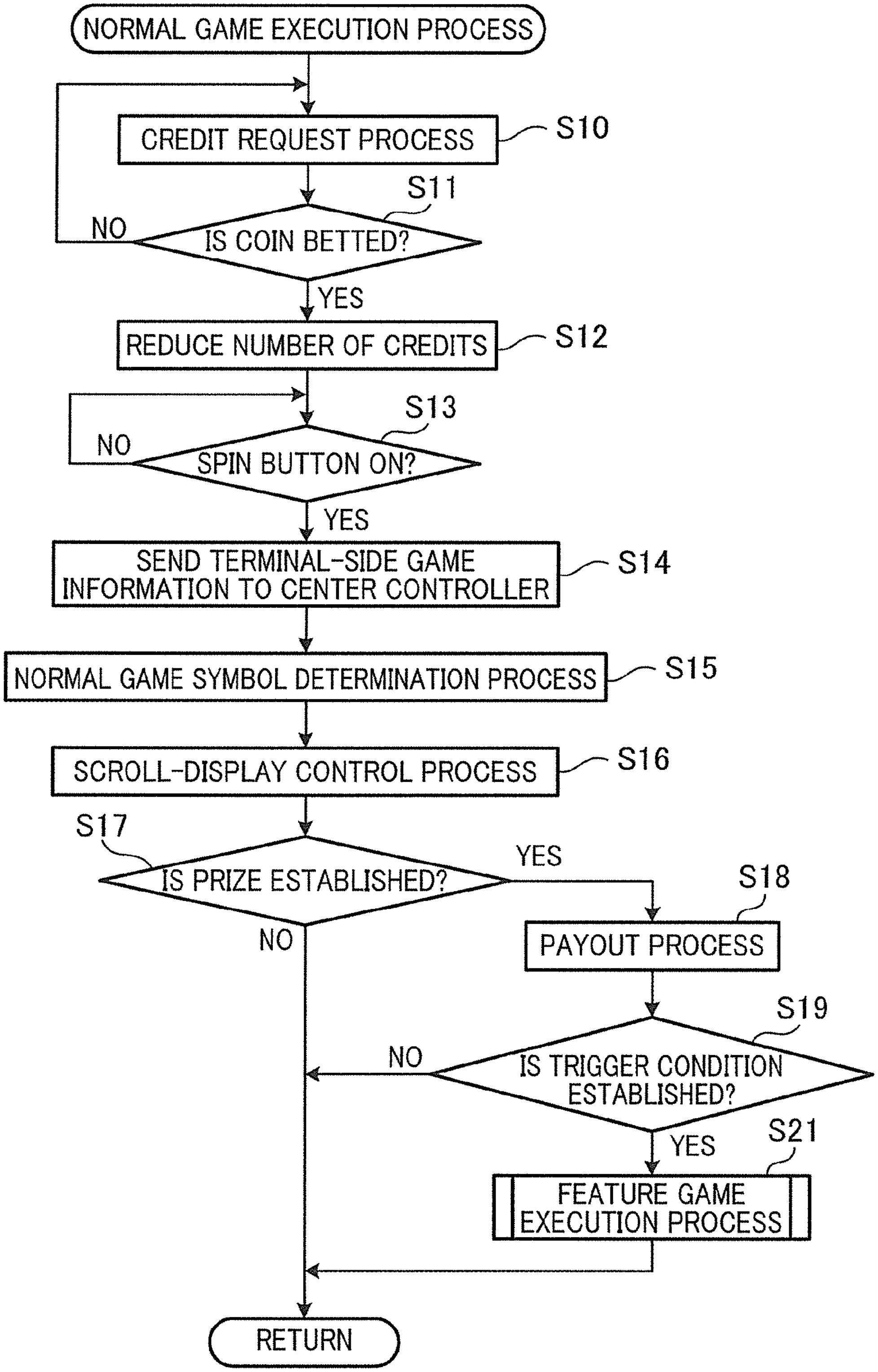
FIG. 58 is a flowchart of a normal game execution process.

The operation of the slot machine 10 arranged as above will be described. The normal game execution process shown in FIG. 58 is executed by the main CPU 71 of the slot machine 10. The slot machine 10 has been activated in advance.

To begin with, the main CPU 71 executes a credit request process (S10). In this process, the player determines how many credits are used from the credits stored in the IC card.

Then whether a coin is bet is determined (S11). In this process, the main CPU 71 determines whether an input signal output from the 1-BET switch 34S when the 1-BET button 34 is pressed and an input signal output from the 10-BET switch 39S when the 10-BET button 39 is pressed are received. When it is determined that no coin is bet, the process goes back to S10.

In the meanwhile, if it is determined in S11 that a coin is bet, the main CPU 71 executes a process of decreasing the number of credits stored in the RAM 73 in accordance with the number of coins bet (S12). When the number of coins bet is larger than the number of credits stored in the RAM 73, the step of decreasing the number of credits stored in the RAM 73 is not carried out and the process goes back to S11. When the number of coins bet is larger than the maximum number (maximum bet amount in the present embodiment) of coins on one game, the step of decreasing the number of credits stored in the RAM 73 is not carried out and the process proceeds to S13.

Then the main CPU 71 determines whether the spin button 46 is pressed (S13). In this step, the main CPU 71 determines whether an input signal output from the start switch 46S when the spin button 46 is pressed is received. When it is determined that the spin button 46 is not pressed, the process goes back to S13. It is noted that, when the spin button 46 is not pressed (e.g., when an instruction to end a game is input while the spin button 46 is not pressed), the main CPU 71 cancels the reduction result in S12.

In the meanwhile, if it is determined in S13 that the spin button 46 is pressed, the main CPU 71 sends terminal-side game information to the center controller 200 (S14), and then executes a normal game symbol determination process (S15). In the normal game symbol determination process, code numbers when the symbols are stopped are determined. More specifically, a random number is sampled, and the code number when each symbol array of the display block 28 stops is determined based on the sampled random number and a normal game symbol table.

Thereafter, in S16, the main CPU 71 executes a scroll-display control process. In this process, the display control is conducted so that, after the start of the scroll of the symbols 501, the symbols 501 are rearranged in accordance with S15.

Thereafter, the main CPU 71 determines whether a prize is established (S17). In S17, the main CPU 71 counts, regarding the symbols rearranged in accordance with S16, the number of symbols of each type rearranged on each payline L. Then the main CPU 71 determines whether the number of the symbols of each type is at least two. Furthermore, whether a predetermined number or more of scatter symbols (trigger symbols 503*a*) are rearranged irrespective of the paylines L.

When a prize is not established in S17 (S17: NO), the routine is terminated. When it is determined that a prize is established (S17: Yes), the main CPU 71 executes a step concerning the payout of coins (S18). In this step, for example, the main CPU 71 determines a payout rate with reference to odds data stored in the RAM 73 and based on the number of symbols rearranged on a payline L. The odds data indicates the relationship between the number of symbols rearranged on a payline L and a payout rate. Each time one "WILD" is displayed on a payline L where winning is established, the payout is doubled. That is to say, when three "WILD" are displayed on a payline L where winning is established, the payout is multiplied eight times.

The present embodiment assumes that a prize is established when at least one type of two or more symbols are rearranged on a payline L. Alternatively, the present invention may be arranged so that no payline L is provided and a prize is established when at least one type of two or more symbols are rearranged in the display blocks 28.

Subsequently, whether a trigger condition is established as a result of the rearrangement of a predetermined number or more of scatter symbols (trigger symbols 503*a*) is determined (S19). When the trigger condition is not established (S19: NO), the routine is terminated. In the meanwhile, when the trigger condition is established (S19: YES), a feature game execution process is executed (S21).

(Operations of Slot Machine: Feature Game Execution Process)

Figure 59:
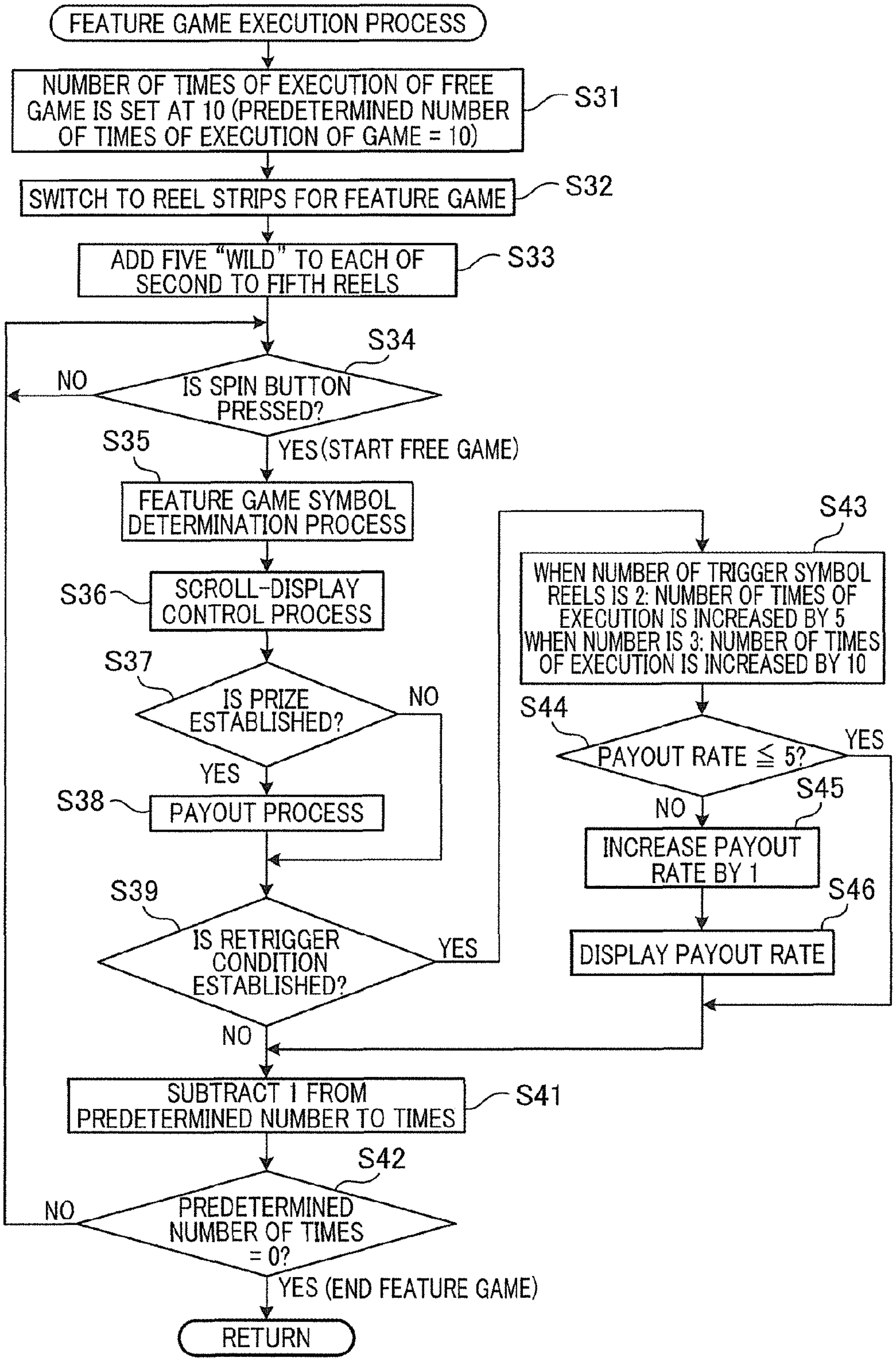
FIG. 59 is a flowchart of a feature execution process.

As shown in FIG. 59, to begin with, the number of times of execution of the free game is set at 10 in the feature game execution process. In other words, the predetermined number of times of execution of the game=10 is set (S31). The reel strips are switched to those for the feature game (S32). To each of the second to fifth reels 152 to 155, five wild symbols "WILD" are added (S33).

Subsequently, whether the spin button 46 is pressed to be turned on is determined (S34). When the spin button 46 is not pressed (S34: NO), S34 is executed again. In the meanwhile, when the spin button 46 is pressed (S34: YES), after a feature game symbol determination process is executed (S35), a scroll-display control process is executed (S36). Then whether the re-trigger condition (free game addition condition) is established is determined (S37). When a prize is established (S37: YES), S39 is executed after the payout process (S38). In the meanwhile, when a prize is not established (S37: NO), S39 is executed.

In S39, whether the re-trigger condition (free game addition condition) is established is determined (S39). When the re-trigger condition is not established (S39: NO), 1 is subtracted from a predetermined number of times of execution of the game (S41). In the meanwhile, when the re-trigger condition is established (S39: YES), the number of times of execution of the free game is increased by five when the number of reels (number of trigger symbol reels) on which the trigger symbols are rearranged is two, whereas the number of times of execution of the free game is increased by ten when the number of trigger symbol reels is three (S43).

Thereafter, whether the payout rate is at most five is determined (S44). When the payout rate is five or smaller (S44: YES), S41 is executed and 1 is subtracted from the predetermined number of times of execution of the game (S41). In the meanwhile, when the payout rate is larger than five (S44: NO), the payout rate is increased by 1 (S45). After the payout rate is displayed (S46), S41 is executed and 1 is subtracted from the predetermined number of times of execution of the game (S41).

Then whether the predetermined number of times of execution of the game is 0 is determined (S42). When the predetermined number of times of execution of the game is not 0 (S42: NO), it is determined that the feature game is being executed, and the process is executed again from S34. On the other hand, when the predetermined number of times of execution of the game is 0 (S42: YES), it is determined that the feature game is finished, and the routine is terminated.

The feature game execution process in the present embodiment presupposes that the number of times of execution of the free game is increased in accordance with the number of trigger symbol reels when the re-trigger condition is established. However, the number of times of execution of the free game may be increased by any number. Furthermore, while the feature game process of the present embodiment presupposes that the payout rate is increased by a predetermined number such as "1" when the re-trigger condition is established, the disclosure is not limited to this arrangement.

Figure 60:
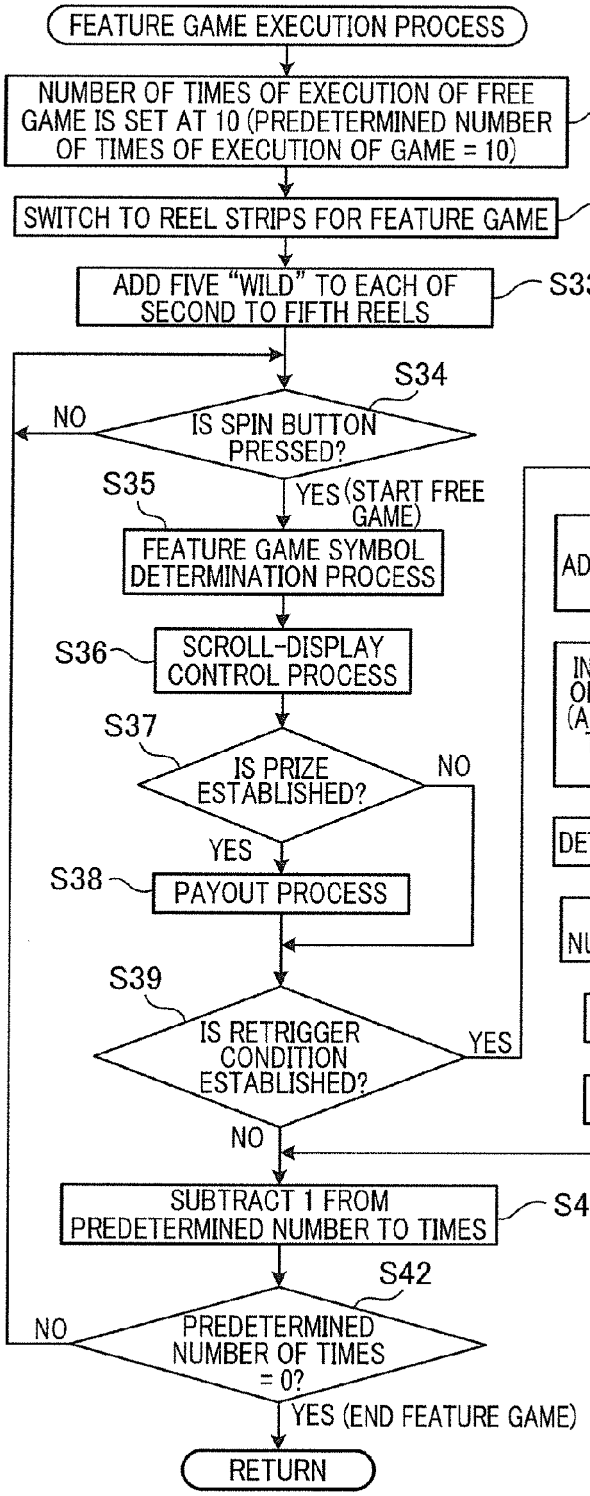
FIG. 60 is a flowchart of a feature execution process.

More specifically, as shown in FIG. 60, when the re-trigger condition is established (S39: YES), the additional number of times of execution of the game is determined and displayed (S51). Then the number of times of execution of the free game is increased in the same manner as in S43 (S52). The rank is determined and displayed (S53). A value calculated by multiplying the payout rate by the rank is figured out (S54). The payout rate is increased based on this value so as to be equal to or smaller than 5 which is the maximum number (S55). Then the payout rate is displayed (S561). Other arrangements are identical with those shown in FIG. 59.

(Operations of Slot Machine: Outline of WIN Effect)

Now, an WIN effect executed during the game as above will be described. The WIN effect is an effect executed when WIN is achieved in the normal game or the free game. The animation of a character on the 2nd screen 131*a* of the upper image display panel 131 and the animation on the upper part of each reel on the 1st screen 141*a* on the lower image display panel 141 are not carried out. Only the symbol animation, WIN increment, and the display of a WIN signboard on the 2nd screen 131*a* are carried out.

(Operations of Slot Machine: WIN Effect: 2nd Screen 131*a* and WIN Signboard)

Figure 61A:
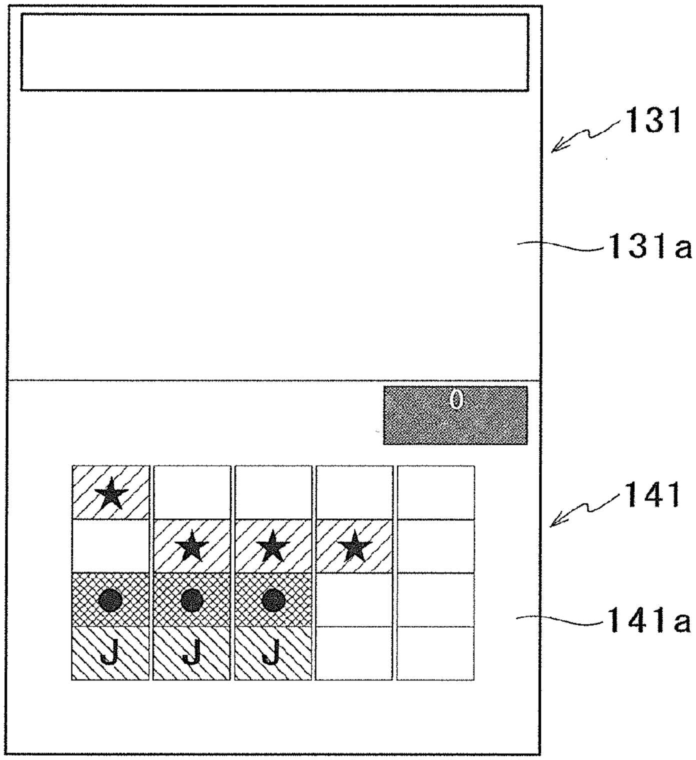
FIG. 61A illustrates a WIN effect.
Figure 61B:
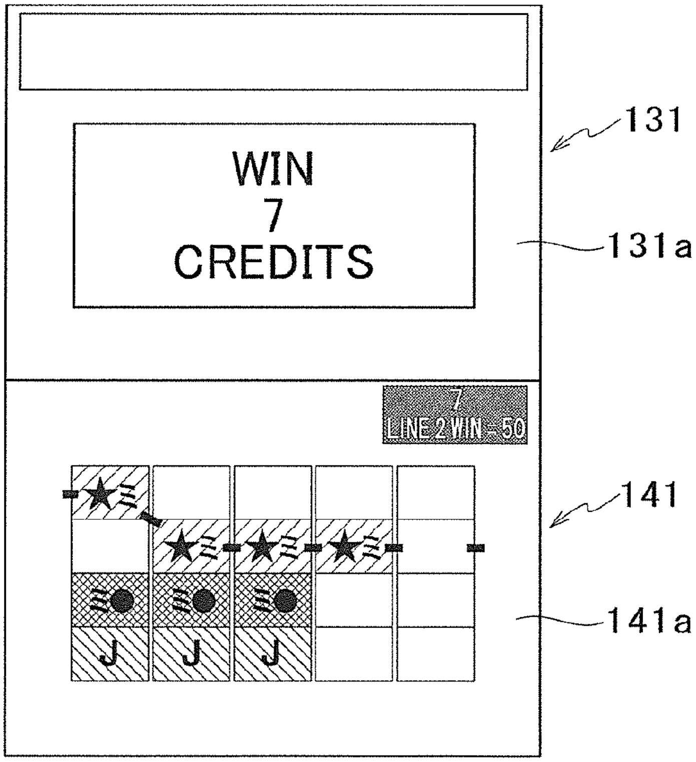
FIG. 61B illustrates a WIN effect.

As shown in FIG. 61A, when all reels stop in the 1st screen 141*a*, as shown in FIG. 61B, the obtained credit is displayed in an increment manner in a WIN signboard 134 on the 2nd screen 131*a*. The WIN signboard 134 is linked to the win meter 402 on the 1st screen 141*a*. In the 1st screen 141*a*, the achieved WIN is emphasized first at the scatter symbol and then on the symbols serially from a symbol having the smallest line number to a symbol having the largest line number A symbol for which WIN animation has been prepared is displayed in animation irrespective of the line number. A symbol for which no WIN animation is prepared (i.e., the WIN effect blinks) blinks when the winning of the associated line is achieved. The win meter 402 starts the increment and displays the payout of the winning lines currently turned on. The total WIN is not displayed.

Figure 62A:
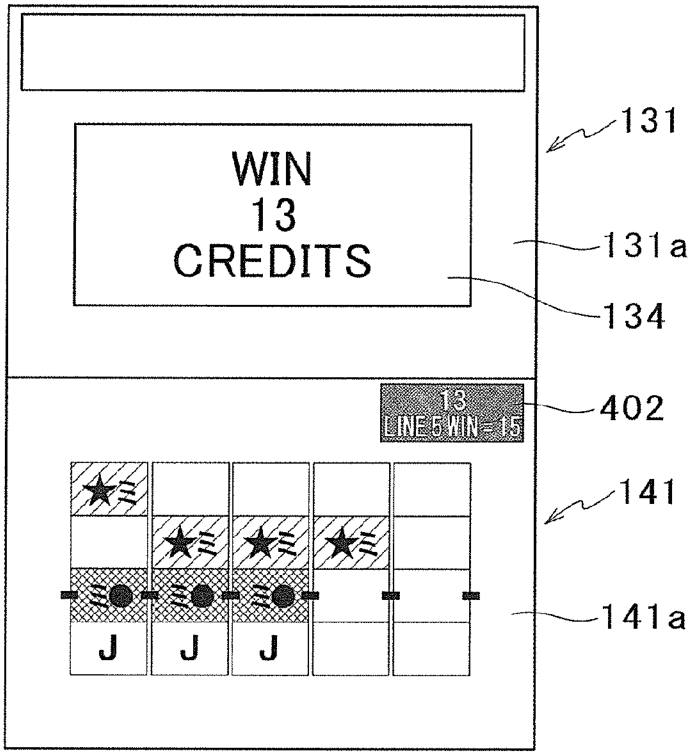
FIG. 62A illustrates a WIN effect.

Thereafter, as shown in FIG. 62A, the increment of the WIN signboard 134 is continued on the 2nd screen 131*a*. In the 1st screen 141*a*, when the animation is continued both in the "Star" and the "Circle" even if the winning line display proceeds, the animation of "J" stops because the turn of the winning line thereof has not come. The winning line of the "Circle" having the second smallest number is illuminated. The win meter 402 continues the increment, and displays the payout of the winning line of "Circle" which is currently illuminated, but does not display the total WIN.

Figure 62B:
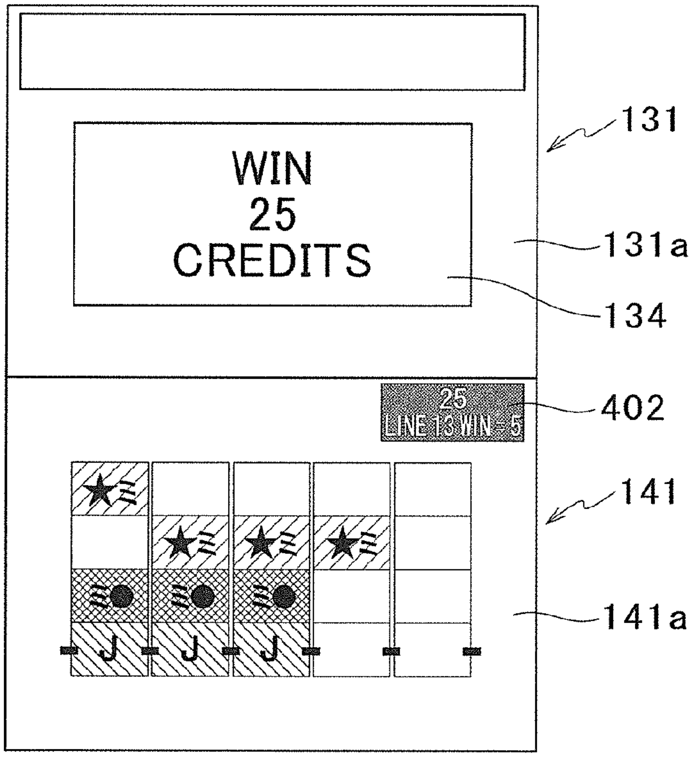
FIG. 62B illustrates a WIN effect.

Thereafter, as shown in FIG. 62B, on the 2nd screen 131*a*, the obtained credit is displayed on the WIN signboard 134 in an increment manner. This display is linked to the win meter 402 on the 1st screen 141*a*. Types of the WIN signboards 134 will be described later. On the 1st screen 141*a*, even if the winning line display proceeds, the animation is continued both in the "Star" and the "Circle". As the turn of the winning line of "J" has come, "J" is blinked. The winning line of "J" is illuminated. The win meter 402 continues the increment, and displays the payout of the winning line of "J" which is currently illuminated, but does not display the total WIN.

Figure 63A:
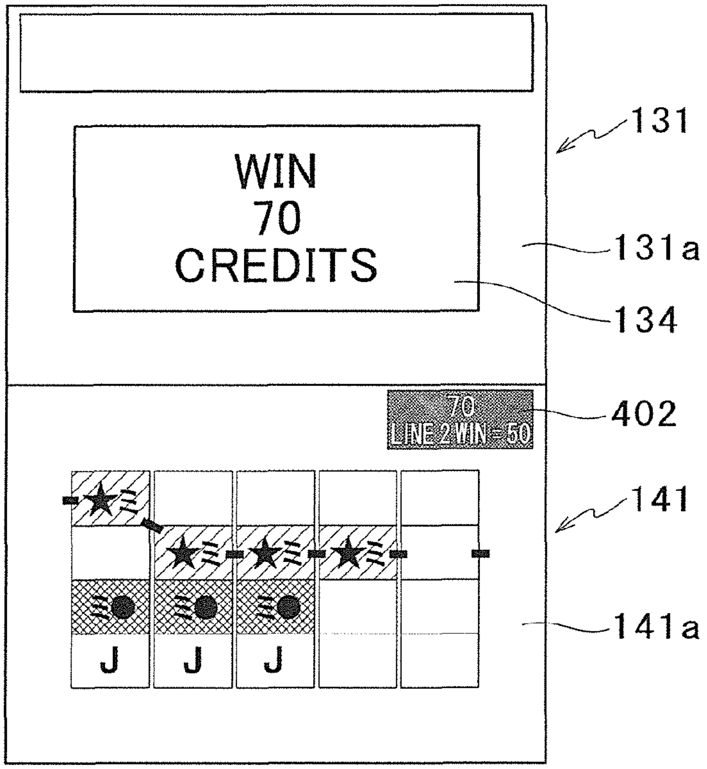
FIG. 63A illustrates a WIN effect.

Thereafter, as shown in FIG. 63A, the increment is finished in the 2nd screen 131*a* and the total WIN amount is displayed. On the 1st screen 141*a*, when the display of the winning symbols is finished once, the display is carried out again from the smallest line number. The win meter 402 stops the increment, and after the display of the winning symbols is finished once, repeatedly conducts the display from the symbol having the smallest number, and displays the total WIN after the increment is finished.

Subsequently, the process below is executed at the end of Gamble or at the end of TAKE WIN when Gamble is on, or after 5 seconds elapse from the end of the increment when Gamble is off.

Figure 63B:
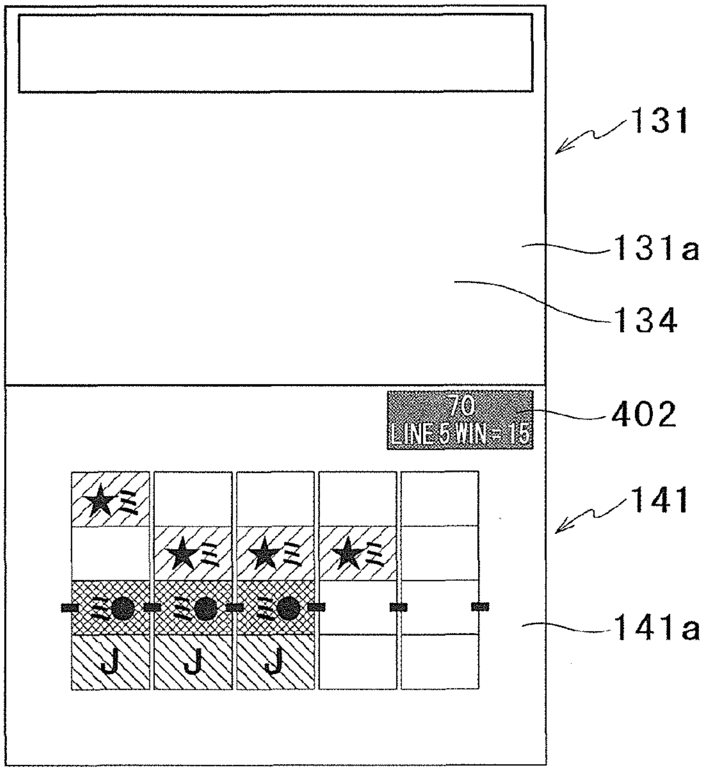
FIG. 63B illustrates a WIN effect.

That is to say, as shown in FIG. 63B, the WIN signboard 134 disappears from the 2nd screen 131*a*. On the 1st screen 141*a*, when the display of the winning symbols is finished once, the display is repeated from the smallest line number. The win meter 402 stops the increment, and after the display of the winning symbols is finished once, repeatedly conducts the display from the symbol having the smallest number, and the total WIN in the spinning is displayed.

(Operations of Slot Machine: WIN Effect: Types of WIN Signboards)

There are three types of WIN signboards 134 in total. That is to say, "Silver Signboard", "Gold Signboard 1", and "Gold Signboard 2". "Silver Signboard" is displayed when the total WIN in the spinning is less than 25 times as large as the bet. "BIG WIN" in "Gold Signboard 1" is displayed when the total WIN in the spinning is more than times and less than 50 times as large as the bet. Coins fall down. "Gold Signboard 1" is changed to "GREAT" of "Gold Signboard 2" when the increment amount becomes more than 50 times as large as the bet. Coins and bills fall down. When the WIN amount range (total bet standard) is less than 20 times, the effect of Silver Signboard is carried out. When the WIN amount range is not smaller than 20 times and not larger than 50 times, the effect of Gold Signboard+Coins is carried out. When the WIN amount range is not smaller than 50 times the effect of Gold signboard+Coins+Bills is carried out.

(Operations of Slot Machine: WIN Effect: Display of WIN Signboard)

Figure 64A:
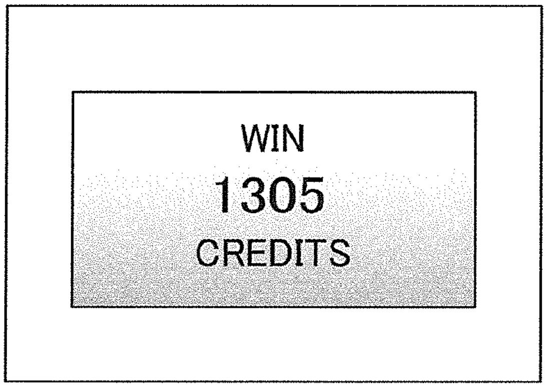
FIG. 64A illustrates the display on a WIN signboard.
Figure 64B:
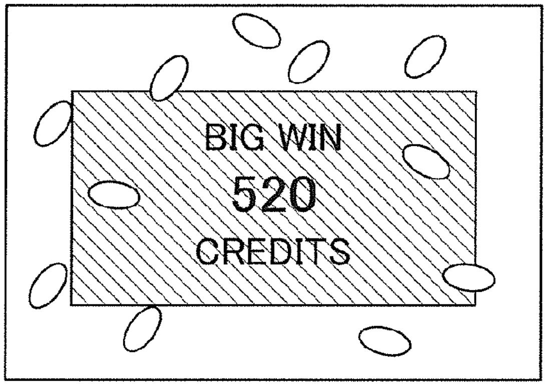
FIG. 64B illustrates the display on a WIN signboard.
Figure 64C:
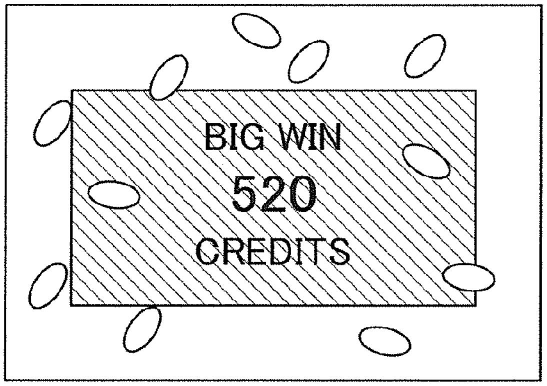
FIG. 64C illustrates the display on a WIN signboard.
Figure 64D:
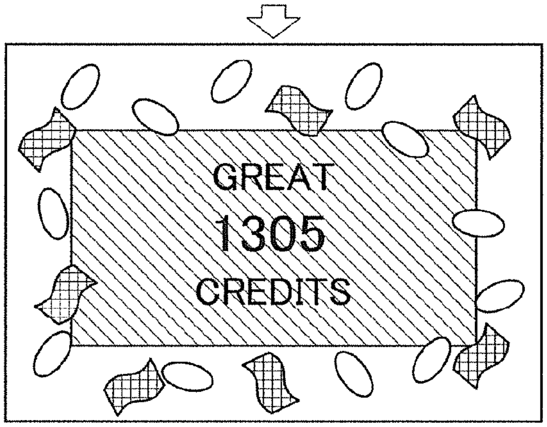
FIG. 64D illustrates the display on a WIN signboard.

The display of the Gold Signboard 1 or the Silver Signboard is carried out such that, as shown in FIG. 64A, after only the Silver Signboard is displayed, the Gold Signboard 1 and the coins are displayed as shown in FIG. 64B. The display of the Gold Signboard 2 is, as shown in FIG. 64C, carried out such that, the Gold Signboard 1 and the coins are displayed first, and the obtained credits are incremented in accordance with the increment on the win meter 402. Thereafter, as shown in FIG. 64D, the WIN signboard 134 is rewritten to the Gold Signboard 2 when the increment amount exceeds 50 times as large as the bet, and the coins and bills start to fall down.

(Operations of Slot Machine: WIN Effect: Increment Speed and WIN Sound)

The increment speed and WIN sound are arranged such that, 24 ranks of WIN are identified, and the increment speed and the WIN sound are set for each rank.

Figure 66:
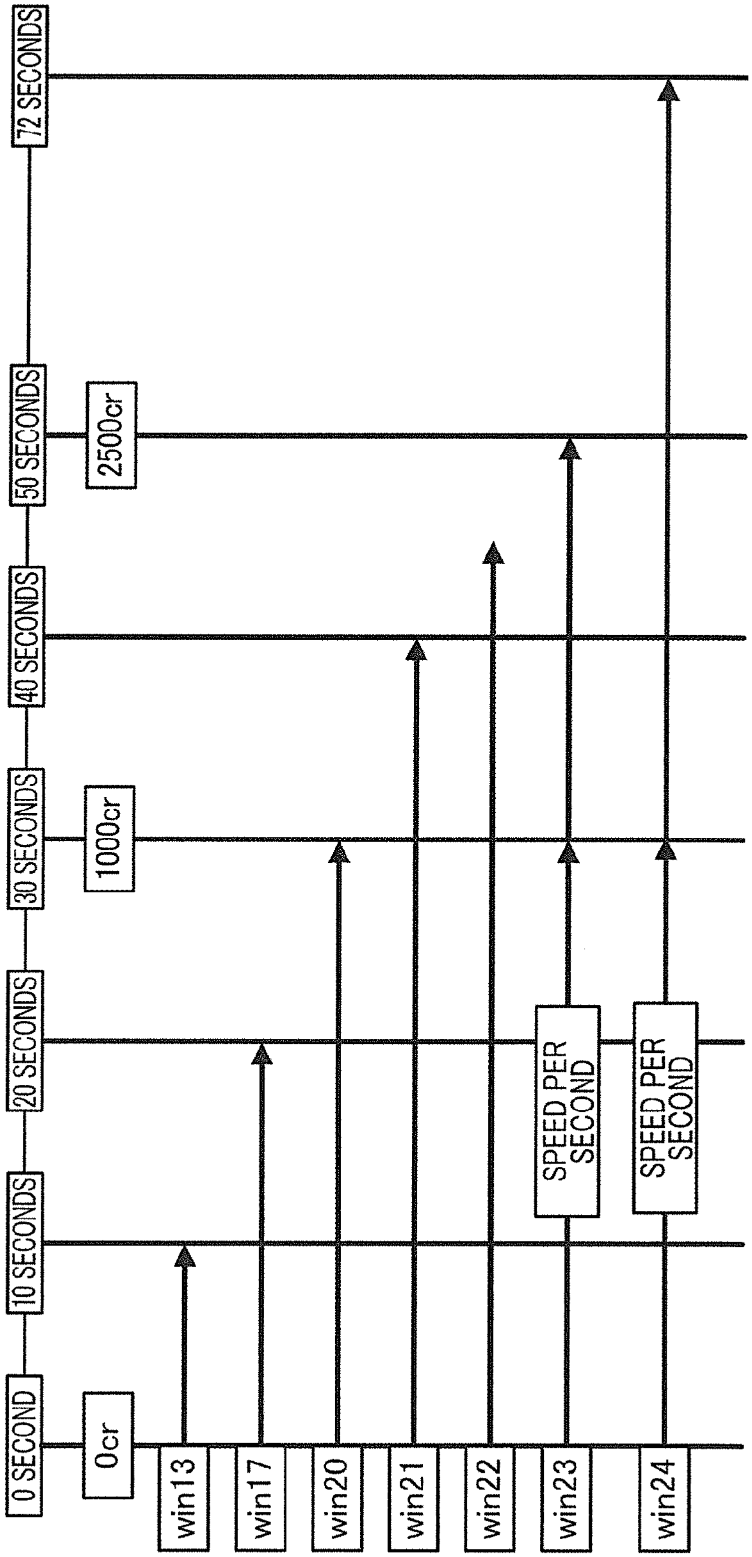
FIG. 66 illustrates the increment in the WIN effect.
Figures 73C, 74:
FIG. 73C illustrates the total WIN signboard after the free game.
FIG. 74 illustrates the increment in the WIN effect.

More specifically, as shown in FIG. 65, a WIN rank is a relationship between a WIN type and an increment process. In "WIN 1" to "WIN 22", an WIN amount is divided by the number of seconds, and the increment speed is adjusted so that the increment is completed at that number of seconds. In "WIN 23" to "WIN 24", the increment proceeds at a speed at which ½ of the total bet proceeds per second, until the display of the increment amount reaches 20 times as large as the total bet. After 20 times, the remaining WIN amount is divided by the remaining number of seconds, and the increment speed is adjusted so that the increment is completed at that number of seconds. Therefore, the increment is executed as shown in FIG. 66, for example. That is to say, the increment shown in FIG. 74 is executed.

(Operations of Slot Machine: WIN Effect: Special SE when Top Symbol Combination is Established)

Figure 67A:
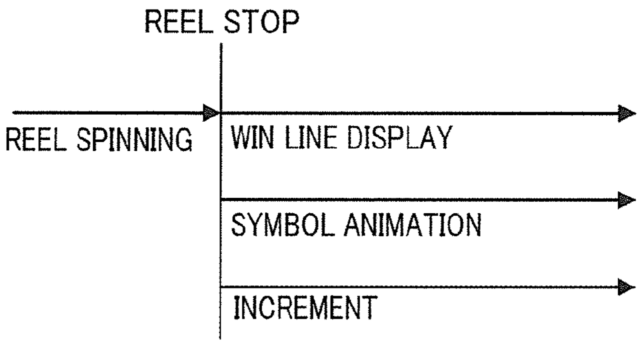
FIG. 67A illustrates the situation when normal WIN is achieved in the WIN effect.
Figure 67B:
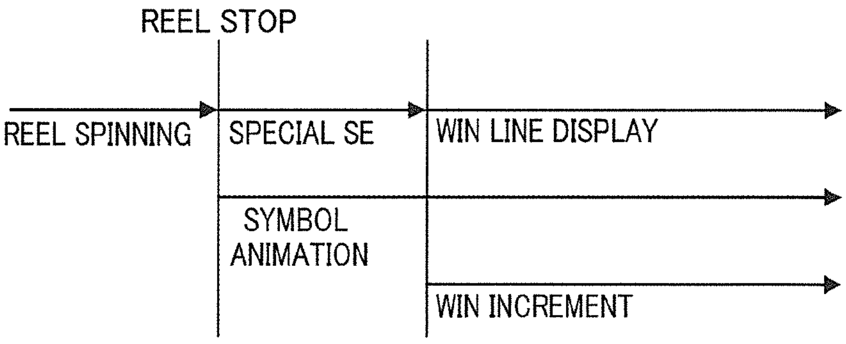
FIG. 67B illustrates the situation when a combination of top symbols is achieved in the WIN effect.

When 3, 4, or 5 top symbols appear, a dedicated special sound effect is reproduced. This special SE is shared between the normal game and the free game. The reproduction is continued after all reels stop and before the start of the increment. When the reproduction of the special SE is continued, the symbol animation, the line WIN display, and the increment are stopped. In other words, normal WIN is carried out as shown in FIG. 67A. When 3 or more top symbols appear, the operation shown in FIG. 67B is carried out.

Figure 68A:
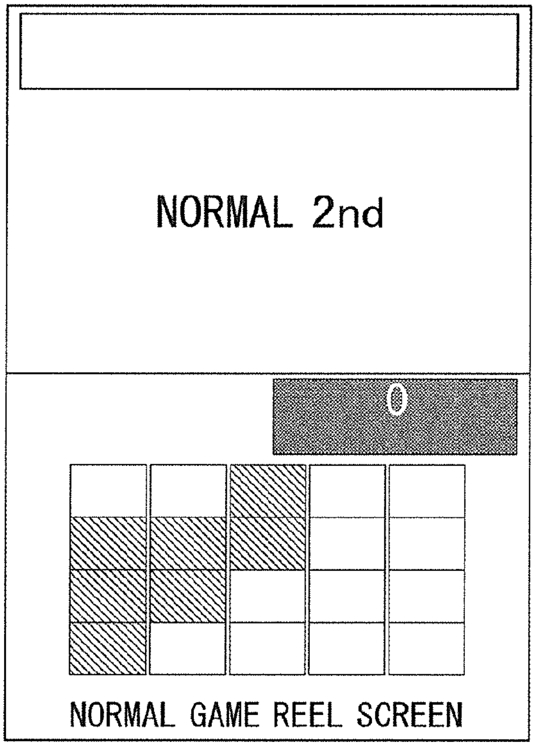
FIG. 68A illustrates the situation when a combination of top symbols is achieved in the WIN effect.
Figure 68B:
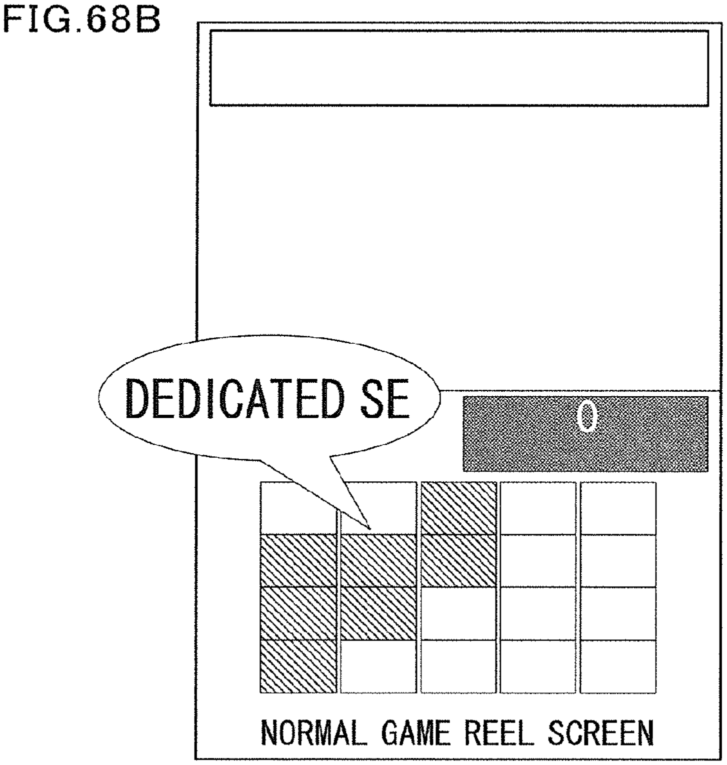
FIG. 68B illustrates the situation when a combination of top symbols is achieved in the WIN effect.
Figure 68C:
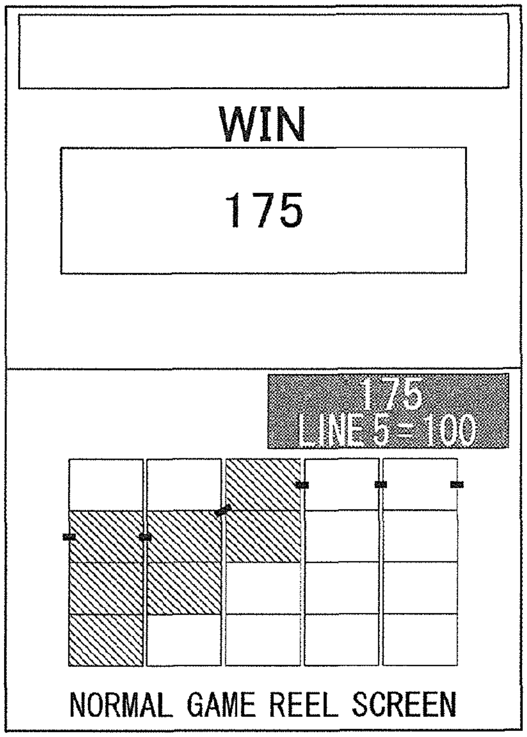
FIG. 68C illustrates the situation when a combination of top symbols is achieved in the WIN effect.

To be more specific, as shown in FIG. 68A, when all reels stop, the special SE "Eagle" is reproduced as shown in FIG. 68B. Then the symbol animation starts. Thereafter, the next process is executed when the reproduction of the special SE ends. That is to say, as shown in FIG. 68C, the effect of the line WIN starts. The increment starts on the WIN signboard 134 and the increment of the win meter 402 starts. Furthermore, the reproduction of increment sound starts. The processes after the above are identical with those in the normal WIN.

(Operations of Slot Machine: WIN Effect: Sound Effect when 3 Feature Symbols Appear)

Figure 69:
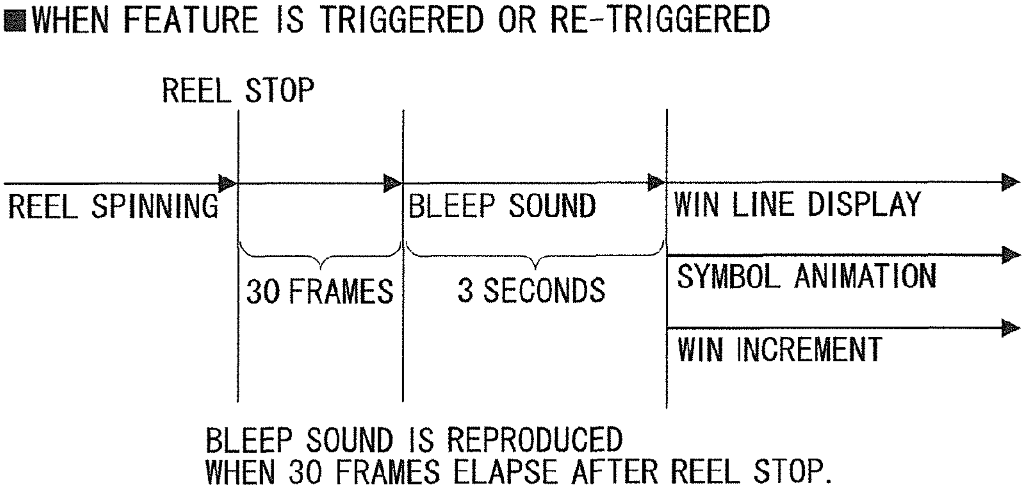
FIG. 69 illustrates a sound effect.

When 3 feature symbols appear, "bleep sound" is reproduced as a sound effect. As shown in FIG. 69, the reproduction of the sound is continued for three seconds after the stop of all reels and until the increment starts after the time for 20 frames elapses. When the "bleep sound" is reproduced, the symbol animation and the line WIN are displayed. The increment is stopped. In the free game, dedicated "bleep sound" is reproduced when two feature symbols successively appear from the first reel. Each time the re-trigger is carried out, the process is on hold for 30 frames and "bleep sound" is reproduced.

Figure 70A:
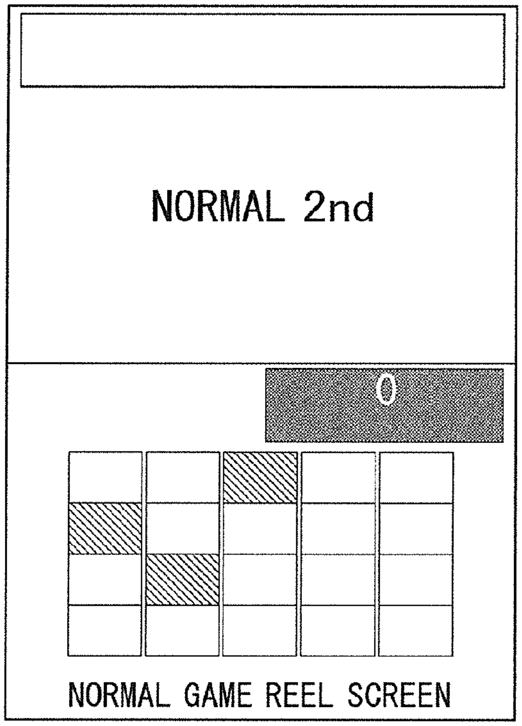
FIG. 70A illustrates a step in the sound effect.
Figure 70B:
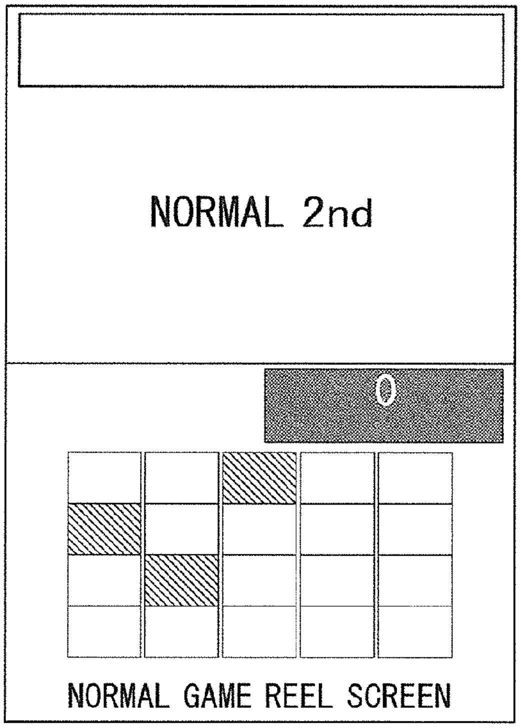
FIG. 70B illustrates a step in the sound effect.
Figure 70C:
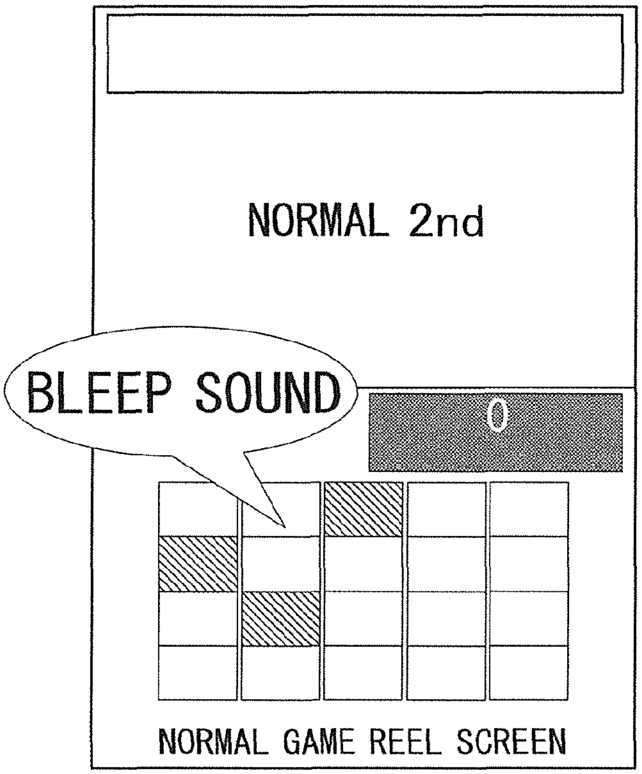
FIG. 70C illustrates a step in the sound effect.
Figure 70D:
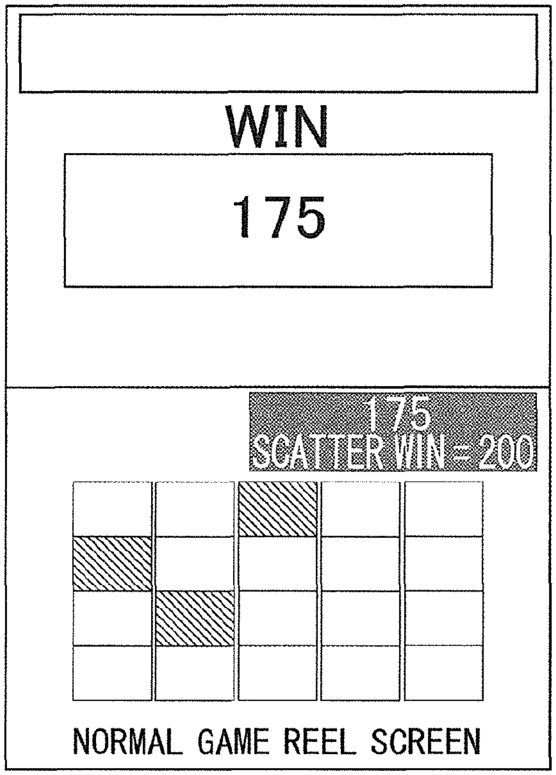
FIG. 70D illustrates a step in the sound effect.

More specifically, as shown in FIG. 70A, when all reels stop, the waiting time for 30 frames is taken as shown in FIG. 70B. Thereafter, the "bleep sound" is reproduced as shown in FIG. 70C. The process proceeds to the next step after 3 seconds elapse. As shown in FIG. 70D, the line WIN effect starts. The symbol animation starts. On the WIN signboard 134, the increment starts. The increment of the win meter 402 starts. The reproduction of the increment sound starts. The processes after the above are identical with those in the normal WIN.

(Operations of Slot Machine: WIN Effect: Blank Frames after Reel Stop in Large WIN)

As shown in FIG. 71, when expensive WIN which is more than 20 times as large as the total bet occurs, the data between the reel stop and the start of the increment is arranged to be blank for 20 frames. Such blank data is not provided when the dedicated SE is reproduced. The blank data for 20 frames is provided when WIN which is at least 20 times as large as the total bet occurs and 3, 4, or 5 eagle symbols do not appear.

(Operations of Slot Machine: WIN Effect: Total WIN Signboard after Free Game)

After the end of the free game, the total obtained credit is displayed on the 1st screen 141*a*. In accordance with the obtained credit (i.e., how many times as large as the total bet), one of three types of effects is used.

To be more specific, as shown in FIG. 72, the relationship between the obtained credit, the effect, and display seconds is as below. When the total obtained credit is less than 20 times as large as the total bet, the Silver Signboard is displayed for 3.6 seconds as shown in FIG. 73A. When the total obtained credit is not less than 20 times and less than 50 times as large as the total bet, the Gold Signboard and coins are displayed for 6 seconds as shown in FIG. 73B. When the total obtained credit is more than 50 times as large as the total bet, the Gold Signboard and coins and bills are displayed for seconds as shown in FIG. 73C. When the "display seconds" elapse, the total WIN signboard disappears. Furthermore, after four seconds elapse from the start of the image display, the image display can be skipped by pressing the spin button or the maximum BET button.

(Operations of Slot Machine: WIN Effect: Free Game)

The initial number of times of execution of the free game is 10. At the start of the free game, the reel strips are similar to those in the normal game except that three wild symbols are added to each of the second to fourth reels only once. In the free game, when the feature symbols successively stop on two or more reels from the first reel, the re-trigger is achieved and the number of times of execution of the game is increased by 5. The re-trigger may be achieved for unlimited number of times, and the number of times of execution of the game is increased by 5 each time the re-trigger is achieved.

(Operations of Slot Machine: WIN Effect: Free Game Start Introduction)

Figure 75A:
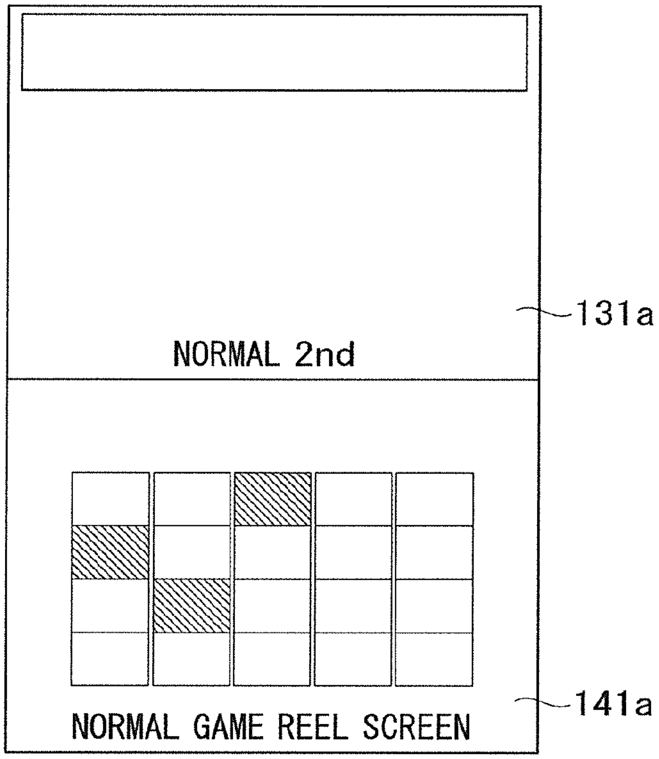
FIG. 75A illustrates the situation at the start of the free game.
Figure 75B:
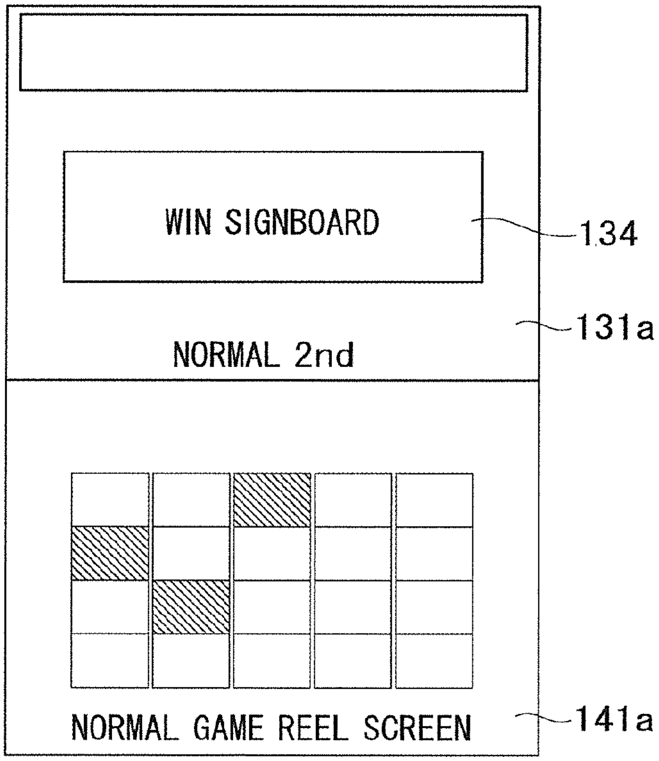
FIG. 75B illustrates the situation at the start of the free game.
Figure 75C:
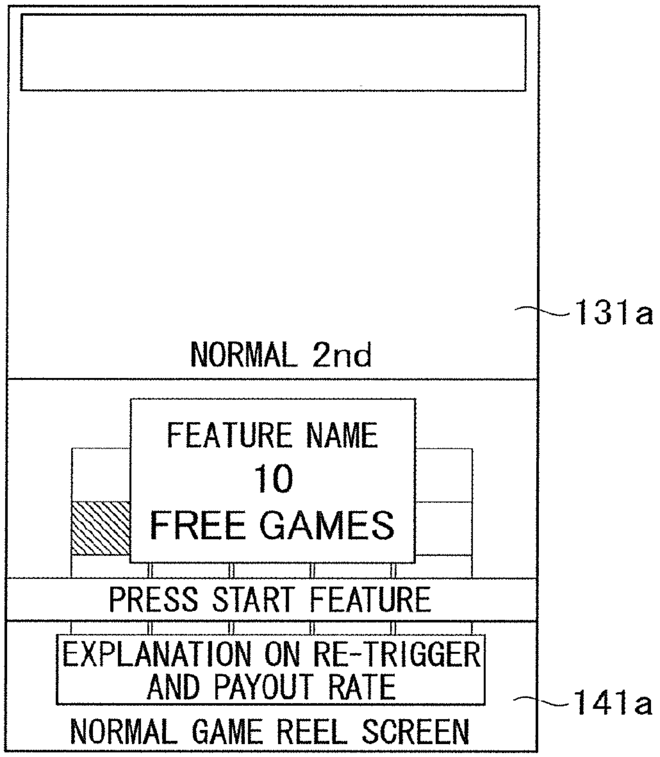
FIG. 75C illustrates the situation at the start of the free game.

As shown in FIG. 75A, "bleep sound" is reproduced when trigger symbols 503*a* appear. Then the WIN increment and the WIN signboard 134 are displayed as shown in FIG. 75B. When the increment ends or is skipped, as shown in FIG. 75C, a free game introduction message is displayed and the pressing of a start feature button is waited for. For example, the following message is displayed: "Bear free game, 10 free game, Press Start Feature button. When feature symbols appear on first and second reels, re-trigger occurs. Each time re-trigger occurs in free game, payout rate increases up to 5.". During the free game, the rule is explained as the re-trigger occurs when two or more feature symbols appear.

Figure 75D:
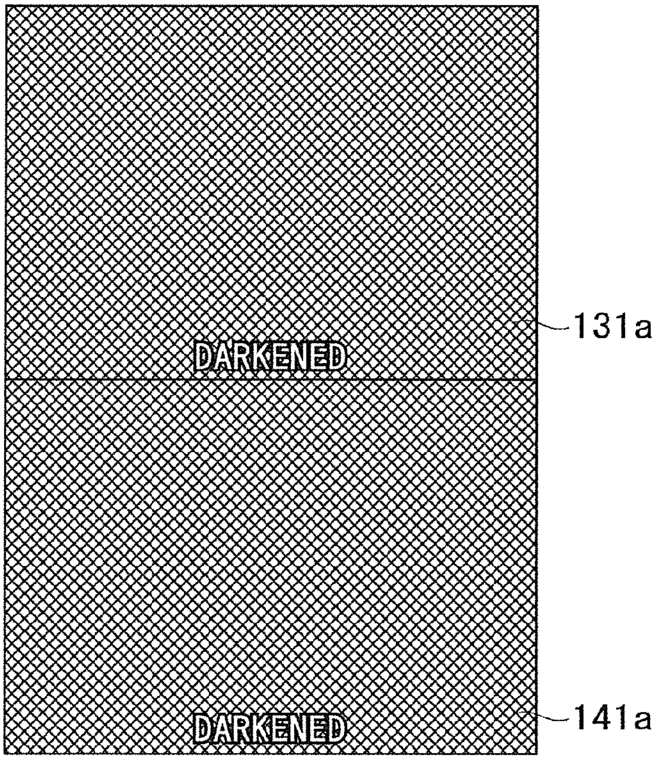
FIG. 75D illustrates the situation at the start of the free game.
Figure 75E:
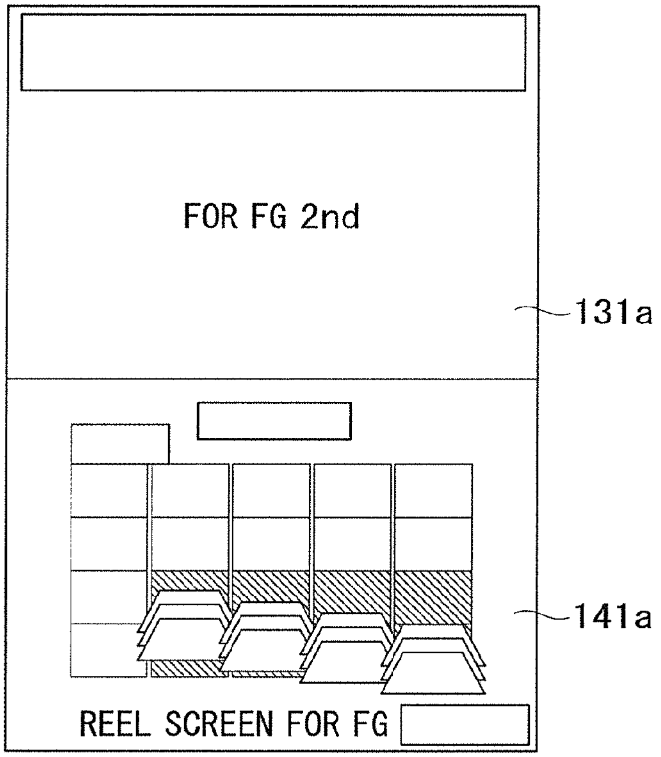
FIG. 75E illustrates the situation at the start of the free game.
Figure 75F:
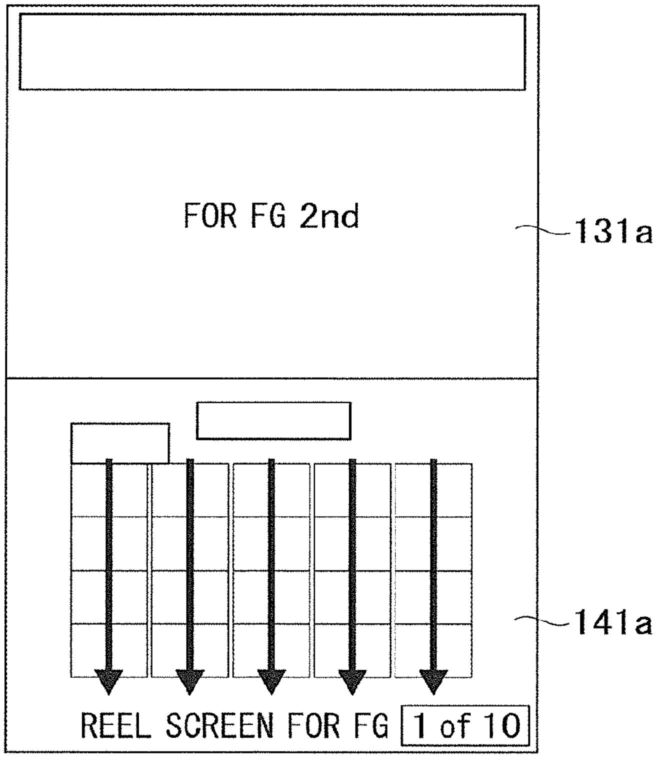
FIG. 75F illustrates the situation at the start of the free game.

When the start feature button is pressed, as shown in FIG. 75D, both of the 1st screen 141*a* and the 2nd screen 131*a* are darkened and the screens are switched. As shown in FIG. 75E, both of the 1st screen 141*a* and the 2nd screen 131*a* are switched to free game screens. Then the re-trigger rule and the payout rate are displayed and the wild insertion effect is executed at the second to fourth reels. The wild symbols are successively inserted under the wild symbols which have already been on the reels. It is noted that one wild symbol is provided on each reel. A wild symbol number counter is displayed above the reels, and the counter is incremented as a wild symbol is inserted. It is noted that the range of the number of added wild symbols is 0 to 20. Then the rotation of the reels starts as shown in FIG. 75F.

(Operations of Slot Machine: WIN Effect: At End of Free Game)

Figure 76A:
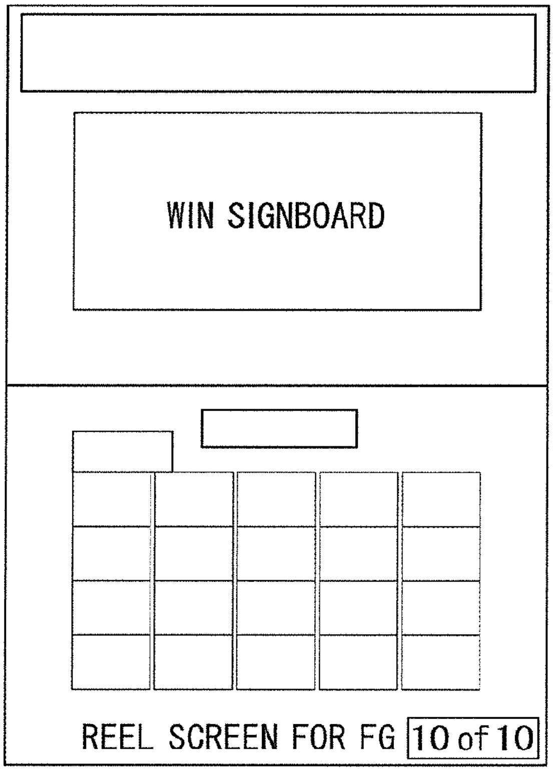
FIG. 76A illustrates the situation at the end of the free game.
Figure 76B:
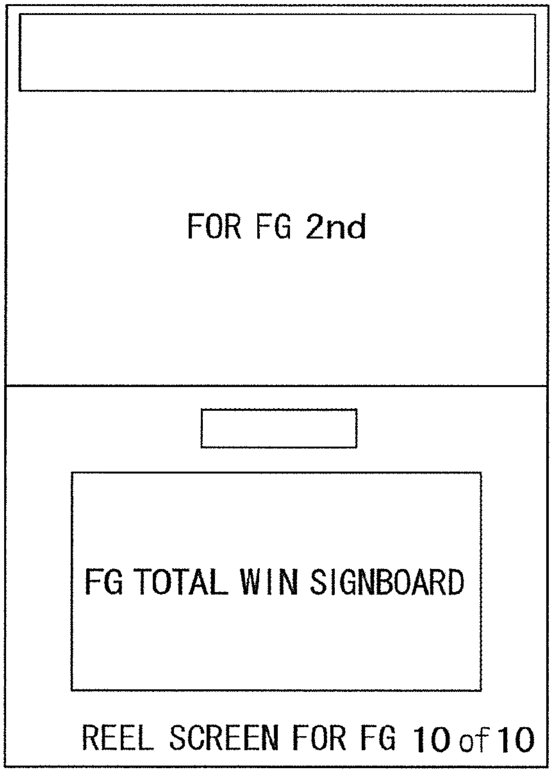
FIG. 76B illustrates the situation at the end of the free game.

As shown in FIG. 76A, when the last spinning is finished, the WIN signboard 134 is displayed. This signboard is not displayed when the obtained credit is zero. When the WIN signboard 134 disappears, as shown in FIG. 76B, a free game total WIN signboard 135 is displayed on the 1st screen 141*a*. When the free game total WIN signboard 135 disappears, the shift to the next process is carried out. When the obtained credit in the free game is zero, the shift to the next process is carried out when 2 seconds elapse from the end of the last spinning, without displaying the free game total WIN signboard.

Figure 76C:
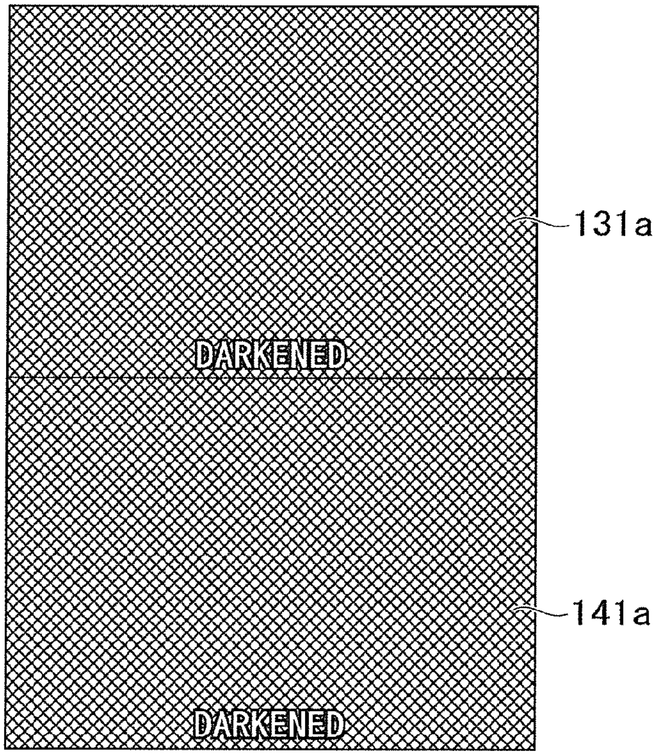
FIG. 76C illustrates the situation at the end of the free game.
Figure 76D:
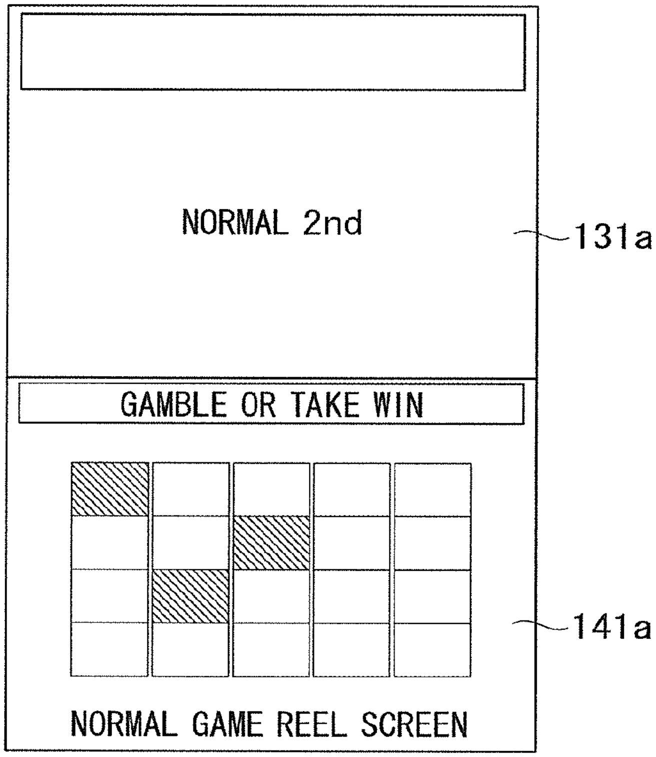
FIG. 76D illustrates the situation at the end of the free game.

When the free game total WIN signboard 135 disappears, as shown in FIG. 76C, the 1st screen 141*a* and the 2nd screen 131*a* are both darkened and the screens are switched. As shown in FIG. 76D, both of the 1st screen 141*a* and the 2nd screen 131*a* are shifted to the normal screens. The reel strips return to the state at the time of the triggering of the free game.

(Operations of Slot Machine: WIN Effect: At Re-Trigger)

Figure 77A:
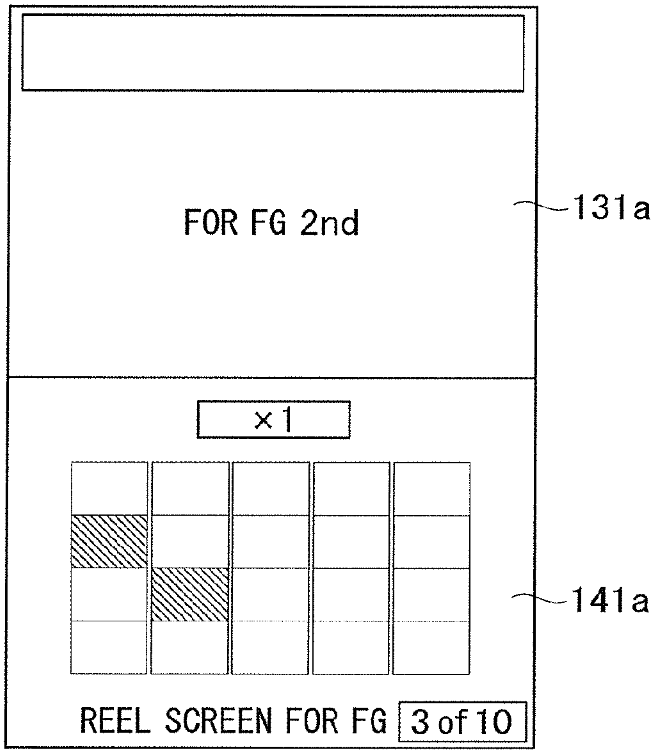
FIG. 77A illustrates the situation at the re-trigger.

As shown in FIG. 77A, when during the free game the feature symbols stop on the first and second (and third) reels, bleep sound is reproduced and the re-trigger is confirmed. The additional number of times of execution of the free game varies in accordance with the number of rearranged symbols (2 or 3).

Figure 77B:
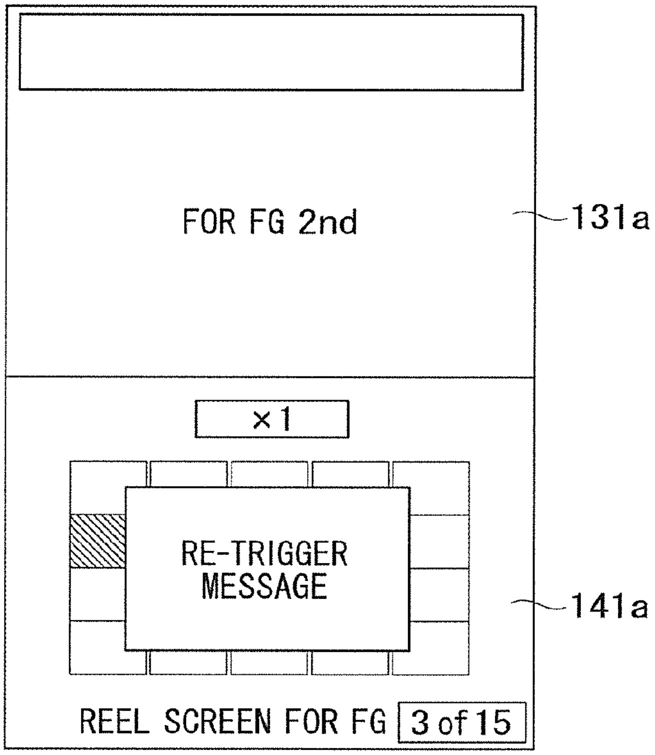
FIG. 77B illustrates the situation at the re-trigger.

As shown in FIG. 77B, the re-trigger message is displayed and the total number indicated by the free game counter is increased by 5 or 10. The number is increased by 5 when 2 feature symbols appear. The number is increased by 10 when 3 feature symbols appear. The displayed message varies in accordance with how many feature symbols appear and the current payout rate.

More specifically, when two feature symbols appear and the current payout rate is four or smaller, a message "Re-trigger, number of times of execution of free game is increased by 5, payout rate is increased from next spinning" is displayed. Furthermore, when three feature symbols appear and the current payout rate is 4 or smaller, "Re-trigger, number of times of execution of free game is increased by 10, payout rate is increased from next spinning" is displayed.

When two feature symbols appear and the current payout rate is 5, "Re-trigger, number of times of execution of free game is increased by 5" is displayed. When three feature symbols appear and the current payout rate is 5, "Re-trigger, number of times of execution of free game is increased by 10" is displayed.

Figure 77C:
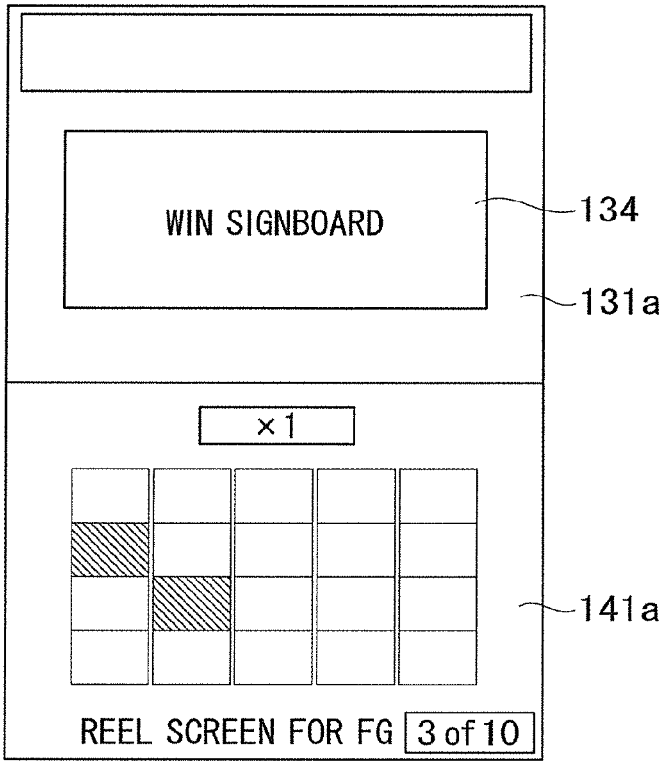
FIG. 77C illustrates the situation at the re-trigger.
Figure 77D:
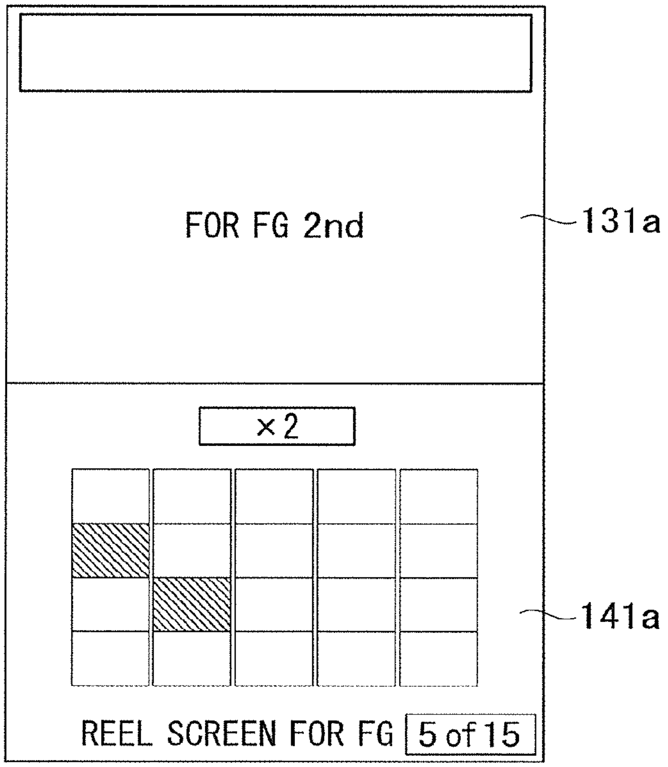
FIG. 77D illustrates the situation at the re-trigger.

Thereafter, the process proceeds to the next step when the display of the message ends or skipping is instructed by the button. That is to say, as shown in FIG. 77C, the re-trigger message disappears and the WIN effect corresponding to the spinning is executed. The WIN increment is conducted and a WIN signboard 134 is displayed on the 2nd screen 131*a*. When the increment ends or is skipped, as shown in FIG. 77D, after the end of the WIN effect, the payout rate displayed on the 1st screen 141*a* is increased and then the next spinning starts. The upper limit of the payout rate is 5. The payout rate is unchanged when it has already been 5. That is to say, the display of the payout rate changes from ×1 to ×2 to ×3 to ×4 to ×5.

(Operations of Slot Machine: WIN Effect: Screen in Free Game)

Figure 78:
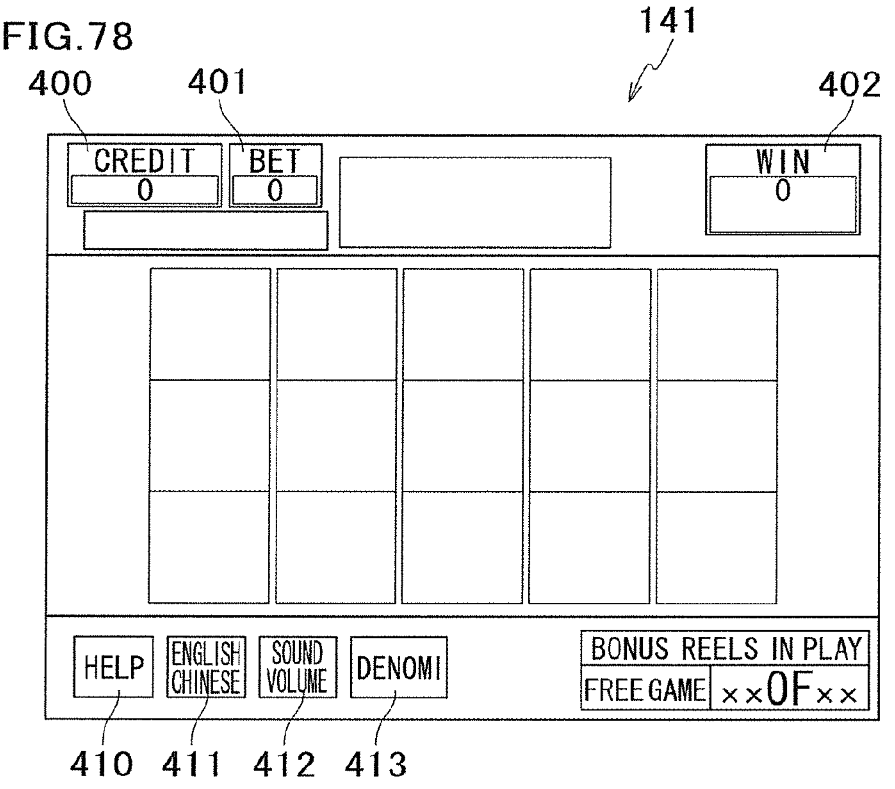
FIG. 78 illustrates a screen in the free game.

As shown in FIG. 78, a free game counter and a message "BONUS REELS IN PLAY" are displayed in the lower right part of the screen. A re-trigger rule is explained at the upper left part of the screen. The re-trigger rule is displayed such that an explanation that the re-trigger in the free game is advantageous and an explanation that the payout rate increases each time the re-trigger occurs are alternately displayed. More specifically, "Re-trigger occurs when feature symbols appear on first and second reels" and "Payout rate increases up to 5 each time re-trigger occurs" are alternately displayed. Above the reels, the current payout rate is displayed. The payout rate is displayed as ×1, ×2, ×3, ×4, or ×5. In other words, there are five patterns of the payout rate, from 1 to 5.

Then the "BONUS REELS IN PLAY" is displayed and a text explaining that special reels different from those in the normal game are used is displayed. The message may be covered on account of the enlargement of the free game counter or symbol animation. When reel strips different from those in the free game are used, such difference is clearly explained in the help and the notice is noticeably displayed during the free game. For example, "BONUS REELS IN PLAY" is displayed.

Furthermore, "FREE GAME" indicates that the free game is in play. This message is enlarged at the start of the spinning. "X OF Y" indicates the total number of times of execution of the free game and the current number of times of execution of the game. "X" is enlarged at the start of the spinning, to notify the player of each execution of the free game. Before the start of the free game, X shows "0". For example, "0° F. 5" is displayed. As the reels start to rotate, the number is increased by one and the number is enlarged together with the reproduction of the voice. "Y" indicates the total number of times of execution of the free game. "X" and "Y" are both single-digit numbers.

The WIN effect, the increment process, and the line effect when the WIN occurs are performed in the same manner as in the normal state. The number of lines and the bet per line are identical with those at the start of the free game. The WIN in the free game is added to the win meter 402 at the upper right part.

(Operations of Slot Machine: WIN Effect: Button Pre-reading Process)

A button prereading process is provided to smoothly start the next game by receiving an input to the spin button for the next game immediately before the end of the rotation of the reels, in the normal game.

Figure 79A:
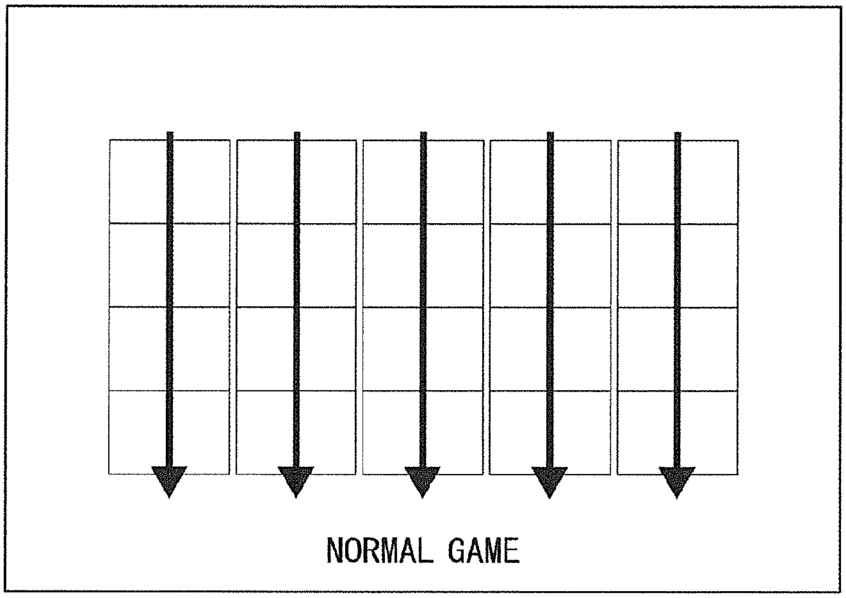
Figure 79B:
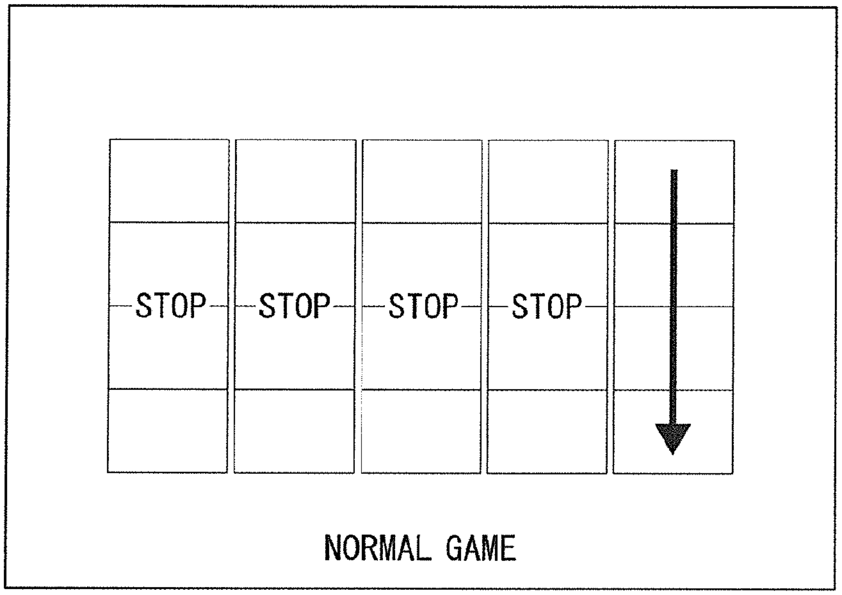
Figure 79C:
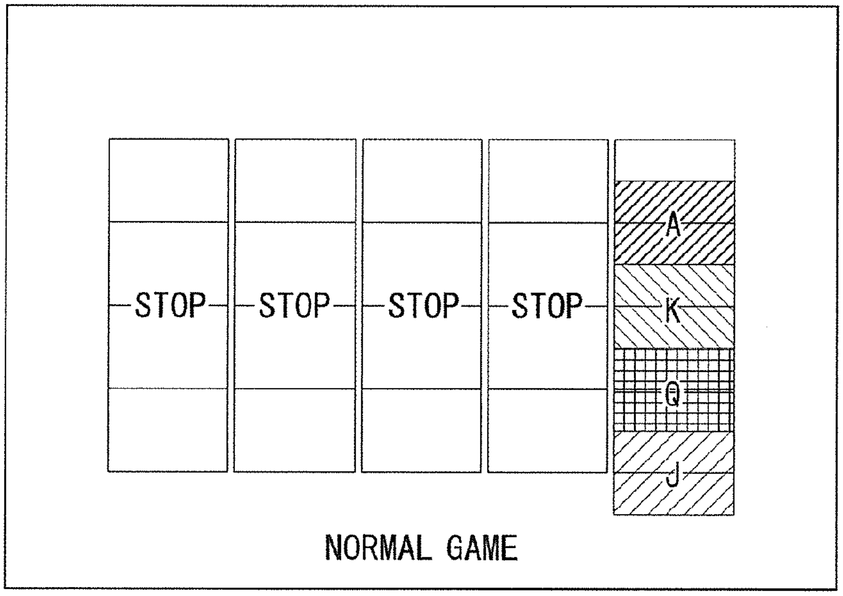
Figure 79D:
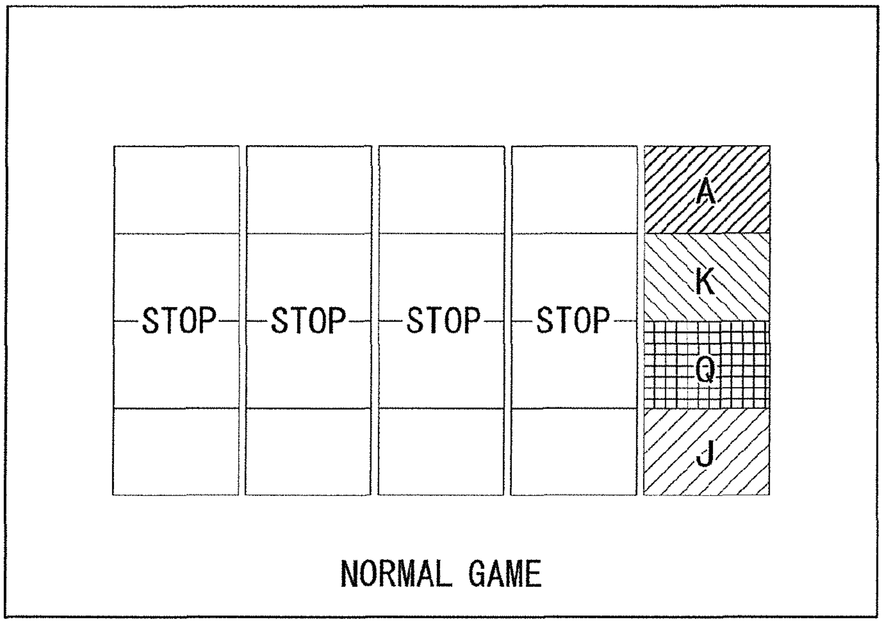
Figure 79E:
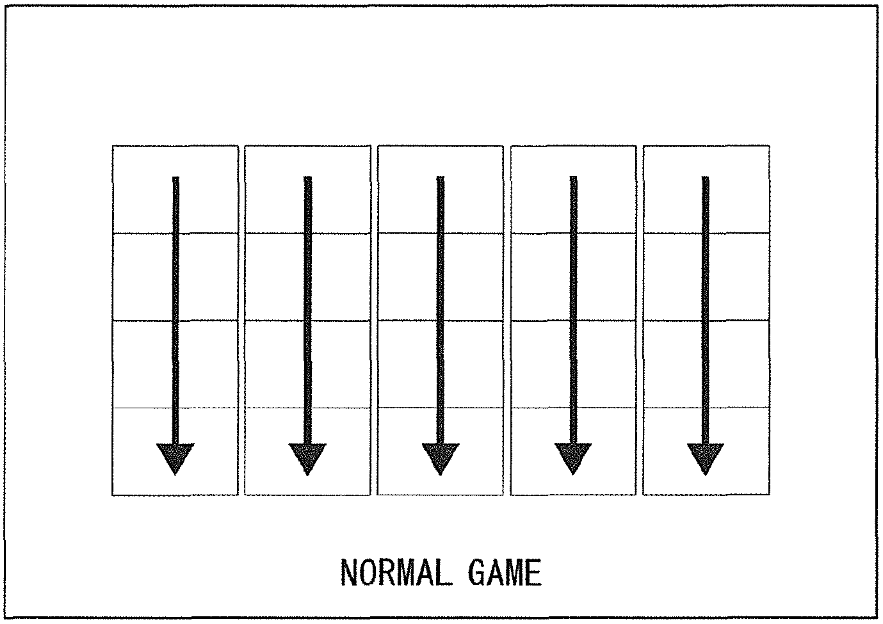

To be more specific, as shown in FIG. 79A and FIG. 79B, the rotation of the fourth reel stops. Thereafter, as shown in FIG. 79C, when the spin button button is continuously pressed while the fifth reel sinks at the maximum and rises to the surface, as shown in FIG. 79D and FIG. 79E, the spinning in the next game starts immediately after the stop of the fifth reel. It is noted that, while the spinning in the next game immediately starts, other effects and processes are not skipped.

The prereading function of prereading the pressing of the button is active only in a normal game in which no WIN occurs. The prereading function is inactive in a game in which WIN occurs. By setting the AUDIT, the prereading function is activated or disabled. In other words, the priority is arranged as Setting>Hardware setting>Control panel. The prereading function is usually activated. The function is disabled in USA.

The button prereading function is active only when the remaining credit amount is sufficient to start the next game. For example, when a currently-selected bet is 50 whereas the remaining credit amount is 25, the spin prereading function is disabled. In the meanwhile, when a currently-selected bet is 50 whereas the remaining credit amount is 100, the spin prereading function is activated.

When the prereading is active, a corresponding button LED is turned on. When the prereading of the spinning is active, the spin button is illuminated.

(Operations of Slot Machine: WIN Effect: Button Pre-reading Process: Coexistence with Reel Skip Function)

Figure 80:
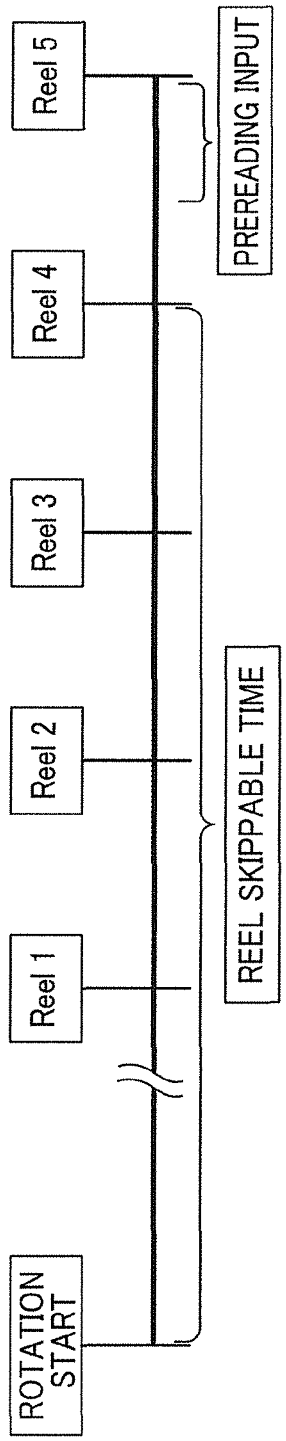
Figure 81:
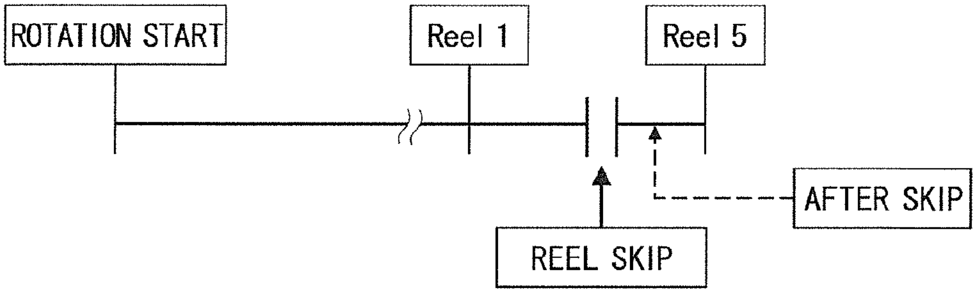

As shown in FIG. 80, the button for the prereading function is used also for the reel skip. For this reason, a reel skippable time and a prereading input available time are independently provided. In the reel skippable time, the reel skip function is active. In the input available time, the prereading of the next game is active. As shown in FIG. 81, when the reel skip is executed in a game, the prereading function is disabled in that game. With this arrangement, even if the button mistakenly pressed twice to execute the skip function, the next game does not unexpectedly starts due to the execution of the spin button prereading function.

(Operations of Slot Machine 10: Gamble Game)

FIG. 82A to FIG. 82G show the operations of the gamble screen. The limit of the value winnable in Gamble is set in the AUDIT. The maximum number of times of Gamble is also set in the AUDIT. For example, the maximum number of times is set at five and the number of times of Gamble is set so as to be five or lower. Whether the touch panel can be used is switchable in some countries.

More specifically, WIN occurs as shown in FIG. 82A. As shown in FIG. 82B, when the shifting to the gamble screen occurs, the message "PLAY ON, GAMBLE or TAKE WIN" disappears. Immediately after the clearance of the RAM, the card history is empty until the gamble game is played. At this stage, the red button is turned on, the black button is turned on, and TAKE WIN button is turned on. The other buttons are turned off except the change button.

As shown in FIG. 82C, the amount bet on "GAMBLE AMOUNT" is displayed. When "Red" or "Black" is selected, the operation proceeds to the process shown in FIG. 82D in case of failure, or proceeds to the process shown in FIG. 82F in case of success. When TAKE WIN is selected, the amount of WIN is added to the credit at once and the idle state returns. In this regard, when "Red" or "Black" is selected, the red button, the black button, and the TAKE WIN button are turned off. When TAKE WIN is selected, the button LED returns to the idle state.

In case of failure in Gamble, as shown in FIG. 82D, non-selected options are darkened. At the left edge of the gamble history field, the card history is displayed at once. The preceding card history moves right. The trace of the movement is not illustrated in animation, and hence the history is rewritten at once. The central card result is displayed at once. At this stage, there are no changes in the win meter and the gamble amount meter. Failure sound is reproduced and the shifting to the main game screen is performed after 1.2 second elapses. At the same time, the red button, the black button, and the TAKE WIN button are turned off.

As shown in FIG. 82E, at the same time as the switching to the main game screen, the WIN meter becomes 0. The button LED returns to the idle state. In case of Success in Gamble, as shown in FIG. 82F, non-selected options are darkened. At the left edge of the gamble history field, the card history is displayed at once. The preceding card history moves right. The trace of the movement is not illustrated in animation, and hence the history is rewritten at once. Thereafter, the normal card and the card with the WIN text are alternated on the central card in each frame, and success sound is reproduced (for 1.2 second). Then the amount increased as a result of the Gamble is added to the WIN meter at once. The gamble amount is unchanged at this stage.

When Gamble is played until reaching the upper limit number of times, the amount of WIN is added to the credit at once and the idle state returns. When Gamble has not played until reaching the upper limit number of times, the operation shifts to the process shown in FIG. 82G. At the same time, the red button, the black button, and the TAKE WIN button are turned off.

As shown in FIG. 82G, the card is overturned. Then the operation goes back to the process shown in FIG. 82D. At this stage, when "Red" or "Black" is selected, the red button, the black button, and the TAKE WIN button are turned off. When TAKE WIN is selected, the button LED returns to the idle state.

(Operations of Slot Machine 10: Residual Gamble Game)

As shown in FIG. 189, when the money is lower than the processable value such as one dollar, a "RESIDUAL GAMBLE" screen is displayed if a gamble start condition such as the pressing of a collect button is satisfied (F253). When the gamble button is pressed, Gamble starts. On the other hand, when the collect button is pressed, Call Attendant is displayed (F254). When the spin button 46 is pressed, the screen of the normal game comes back (F255).

When "WIN" is achieved in Gamble (F256), a predetermined amount of money such as one cent is awarded and a token is paid out through the hopper. In addition to the above, the addition to the credit meter is executed (F257). Thereafter, after a predetermined time such as two seconds elapses, the screen of the normal game comes back (F258). On the other hand, when "LOSE" appears in Gamble (F259), a LOSE screen is displayed (F260). Thereafter, after a predetermined time such as two seconds elapses, the screen of the normal game comes back (F261).

The roles of the buttons in the progress of the gamble game will be described. In the cashout button 32, GAMBLE ON corresponds to "TAKE WIN" and GAMBLE OFF corresponds to "TAKE WIN". In the gamble button 44, GAMBLE ON corresponds to "Gamble Start" and GAMBLE OFF corresponds to "-" In the maximum BET button 45, GAMBLE ON corresponds to "Invalidated" and GAMBLE OFF corresponds to "Gamble Start". In the spin button 46, GAMBLE ON corresponds to "To Normal Game" and GAMBLE OFF corresponds to "To Normal Game".

As shown in FIG. 84, the "RESIDUAL GAMBLE" screen has a card display area, a navigation area, and a meter area. In the card area is displayed a card image. The entirety of the card area has a touch sensor function. On the navigation area, various navigation texts are displayed. The card is a card image included in the common images. The system font is identical with the font used in the denomination. The blank is as long as seven characters. The numbers may include a dot.

The limit of the value winnable in Gamble is set in the AUDIT. The maximum number of times of Gamble is also set in the AUDIT. For example, the maximum number of times is set at five and the number of times of Gamble is set so as to be five or lower. Whether the touch panel can be used is switchable in some countries.

In regard to the game progress, the buttons function as follows: when Gamble is on, the cashout button functions as "Take Win", the gamble button functions as "GAMBLE Start", the maximum BET button functions as "Invalid", the spin button functions as "Shift to Normal Game". The other buttons are not used.

As shown in FIG. 191, when the shifting to the gamble game occurs, the message "PLAY ON, GAMBLE or TAKE WIN RED" disappears. Immediately after the clearance of the RAM, the card history is empty until the gamble game is played. A message "SELECT RED OR BLACK OR TAKE WIN" is displayed. In the gamble screen, a heart-shaped red button and a spade-shaped black button are turned on and a TAKE WIN button at the center is turned on. The other buttons are turned off.

Subsequently, as shown in FIG. 86, the amount bet on "GAMBLE AMOUNT" is displayed. Then one of the heart-shaped red button, the spade-shaped black button, and the TAKE WIN button at the center on the gamble screen is selected. When the TAKE WIN button is selected, the amount of WIN is added to the credits at once and the idle state comes back.

In case of failure in Gamble, as shown in FIG. 87, non-selected options are darkened. At the left edge of the gamble history field, the card history is displayed at once. The preceding card history moves right. The trace of the movement is not illustrated in animation, and hence the history is rewritten at once. The central card result is displayed at once. At this stage, there are no changes in the win meter and the gamble meter. Sound indicating hard luck is output and the shifting to the normal game occurs after several seconds.

In case of Success in Gamble, as shown in FIG. 88, non-selected options are darkened. At the left edge of the gamble history field, the card history is displayed at once. The preceding card history moves right. The trace of the movement is not illustrated in animation, and hence the history is rewritten at once. On the central card, a normal card and a card with a WIN text are alternately displayed at intervals of one frame, and success sound is output for a predetermined time. To the win meter, the value increased as a result of Gamble is added at once. When the player plays the gamble game until reaching the maximum number of times, the value won is added to the credits at once and the idle state comes back. When the player has not played the gamble game up to the maximum number of times, a card is turned inside out and the gamble game is continued.

While in the present embodiment the number of paylines L is 40, the number of paylines is not limited; the number of paylines may be a predetermined number such as 25.

In addition to the above, according to the present embodiment, the free game is arranged so that, symbols are variably displayed in the display block 28 and the variation is stopped, and a payout amount is determined in accordance with the symbols having stopped or a combination thereof (i.e., a game usually running on a slot machine). The free game of the disclosure, however, is not limited to the arrangement above. The free game may be a game different from a slot game. For example, card games such as Poker, shooting games, fighting games may be run. As a result of the free game, a game medium may be paid out or may not be paid out.

In addition to the above, when a free game is run based on the fact that the number of times of the normal game counted in the insurance mode reaches a predetermined number and then the number of times of the normal game counted in the insurance mode reaches the predetermined number again, a free game different from the previous free game may be run. The free game of the present invention may be designed in various ways, as long as the game does not presuppose the betting of a game medium.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a symbol display device configured to variably display and rearrange symbols including a trigger symbol;

a validator configured to validate game media that has been added to the gaming machine and to receive the game media into the gaming machine when the game media is valid; and a controller programmed to, as a result of a player having wagered game media, execute the processes of:

(a1) executing a normal game by rearranging the symbols on the symbol display device;

(a2) determining whether a trigger condition indicating that a first predetermined number or more of the trigger symbol is rearranged is established in the normal game;

(a3) when the trigger condition is established, executing a free game for a second predetermined number of times as a bonus game;

(a4) each time the free game is executed in the bonus game, determining whether a re-trigger condition indicating that a number of rearranged trigger symbols is smaller than first the predetermined number is rearranged is established; and (a5) each time the re-trigger condition is established, increasing a payout rate of the free game executed as the bonus game, wherein the controller:

includes a rank data table in which the number of rearranged trigger symbols is associated with a rank; and in the process (a5), calculates a rank corresponding to the number of rearranged trigger symbols with which the re-trigger condition is established, based on the rank data table, and multiplies the payout rate of the free game executed as the bonus game by the rank.

2. The gaming machine according to claim 1, wherein, the controller increases, in the process (a5), the payout rate of the free game executed as the bonus game in accordance with the number of the trigger symbol with which the re-trigger condition is established.

3. The gaming machine according to claim 1, wherein, the controller increases, in the process (a5), the number of times of execution of the free game executed as the bonus game by a number which is smaller than the second predetermined number of times.

4. The gaming machine according to claim 1, wherein, the controller includes a re-trigger data table in which a combination pattern of the trigger symbol is associated with an additional number of times of execution of the free game which is smaller than the second predetermined number of times, and in the process (a5), calculates an additional number of times corresponding to a combination pattern of the trigger symbol with which the re-trigger condition is established, based on the re-trigger data table, and adds the additional number of times to the number of times of execution of the free game.

5. The gaming machine according to claim 1, further comprising a symbol data storage which is configured to store symbol data of symbols including the trigger symbol and a wild symbol, the symbol display device being able to change the type and number of the symbols based on the symbol data, and the controller executing the bonus game using the symbol display device on which a number of the wild symbol is increased as compared to a number in the normal game, when the trigger condition is established in the process (a3).

6. The gaming machine according to claim 1, wherein, the symbol display device includes reels on which the symbols including the trigger symbol are variably displayed and rearranged, the trigger condition further indicates that a third predetermined number or more of reels on which the trigger symbol is arranged neighbor one another, and the retrigger condition further indicates that the trigger symbol is rearranged on reels the number of which is smaller than the third predetermined number.

7. A gaming machine comprising:

a symbol data storage configured to store symbol data of symbols including a trigger symbol and a wild symbol;

a symbol display device being able to change the number and type of the symbols using the symbol data and variably displaying and rearranging the symbols;

a validator configured to validate game media that has been added to the gaming machine and to receive the game media into the gaming machine when the game media is valid; and a controller which includes a re-trigger data table in which a combination pattern of the trigger symbol is associated with an additional number of times of execution of a game which is smaller than a first predetermined number of times and is programmed to, as a result of a player having wagered game media, execute the processes of:

(a1) executing a normal game by rearranging the symbols on the symbol display device;

(a2) determining whether a trigger condition indicating that a second predetermined number or more of the trigger symbol is rearranged is established in the normal game;

(a2-1) when the trigger condition is established, increasing a number of the wild symbol as compared to the normal game;

(a3) when the trigger condition is established, executing a free game for the first predetermined number of times as a bonus game, using the symbol display device on which the number of the wild symbol is increased in the process (a2-1);

(a4) each time the free game is executed in the bonus game, determining whether a re-trigger condition indicating that a number of rearranged trigger symbols is smaller than the second predetermined number is rearranged is established; and (a5) when the re-trigger condition is established, calculating the additional number of times of execution of the game corresponding to the combination pattern of the trigger symbol with which the re-trigger condition is established, based on the re-trigger data table, adding the additional number of times to the number of times of execution of the free game executed as the bonus game, and increasing a payout rate of the free game executed as the bonus game, wherein the controller:

includes a rank data table in which the number of rearranged trigger symbols is associated with a rank; and in the process (a5), calculates a rank corresponding to the number of rearranged trigger symbols with which the re-trigger condition is established, based on the rank data table, and multiplies the payout rate of the free game executed as the bonus game by the rank.

8. A gaming machine comprising:

a symbol display device including reels on which symbols including a trigger symbol are variably displayed and rearranged;

a validator configured to validate game media that has been added to the gaming machine and to receive the game media into the gaming machine when the game media is valid; and a controller programmed to, as a result of a player having wagered game media, execute the processes of:

(a1) executing a normal game by rearranging the symbols on the symbol display device;

(a2) determining whether a trigger condition is established in the normal game;

(a3) when the trigger condition is established, executing a free game for a predetermined number of times as a bonus game;

(a4) each time the free game is executed in the bonus game, determining whether a re-trigger condition is established, an establishment probability of the re-trigger condition being higher than an establishment probability of the trigger condition; and (a5) when the re-trigger condition is established, increasing a payout rate of the free game executed as the bonus game, wherein the controller:

includes a rank data table in which a number of rearranged trigger symbols is associated with a rank; and in the process (a5), calculates a rank corresponding to the number of rearranged trigger symbols with which the re-trigger condition is established, based on the rank data table, and multiplies the payout rate of the free game executed as the bonus game by the rank.

9. A game controlling method for a gaming machine including a symbol display device including reels on which symbols including a trigger symbol are variably displayed and rearranged and a validator configured to validate game media that has been added to the gaming machine and to receive the game media into the gaming machine when the game media is valid, the method comprising, as a result of a player having wagered game media:

executing a normal game by rearranging the symbols on the symbol display device;

determining whether a trigger condition indicating that a first predetermined number or more of successive different reels on which the trigger symbol is arranged neighbor one another is established in the normal game;

when the trigger condition is established, executing a free game for a second predetermined number of times as a bonus game;

each time the free game is executed in the bonus game, determining whether a re-trigger condition indicating that the trigger symbol is rearranged on reels the number of which is smaller than the first predetermined number is established; and when the re-trigger condition is established, increasing a payout rate of the free game executed as the bonus game, wherein increasing the payout rate includes calculating a rank corresponding to the number of rearranged trigger symbols with which the re-trigger condition is established, based on a rank data table in which the number of rearranged trigger symbols is associated with a rank, and multiplying the payout rate of the free game executed as the bonus game by the rank.

* * * * *